United States Patent [19]

Oguchi et al.

[11] Patent Number: 4,738,908
[45] Date of Patent: Apr. 19, 1988

[54] PHOTOTHERMAL TRANSDUCING TYPE OF RECORDING MEDIUM

[75] Inventors: Yoshihiro Oguchi, Yokohama; Kazuharu Katagiri; Yoshio Takasu, both of Tama, all of Japan

[73] Assignee: Canon Kabushiki Kaisha, Tokyo, Japan

[21] Appl. No.: 753,873

[22] Filed: Jul. 11, 1985

[30] Foreign Application Priority Data

| Jul. 18, 1984 | [JP] | Japan | 59-150398 |
| Sep. 11, 1984 | [JP] | Japan | 59-191163 |
| Nov. 1, 1984 | [JP] | Japan | 59-228901 |
| Nov. 1, 1984 | [JP] | Japan | 59-228902 |
| Nov. 1, 1984 | [JP] | Japan | 59-228903 |
| Nov. 1, 1984 | [JP] | Japan | 59-228904 |
| Nov. 1, 1984 | [JP] | Japan | 59-228905 |

[51] Int. Cl.$^4$ .............................................. G03C 1/72
[52] U.S. Cl. ............................................ 430/20; 430/21; 430/270; 430/945; 430/495; 430/964
[58] Field of Search .................... 430/72, 75, 76, 73, 430/20, 21, 270, 945, 495, 964; 346/135.1, 76 L

[56] References Cited

U.S. PATENT DOCUMENTS

| 4,500,621 | 2/1985 | Wurster | 430/72 |
| 4,501,808 | 2/1986 | Sakai et al. | 430/72 |
| 4,548,886 | 10/1985 | Katagiri et al. | 430/70 |

FOREIGN PATENT DOCUMENTS 2124616  2/1984  United Kingdom.

Primary Examiner—Won H. Louie
Attorney, Agent, or Firm—Fitzpatrick, Cella, Harper & Scinto

[57] ABSTRACT

A photothermal transducing type of recording medium comprises at least one azulenium salt represented by the general formula [I], [II], [III], or [IV].

33 Claims, 2 Drawing Sheets

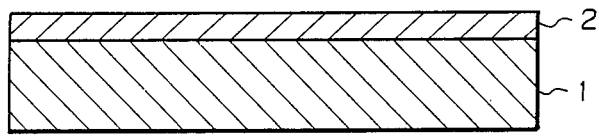
Fig. 1
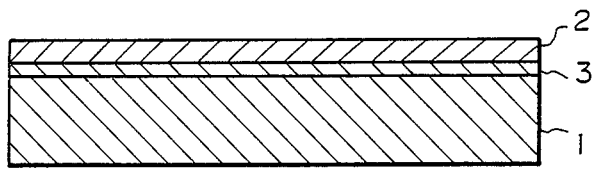
Fig. 2
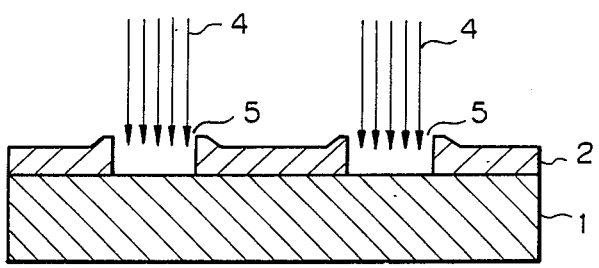
Fig. 3
Fig. 4
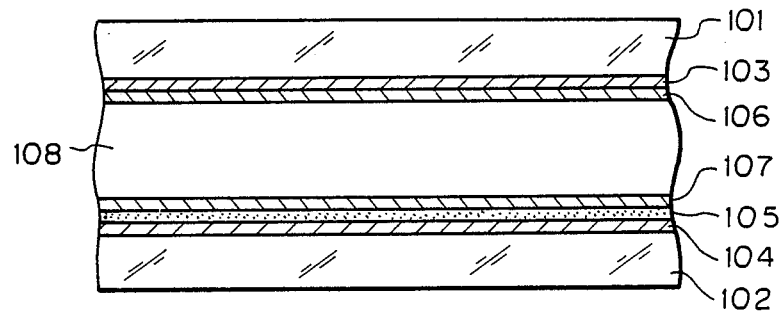

PHOTOTHERMAL TRANSDUCING TYPE OF RECORDING MEDIUM

BACKGROUND OF THE INVENTION

1. Field of the Invention

The present invention relates to a photothermal transducing type of recording medium for recording information with high density and reproducing the recorded information by means of a laser beam or the like, wherein the photothermal transducing effect is utilized. More particularly, the invention relates to a photothermal transducing recording medium capable of effectively absorbing light of wavelength in the visible or near infrared region and transducing its energy to thermal energy, and further performing the recording with high density and optical reproduction of the recorded information by means of a laser beam or the like.

2. Description of the Prior Art

In photothermal transducing recording media used in the optical disk technique, high-density information can be recorded by forming spiral or circular tracks of minute (for instance, about $1\mu$) optically detectable pits in their thin photothermal transducing recording layers laid on substrates. For writing information in such an optical disk, the laser-sensitive layer surface thereof is spirally or circularly scanned with a converged laser beam to form pits only at the portions irradiated with the laser beam. The pits may be in the spiral or circular track form. The laser-sensitive layer can absorb energy of the laser beam, forming optically detectable pits. According to, for example, the heat-mode recording system, the laser-sensitive layer absorbs energy of the incident laser beam and converts it into thermal energy to form minute recesses (pits) at the irradiated positions through evaporation or deformation of these portions thereof or to form minute pits there which show optically detectable difference, due to a chemical change, in oxidation degree, reflectivity, or optical density from the nonirradiated portions.

The information recorded in the optical disk is read by allowing a laser beam to scan along the track and detecting optical change or difference between the portion where the pit is formed and the portion where no pit is formed. For instance, the track is scanned with a laser beam, and the energy reflected from the disk is monitored with a photodetector. Output from the photodetector will be reduced when no pit is formed, and will be increased when a pit is formed, since the beam is sufficiently reflected from the reflecting interface of the underlying layer.

For the recording media used in such optical disks, there have been proposed chiefly the use of inorganic materials such as metal films such as aluminum films vapor-deposited, bismuth thin films, tellurium oxide thin films, and chalcogenide type amorphous glass films.

On the other hand, liquid crystal devices according to photothermal transducing recording techniques are capable of forming optical images in response to light signals supplied from a laser or the like. The hitherto used liquid crystal device of this type has a mixture of a nematic liquid crystal with negative dielectric anisotropy and a cholesteric liquid crystal between two glass base plates or a smectic liquid crystal with positive dielectric an isotropy therebetween. On irradiating this liquid crystal device with a laser beam or the like, thermal energy evolves in the irradiated regions so that isotropic phase is produced by heating. Thereafter, by rapid cooling, the liquid crystal phase in the random orientation state of the liquid crystal molecules is formed which is dissimilar to the initial uniform orientation state. Thus, the region irradiated with the laser beam can now scatter incident light so that difference in optical properties is produced between the irradiated region and the background region where the liquid crystal molecules are uniformly oriented.

This type of liquid crystal device permits also erasing the optical image formed therein by laser beam writing as described above. That is, an electrode is formed on each of the two base plates constructing the liquid crystal device, and this liquid crystal device is entirely heated with a heat source (e.g. an electric heater) other than the laser beam, thereby turning the liquid crystal phase to the isotropic phase. The device is cooled until, for example, a homeotropic structure is formed in case of the smectic liquid crystal, or a grandjean structure is formed in case of the cholestericnematic liquid crystal, whereby the previously written optical image can be erased.

Such a liquid crystal device based on a photothermal transducing recording system is advantageous in that an image can be formed simply by scanning the liquid crystal surface with light signals converted from electric signals without requiring the matrix electrode structure to form picture elements, and that the image can be obtained on a large scale. However, this type of device has a drawback that the efficiency of absorbing and converting the laser beam energy, when it is used, into thermal energy is insufficient and therefore satisfactory writing cannot be effected by the scanning with light signals. Accordingly, a guest-host type of photothermal transducing recording liquid crystal device which comprises a smectic liquid crystal containing a black colorant has been proposed as disclosed, for example, in "Society of Information Display International Symposium, Digest of Technical Paper", pp. 34–49, 172–187, 238–253 (1982).

Meanwhile, there have been developed in recent years small-sized, low cost semiconductor lasers which are capable of being modulated directly. Many of these lasers have wavelengths of at least 700 nm and generally the powers of the laser beams are low as compared with those of gas lasers such as argon lasers and helium-neon lasers. Accordingly, when photothermal transducing recording is carried out with such a semiconductor laser, it is effective to use a laser-sensitive layer having an absorption maximum in a longer-wavelength region (generally the region of 700–850 nm).

The conventional photothermal transducing recording media, however, are not sufficient in the efficiency of absorbing a laser beam and transducing its energy to thermal energy. In case of optical disks, as an example, a photothermal transducing recording layer composed mainly of an inorganic material as mentioned above has a high reflectivity for laser beams. Such a recording layer suffers from disadvantages in that the efficiency of laser energy utilization is low and therefore high sensitivity characteristic cannot be obtained. Also, the laser-sensitive layer requires a complicated structure in order to make the layer sensitive to rays of wavelengths of at least 700 nm. In view of the above, there have been studied in recent years organic compounds the physical properties of which can be changed by the energy of light in relatively long wavelength region. It is known that, for example, pyrylium dyes as disclosed in U.S. Pat. No. 4,315,983, "Research Disclosure", 20517 (1981, 5) and squarium dyes as disclosed in "J. Vac. Sci. Technol.", 18(1), pp. 105–109 (Jan./Feb. 1981) are sensitive to laser of wavelength of at least 700 nm.

However, there are problems such that organic compounds having absorption maxima in the longer wavelength region are generally more unstable and liable to decompose with a slight rise in temperature.

The guest-host type of photothermal transducing recording liquid crystal device also has a drawback that when a semiconductor laser is used, the efficiency of absorbing and transducing laser beam energy to thermal energy is insufficient since the output power of the laser is low and it is therefore necessary to scan the surface with light signals of high power or low speed. The black colorant-containing liquid crystal device mentioned above has the drawback that the display is unfavorable in the aspect of human engineering since a white image pattern is formed in the black background.

Therefore, it cannot be said that photothermal transducing recording media hitherto developed for optical disk or liquid crystal device applications are sufficiently satisfactory for practical use since these media need to fulfill requirements in various properties.

SUMMARY OF THE INVENTION

Accordingly, a first object of the invention is to provide a novel and useful photothermal transducing recording medium.

A second object of the invention is to provide a photothermal transducing recording medium which has the absorption characteristic in the wavelength of visible and near infrared regions and is capable of effectively absorbing the light and transducing its energy to thermal energy and can perform the recording with high density and optical reproduction of the recorded information.

A third object of the invention is to provide a thermally stable photothermal transducing recording medium free of the above noted drawbacks.

A fourth object of the invention is to provide a novel photothermal transducing recording medium for optical disks.

A fifth object of the invention is to provide a photothermal transducing recording medium for optical disks which is highly sensitive to visible and near infrared rays and exhibits sufficient S/N ratio.

A sixth object of the invention is to provide a liquid crystal device based on a novel photothermal transducing recording system.

A seventh object of the invention is to provide a liquid crystal device based on a photothermal transducing recording system which is capable of forming a pattern of optical image in response to scanning light signals from a light signal generator using a laser oscillator.

These objects of the invention are achieved with a photothermal transducing recording medium comprising an azulenium salt represented by the following general formula [I], [II], [III], or [IV]:

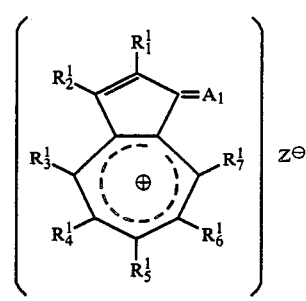

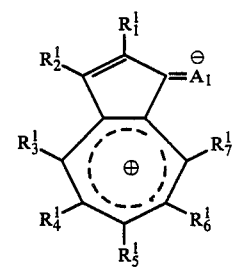

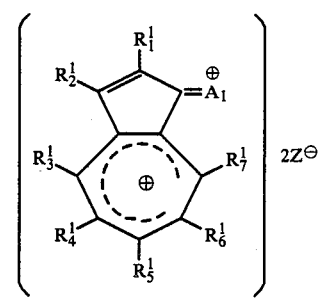

In formulae [I], [II] and [III], at least one of combinations of $R^1_1$ and $R^1_2$, $R^1_2$ and $R^1_3$, $R^1_3$ and $R^1_4$, $R^1_4$ and $R^1_5$, $R^1_5$ and $R^1_6$, and $R^1_6$ and $R^1_7$ forms a substituted or unsubstituted heterocyclic ring, aromatic ring, or ring formed of aliphatic chain together with the two adjacent carbon atoms, and each of $R^1_1$, $R^1_2$, $R^1_3$, $R^1_4$, $R^1_5$, $R^1_6$ and $R^1_7$ which do not participate in the formation of the ring represents hydrogen, halogen or organic monovalent radical; $A_1$ represents an organic divalent radical linked by a double bond to the 5-membered ring; and $Z^\ominus$ is an anion.

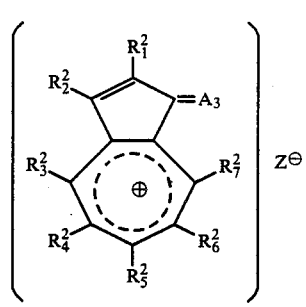

In formula [IV], $R^2_1$, $R^2_2$, $R^2_3$, $R^2_4$, $R^2_5$, $R^2_6$, and $R^2_7$ each represent hydrogen, halogen, or organic monovalent radical, or they may be joined together with the two adjacent carbon atoms to form a substituted or unsubstituted ring with at least one of the combinations:

$R^2{}_1$ and $R^2{}_2$, $R^2{}_2$ and $R^2{}_3$, $R^2{}_3$ and $R^2{}_4$, $R^2{}_4$ and $R^2{}_5$, $R^2{}_5$ and $R^2{}_6$, and $R^2{}_6$ and $R^2{}_7$; and $A_3$ represents any of the following:

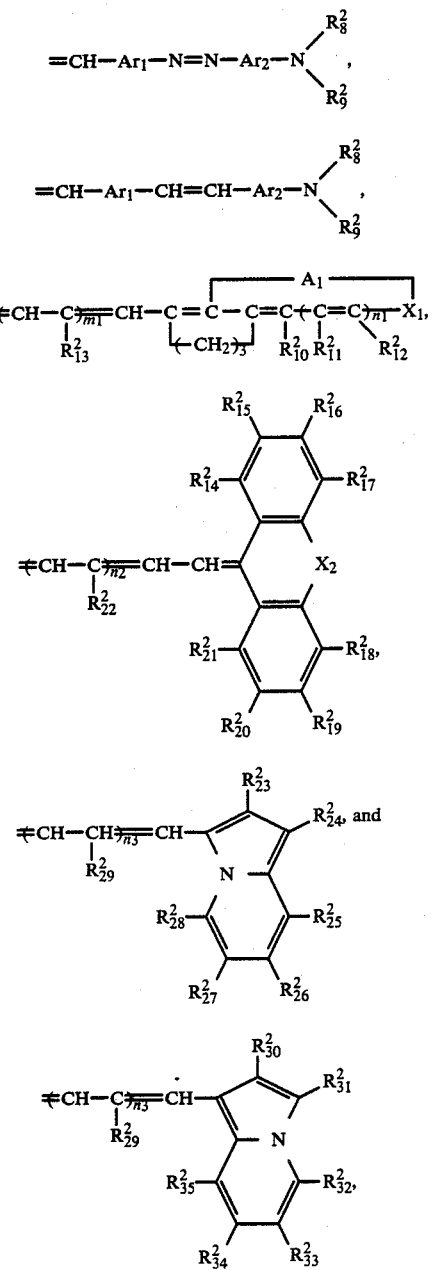

wherein $R^2{}_8$ and $R^2{}_9$ each represent a substituted or unsubstituted alkyl, aryl, or aralkyl group, or $R^2{}_8$ and $R^2{}_9$ may be joined together with the nitrogen atom to which they are attached to form a ring; $Ar_1$ and $Ar_2$ each represent a substituted or unsubstituted arylene group; $R^2{}_{10}$, $R^2{}_{11}$ and $R^2{}_{12}$ each represent hydrogen, alkyl, alkoxy, or substituted or unsubstituted aryl, substituted or unsubstituted styryl, substituted or unsubstituted 4-phenyl-1,3-butadienyl, or substituted or unsubstituted heterocyclic ring, or the combination of $R^2{}_{10}$ and $R^2{}_{11}$ or $R^2{}_{11}$ and $R^2{}_{12}$, conjointly with the two adjacent carbon atoms, may form a substituted or unsubstituted benzene ring; $R^2{}_{13}$ represents hydrogen, nitro, alkyl, or aryl; $X_1$ represent oxygen, sulfur, or selenium atom; $A_4$ represents an atom group necessary to form a substituted or unsubstituted pyrane, thiapyrane, selenapyrane, benzopyrane, benzothiapyrane, benzoselenapyrane, naphthopyrane, naphthothiapyrane, or naphthoselenapyrane radical; $m_1$ represents an integer of 0, 1, or 2; $n_1$ represents an integer of 0 or 1; $R^2{}_{14}$, $R^2{}_{15}$, $R^2{}_{16}$, $R^2{}_{17}$, $R^2{}_{18}$, $R^2{}_{19}$, $R^2{}_{20}$, and $R^2{}_{21}$ each represent hydrogen, halogen, alkyl, alkoxy, hydroxyl, substituted or unsubstituted aryl, substituted or unsubstituted aralkyl, or nitro, or they may be joined together with the two adjacent carbon atoms to form a substituted or unsubstituted aromatic ring with at least one of the combinations: $R^2{}_{14}$ and $R^2{}_{15}$, $R^2{}_{15}$ and $R^2{}_{16}$, $R^2{}_{16}$ and $R^2{}_{17}$, $R^2{}_{17}$ and $R^2{}_{18}$, $R^2{}_{18}$ and $R^2{}_{19}$, $R^2{}_{19}$ and $R^2{}_{20}$, and $R^2{}_{20}$ and $R^2{}_{21}$; X represent oxygen, sulfur, or selenium atom; $R^2{}_{22}$ represents hydrogen, nitro, cyano, alkyl, or aryl; $n_2$ represents an integer of 0, 1, or 2; $R^2{}_{23}$, $R^2{}_{24}$, $R^2{}_{25}$, $R^2{}_{26}$, $R^2{}_{27}$, $R^2{}_{28}$, $R^2{}_{30}$, $R^2{}_{31}$, $R^2{}_{32}$, $R^2{}_{33}$, $R^2{}_{34}$ and $R^2{}_{35}$ each represent hydrogen, halogen, alkyl, alkoxy, substituted or unsubstituted aryl, substituted or unsubstituted aralkyl, nitro, or acyl, or $R^2{}_{23}$, $R^2{}_{24}$, $R^2{}_{25}$, $R^2{}_{26}$, $R^2{}_{27}$ and $R^2{}_{28}$ may be joined together with the two adjacent carbon atoms to form a substituted or unsubstituted ring with at least one of the combinations: $R^2{}_{23}$ and $R^2{}_{24}$, $R^2{}_{24}$ and $R^2{}_{25}$, $R^2{}_{25}$ and $R^2{}_{26}$, $R^2{}_{26}$ and $R^2{}_{27}$, and $R^2{}_{27}$ and $R^2{}_{28}$; $R^2{}_{30}$, $R^2{}_{31}$, $R^2{}_{32}$, $R^2{}_{33}$, $R^2{}_{34}$ and $R^2{}_{35}$ may be joined together with the two adjacent carbon atoms to form a substituted or unsubstituted ring with at least one of the combinations: $R^2{}_{30}$ and $R^2{}_{31}$, $R^2{}_{31}$ and $R^2{}_{32}$, $R^2{}_{32}$ and $R^2{}_{33}$, $R^2{}_{33}$ and $R^2{}_{34}$, and $R^2{}_{34}$ and $R^2{}_{35}$; $R^2{}_{29}$ represents hydrogen, nitro, alkyl, or aryl; and $n_3$ represents an integer of 0, 1, or 2; and $Z^{\ominus}$ represents an anion.

BRIEF DESCRIPTION OF THE DRAWINGS

FIGS. 1 and 2 are cross-sectional views of photothermal transducing recording media of the present invention for optical disks;

FIG. 3 is an illustration showing a recording state of a photothermal transducing recording medium of the invention;

FIG. 4 is a cross-sectional view of a liquid crystal device of the invention;

DETAILED DESCRIPTION OF EMBODIMENTS OF THE INVENTION

Figure 5:
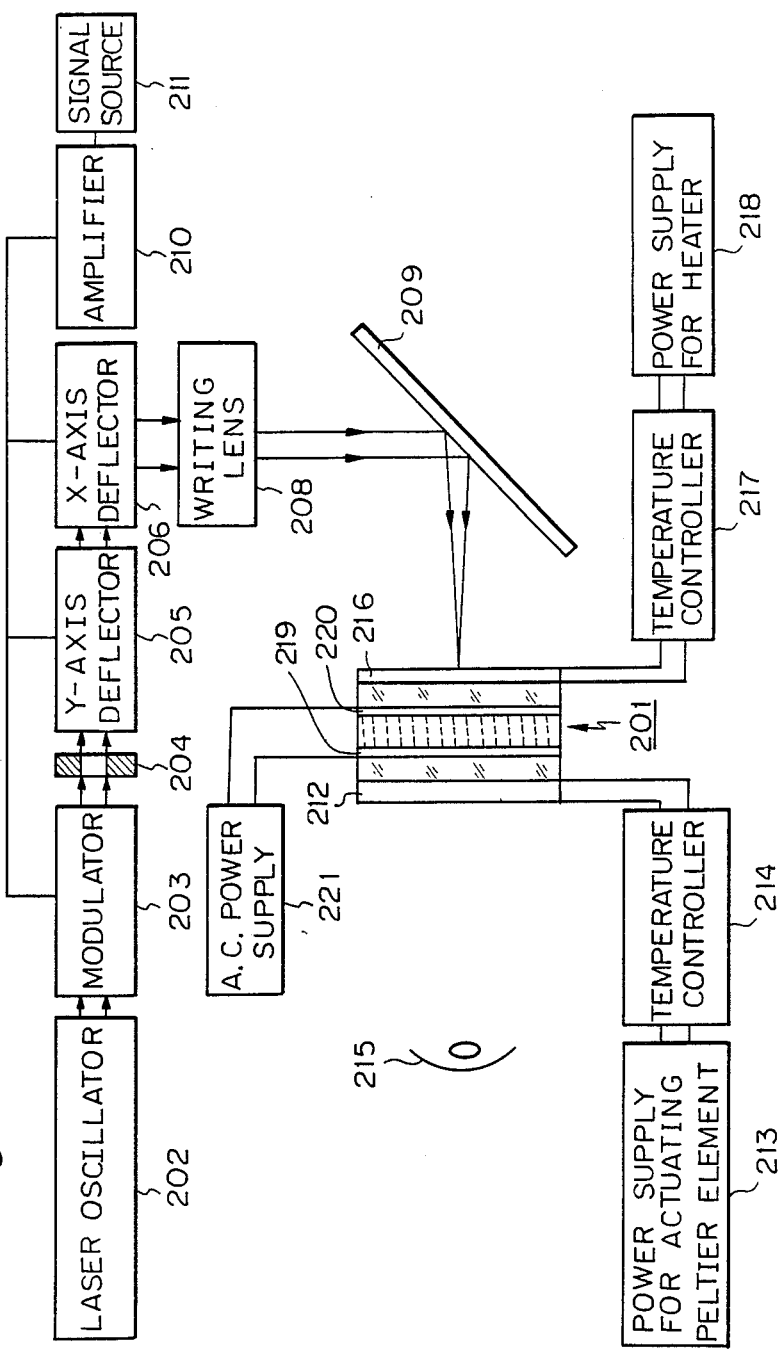
FIG. 5 is an illustration showing a display system employing a liquid crystal device of the invention.

The symbols in general formulae [I], [II], and [III] are further explained in more detail.

As stated above, at least one of combinations of $R^1{}_1$ and $R^1{}_2$, $R^1{}_2$ and $R^1{}_3$, $R^1{}_3$ and $R^1{}_4$, $R^1{}_4$ and $R^1{}_5$, $R^1{}_5$ and $R^1{}_6$, and $R^1{}_6$ and $R^1{}_7$ forms a substituted or unsubstituted heterocyclic ring, aromatic ring, or ring formed of aliphatic chain together with the two adjacent carbon atoms, and each of $R^1{}_1$, $R^1{}_2$, $R^1{}_3$, $R^1{}_4$, $R^1{}_5$, $R^1{}_6$ and $R^1{}_7$ which do not participate in the formation of the ring represents hydrogen, halogen e.g. chlorine, bromine, or iodine or organic monovalent radical. Examples of the heterocyclic ring are furan, benzofuran, pyrrole, thiophen, pyridine, quinoline, and thiazole. Examples of the aliphatic chain are dimethylene, trimethylene, and tetramethylene.

The organic monovalent radical can be selected from a wide variety of radicals, but preferably can be selected from alkyl (e.g. methyl, ethyl, n-propyl, isopropyl, n-butyl, t-butyl, n-amyl, n-hexyl, n-octyl, 2-ethylhexyl, and t-octyl), alkoxy (e.g. methoxy, ethoxy, propoxy, and butoxy), substituted or unsubstituted aryl (e.g. phenyl, tolyl, xylyl, ethylphenyl, methoxyphenyl, ethoxyphenyl, chlorophenyl, nitrophenyl, dimethylaminophenyl, α-naphthyl, and β-naphthyl), substituted or unsubstituted heterocyclic radical (e.g. pyridyl, quinolyl, carbazolyl, furyl, thienyl, and pyrazolyl), substituted or unsubstituted aralkyl (e.g. benzyl, 2-phenylethyl, 2-phenyl-1-methylethyl, bromobenzyl, 2-bromophenylethyl, methylbenzyl, methoxybenzyl, and nitrobenzyl), acyl (e.g. acetyl, propionyl, butyryl, valeryl, benzoyl, toluoyl, naphthoyl, phthaloyl, and furoyl), substituted or unsubstituted amino (e.g. amino, dimethylamino, diethylamino, dipropylamino, acetylamino, and benzoylamino), substituted or unsubstituted styryl (e.g. styryl, dimethylaminostyryl, diethylaminostyryl, dipropylaminostyryl, methoxystyryl, ethoxystyryl, and methylstyryl), nitro, hydroxyl, mercapto, thioether radical, carboxyl, carboxylic ester radical, carboxylic acid amide radical, cyano, and substituted or unsubstituted arylazo radical (phenylazo, α-naphthylazo, β-naphthylazo, dimethylaminophenylazo, chlorophenylazo, nitrophenylazo, methoxyphenylazo, and tolylazo).

Examples of the substituted or unsubstituted aromatic ring are benzene, naphthalene, chlorobenzene, bromobenzene, methylbenzene, ethylbenzene, methoxybenzene, and ethoxybenzene.

$A_1$ represents an organic divalent radical linked by a double bond to the 5-membered ring. Examples of the compound containing such $A_1$, of the present invention are represented by the following general formulae (12) to (22), wherein the symbol $Q^\oplus$ represents the azulenium skeleton:

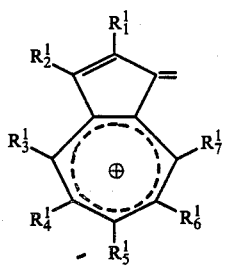

and the portion on the right side $Q^\oplus$ represents $A_1$.

General formula (12):

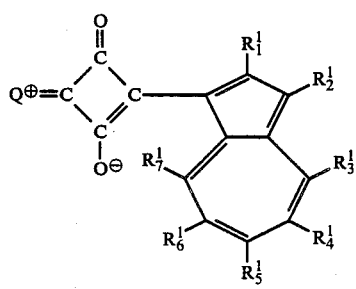

In this formula, $R^1_1$ to $R^1_7$ are as defined above.

General formula (13):

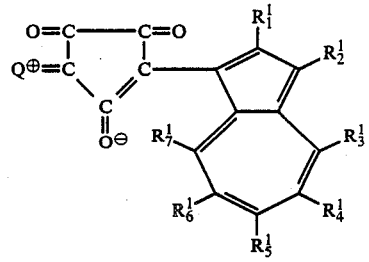

In this formula, $R^1_1$ to $R^1_7$ are as defined above.

General formula (14):

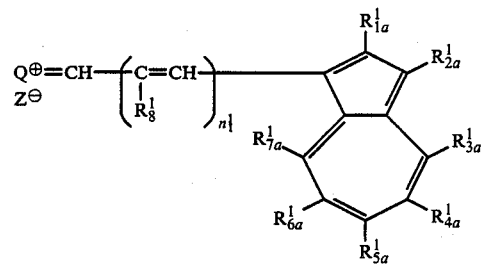

In this formula, at least one of combinations of $R^1_{1a}$ and $R^1_{2a}$, $R^1_{2a}$ and $R^1_{3a}$, $R^1_{3a}$ and $R^1_{4a}$, $R^1_{4a}$ and $R^1_{5a}$, $R^1_{5a}$ and $R^1_{6a}$, and $R^1_{6a}$ and $R^1_{7a}$ forms a substituted or unsubstituted heterocyclic ring, or ring formed of aliphatic chain together with the two adjacent carbon atoms, and each of $R^1_{1a}$, $R^1_{2a}$, $R^1_{3a}$, $R^1_{4a}$, $R^1_{5a}$, $R^1_{6a}$ and $R^1_{7a}$ which do not participate in the formation of the ring represents hydrogen, halogen (chlorine, bromine, or iodine atom), or organic monovalent radical. The organic monovalent radical can be selected from a wide variety of radicals, but preferably can be selected from alkyl (e.g. methyl, ethyl, n-propyl, isopropyl, n-butyl, t-butyl, n-amyl, n-hexyl, n-octyl, 2-ethylhexyl, and t-octyl), alkoxy (e.g. methoxy, ethoxy, propoxy, and butoxy), substituted or unsubstituted aryl (e.g. phenyl, tolyl, xylyl, ethylphenyl, methoxyphenyl, ethoxyphenyl, chlorophenyl, nitrophenyl, dimethylaminophenyl, α-naphthyl, and β-naphthyl), substituted or unsubstituted heterocyclic radical (e.g. pyridyl, quinolyl, carbazolyl, furyl, thienyl, and pyrazolyl), substituted or unsubstituted aralkyl (e.g. benzyl, 2-phenylethyl, 2-phenyl-1-methylethyl, bromobenzyl, 2-bromophenylethyl, methylbenzyl, methoxybenzyl, and nitrobenzyl), acyl (e.g. acetyl, propionyl, butyryl, valeryl, benzoyl, toluoyl, naphthoyl, phthaloyl, and furoyl), substituted or unsubstituted amino (e.g. amino, dimethylamino, diethylamino, dipropylamino, acetylamino, and benzoylamino), substituted or unsubstituted styryl (e.g. styryl, dimethylaminostyryl, diethylamonostyryl, dipropylaminostyryl, methoxystyryl, ethoxystyryl, and methylstyryl), nitro, hydroxyl, mercapto, thioether radicals, carboxyl, carboxylic ester radical, carboxylic acid amide radical, cyano, and substituted or unsubstituted arylazo radical (e.g. phenylazo, α-naphthylazo, β-naphthylazo, dimethylaminophenylazo, chlorophenylazo, nitrophenylazo, methoxyphenylazo, and tolylazo). Examples of the heterocyclic ring are furan, benzofuran, pyrrole, thiophen, pyridine, quinoline, and thiazole. Examples of the aliphatic chain are dimethylene, trimethylene, and tetramethylene. At least one of combinations of $R^1_{1a}$ and $R^1_{2a}$, $R^1_{3a}$ and $R^1_{4a}$, $R^1_{4a}$ and $R^1_{5a}$, $R^1_{5a}$ and $R^1_{6a}$, and $R^1_{6a}$ and $R^1_{7a}$ may form a substituted or unsubstituted aromatic ring (e.g. benzene, naphthalene, chlorobenzene, bromobenzene, methylbenzene, ethylbenzene, methoxybenzene, or ethoxybenzene) together with the two adjacent carbon atoms.

In general formula (14), the azulenium skeleton represented by $Q^\oplus$ and the azulene skeleton on the right side may be either symmetrical or asymmetrical. $Z^\ominus$ represents an anion, $R^1_{8a}$ represents hydrogen, nitro, cyano, alkyl (e.g. methyl, ethyl, propyl, or butyl), or aryl (e.g. phenyl, tolyl, or xylyl), and $n^1_1$ represents an integer of 0, 1, or 2.

General formula (15):

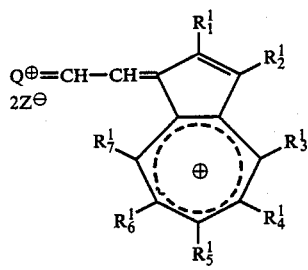

($R^1_1$ to $R^1_7$ are as defined above.)

General formula (16):

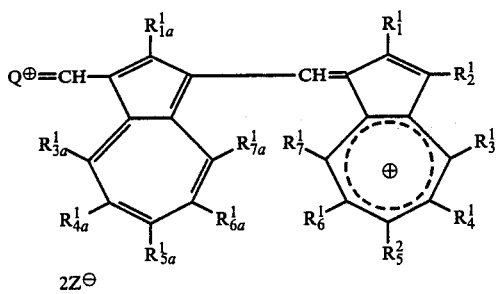

($R^1_1$ to $R^1_7$ and $Z^\ominus$ are as defined above; and at least one of combinations of $R^1_{3a}$ and $R^1_{4a}$, $R^1_{4a}$ and $R^1_{5a}$, $R^1_{5a}$ and $R^1_{6a}$, and $R^1_{6a}$ and $R^1_{7a}$ forms a substituted or unsubstituted heterocyclic ring, or ring formed of aliphatic chain which is the same as that defined for $R^1_{1a}$ and $R^1_{3a}$ to $R^1_{7a}$ in the foregoing, together with the two adjacent carbon atoms, and each of $R^1_{1a}$, $R^1_{3a}$, $R^1_{4a}$, $R^1_{5a}$, $R^1_{6a}$, and $R^1_{7a}$ which do not participate in the formation of the ring represents hydrogen, halogen or organic monovalent radical.)

General formula (17):

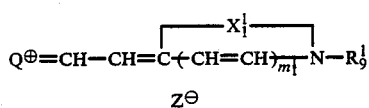

In this formula; $X^1_1$ represents a nonmetallic atom group necessary to form a nitrogen-containing heterocyclic ring such as pyridine, thiazole, benzothiazole, naphthothiazole, oxazole, benzoxazole, naphthoxazole, imidazole, benzimidazole, naphthoimidazole, 2-quinoline, 4-quinoline, isoquinoline, or indole, where the heterocyclic ring may be substituted by halogen (e.g. chlorine, bromine, or iodine), alkyl (e.g. methyl, ethyl, propyl, or butyl), or aryl (e.g. phenyl, tolyl, or xylyl);

$R^1_9$ represents alkyl (e.g. methyl, ethyl, propyl, or butyl), substituted alkyl (e.g. 2-hydroxyethyl, 2-methoxyethyl, 2-ethoxyethyl, 3-hydroxypropyl, 3-methoxypropyl, 3-ethoxypropyl, 3-chloropropyl, 3-bromopropyl, or 3-carboxypropyl), cycloalkyl (e.g. cyclohexyl or cyclopropyl), allyl, aralkyl (e.g. benzyl, 2-phenylethyl, 3-phenylpropyl, 4-phenylbutyl, α-naphthylmethyl, or β-naphthylmethyl), substituted aralkyl (e.g. methylbenzyl, ethylbenzyl, dimethylbenzyl, trimethylbenzyl, chlorobenzyl, or bromobenzyl), aryl (e.g. phenyl, tolyl, xylyl, α-naphthyl, or β-naphthyl), or substituted aryl (e.g. chlorophenyl, dichlorophenyl, trichlorophenyl, ethylphenyl, methoxyphenyl, dimethoxyphenyl, aminophenyl, nitrophenyl, or hydroxyphenyl); $m^1_1$ represents 0 or 1; and $Z^\ominus$ is as defind above.

General formula (18):

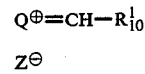

In this formula, $R^1_{10}$ represents substituted or unsubstituted aryl (e.g. phenyl, tolyl, xylyl, biphenylyl, α-naphthyl, β-naphthyl, anthryl, pyrenyl, methoxyphenyl, dimethoxyphenyl, trimethoxyphenyl, ethoxyphenyl, diethoxyphenyl, chlorophenyl, dichlorophenyl, trichlorophenyl, bromophenyl, dibromophenyl, tribromophenyl, ethylphenyl, diethylphenyl, nitrophenyl, aminophenyl, dimethylaminophenyl, diethylaminophenyl, dibenzylaminophenyl, dipropylaminophenyl, morpholinophenyl, piperidinylphenyl, piperazinophenyl, diphenylaminophenyl, acetylaminophenyl, benzoylaminophenyl, acetylphenyl, benzoylphenyl, or cyanophenyl) and $Z^\ominus$ is as defined above.

General formula (19):

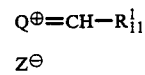

In this formula, $R^1_{11}$ represents a monovalent heterocyclic radical derived from furan, thiophene, benzofuran, thionaphthene, dibenzofuran, carbazole, phenothiazine, phenoxazine, or pyridine and $Z^\ominus$ is as defined above.

General formula (20):

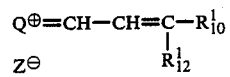

In this formula, $R^1_{12}$ represents hydrogen, alkyl (e.g. methyl, ethyl, propyl, or butyl), or substituted or unsubstituted aryl (e.g. phenyl, tolyl, xylyl, biphenylyl, ethylphenyl, chlorophenyl, methoxyphenyl, ethoxyphenyl, nitrophenyl, aminophenyl, dimethylaminophenyl, diethylaminophenyl, acetylaminophenyl, α-naphthyl, β-naphthyl, anthryl, or pyrenyl) and $R^1_{10}$ and $Z^\ominus$ are as defined above.

General formula (21):

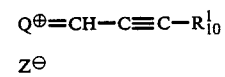

In this formula, $R^1_{10}$ and $Z^\ominus$ are as defined above.

General formula (22):

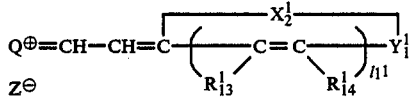

In this formula; $X^1_2$ represents an atomic group necessary to form a substituted or unsubstituted pyrane, thiapyrane, selenapyrane, benzopyrane, benzothiapyrane, benzoselenapyrane, naphthopyrane, naphthothiapyrane, or naphthoselenapyrane radical; $l^1_1$ is 0 or 1; $Y^1_1$ represents sulfur, oxygen, or selenium; $R^1_{13}$ and $R^1_{14}$ each represent hydrogen, alkyl (e.g. methyl, ethyl, propyl, or butyl), alkoxy (e.g. methoxy, ethoxy, propoxy, or butoxy), substituted or unsubstituted aryl (e.g. phenyl, tolyl, xylyl, chlorophenyl, biphenylyl, or methoxyphenyl), substituted or unsubstituted styryl (e.g. styryl, p-methylstyryl, o-chlorostyryl, or p-methoxystyryl), substituted or unsubstituted 4-phenyl-1,3-butadienyl (e.g. 4-phenyl-1,3-butadienyl or 4-(p-methylphenyl)-1,3-butadienyl), or substituted or unsubstituted heterocyclic radical (e.g. quinolyl, pyridyl, carbazolyl, or furyl); and $Z^\ominus$ is as defined above.

Examples of $Z^\ominus$ in the general formulae above are perchlorate, fluoroborate, sulfoacetate, iodide, chloride, bromide, p-toluenesulfonate, alkylsulfonates, alkyldisulfonates, benzenedisulfonate, halosulfonates, picrate, tetracyanoethylene anion, and tetracyanoquinodimethane anion.

Examples of the azulenium salts represented by formulae (12) to (22) used in the present invention are listed below.

Examples of the compounds represented by general formula (12) above:

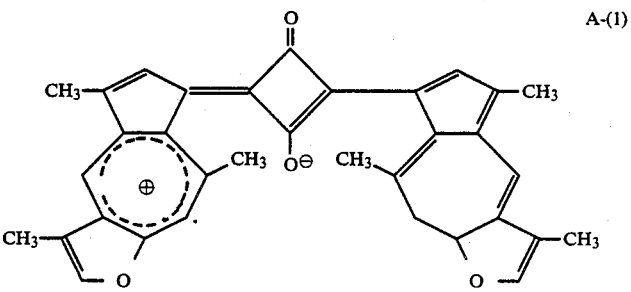

A-(1)

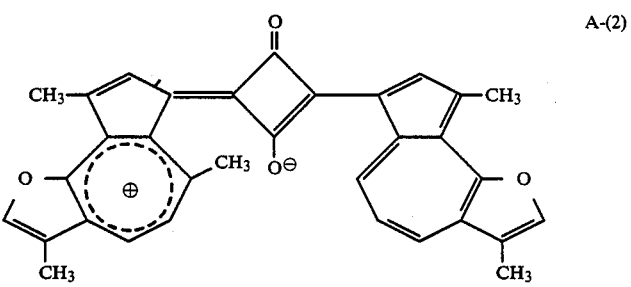

A-(2)

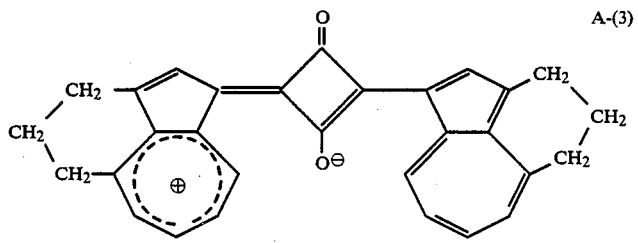

A-(3)

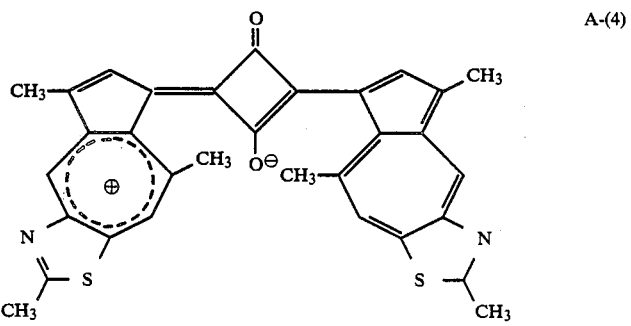

A-(4)

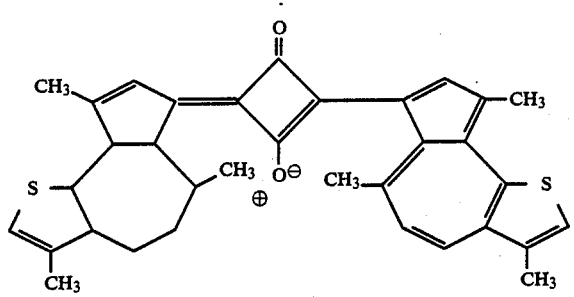
A-(5)
Examples of the compounds represented by general formula (13);
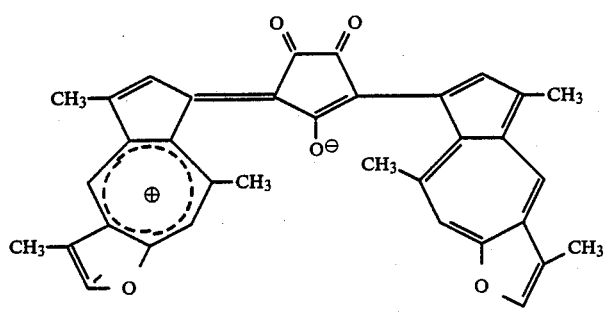
A-(6)
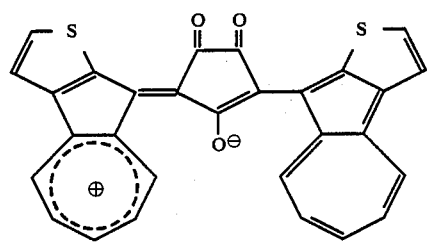
A-(7)
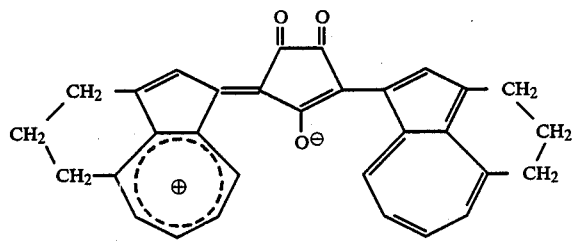
A-(8)
Examples of the compounds represented by general formula (14) above;
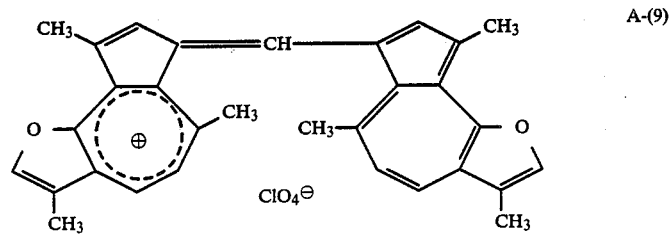
A-(9)

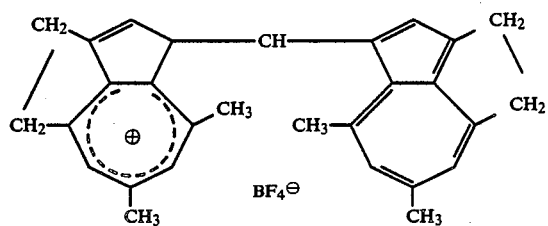
A-(10)
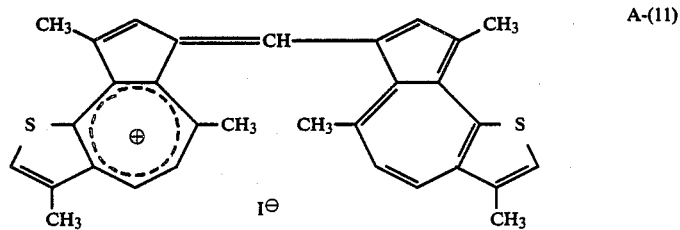
A-(11)
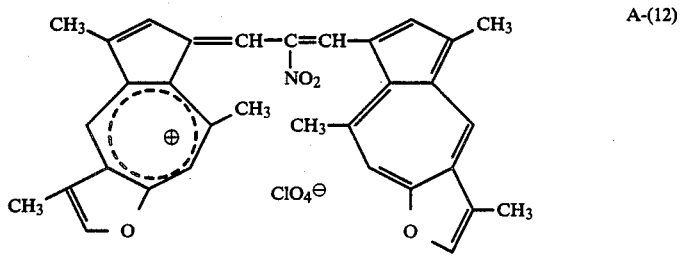
A-(12)
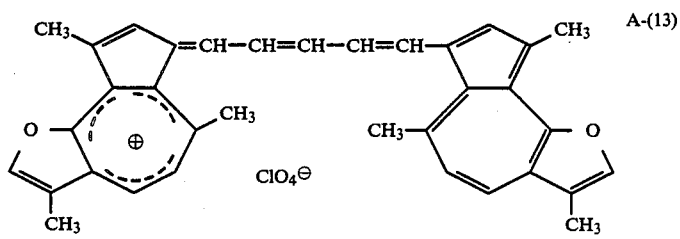
A-(13)
Examples of the compounds represented by general formula (15) above;
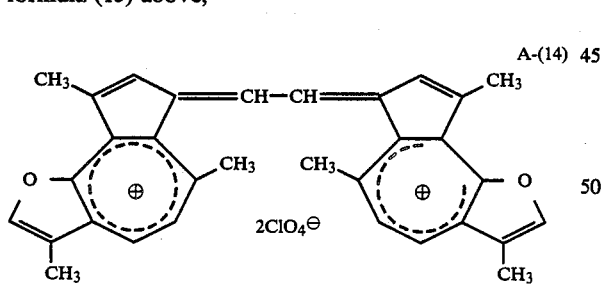
A-(14)
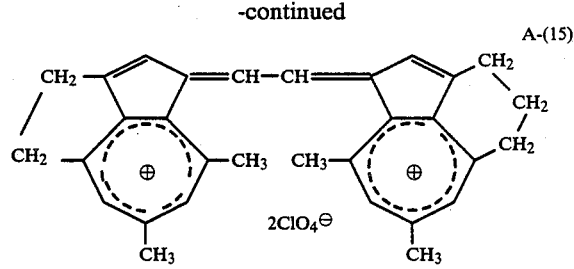
A-(15)
Examples of the compounds represented by general formula (16) above;
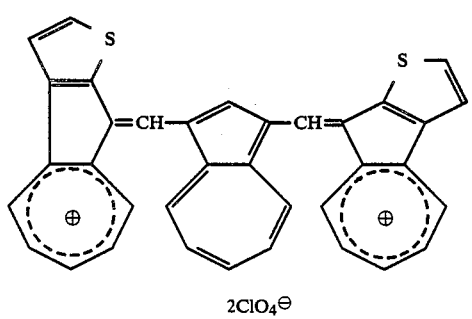
A-(16)

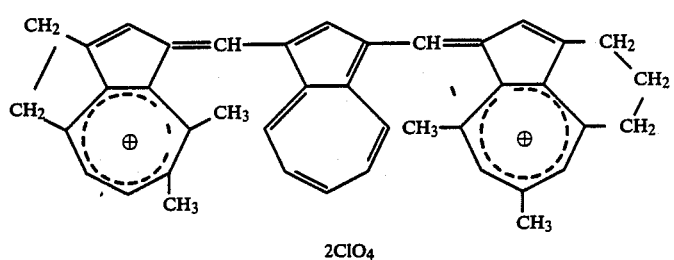
A-(17)
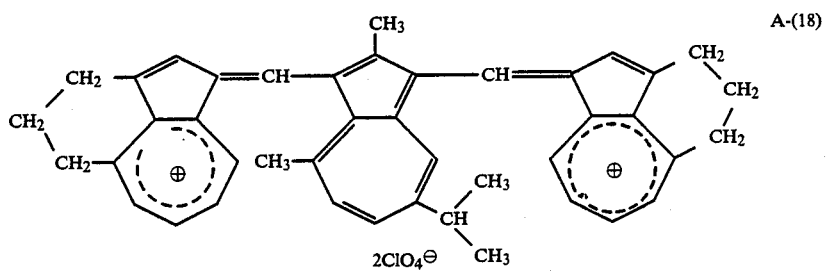
A-(18)
Examples of the compounds represented by general formula (17) above;
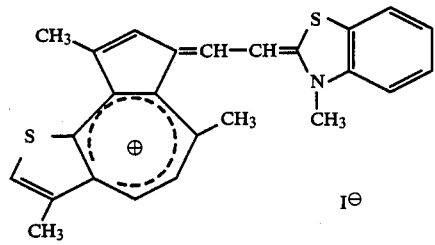
A-(19)
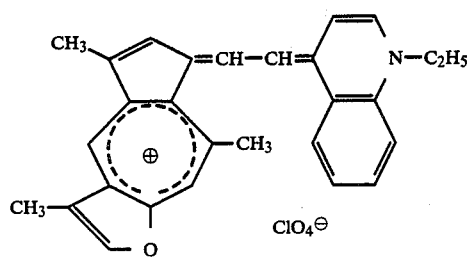
A-(20)
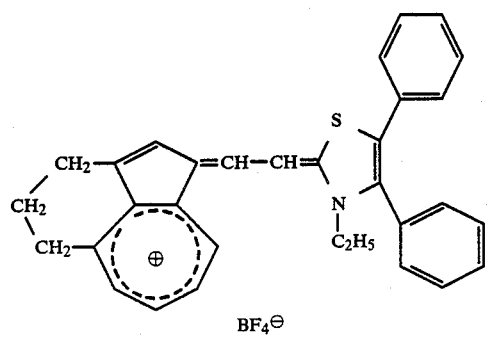
A-(21)
-continued
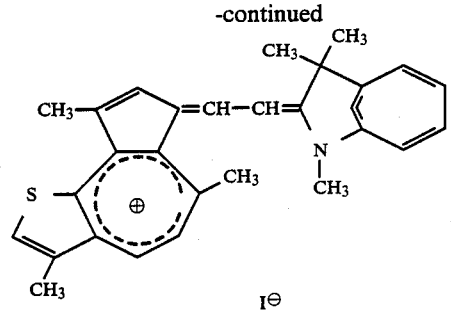
A-(22)
Examples of the compounds represented by general formula (18) above;
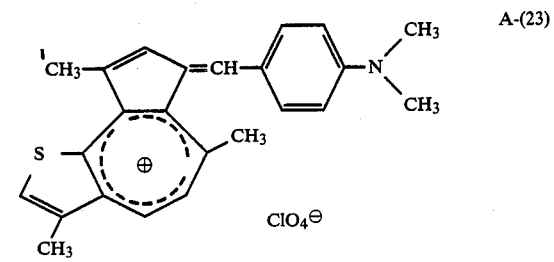
A-(23)
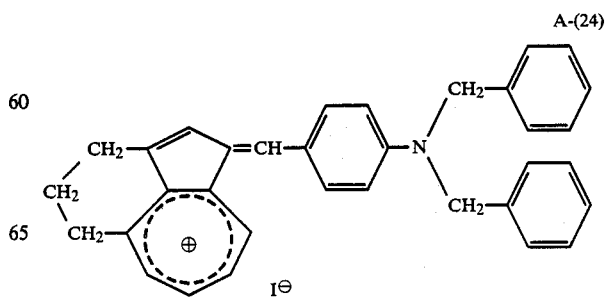
A-(24)

A-(25) 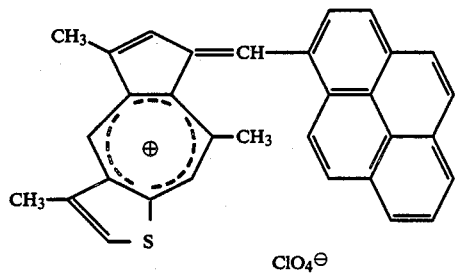
A-(26) 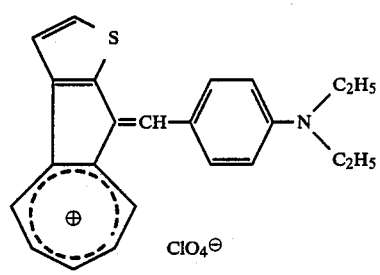
A-(27) 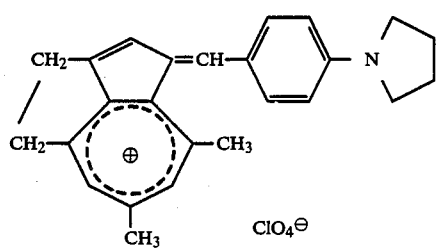
A-(28) 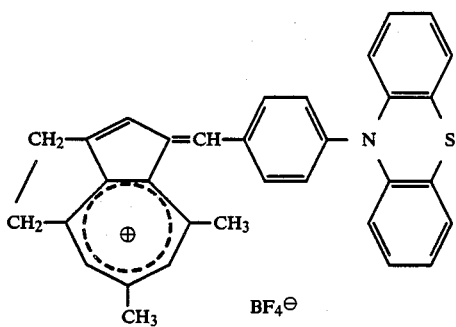
Examples of the compounds represented by general formula (19) above;
A-(29) 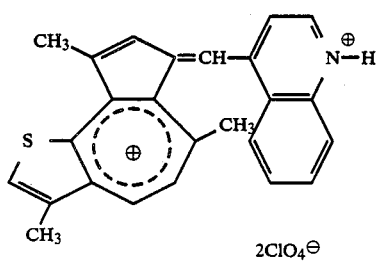
A-(30) 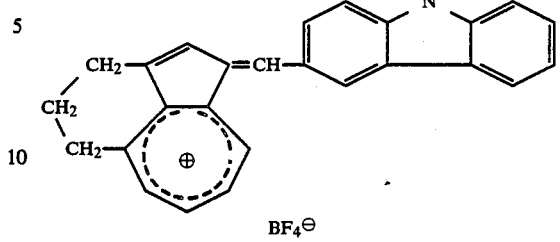
A-(31) 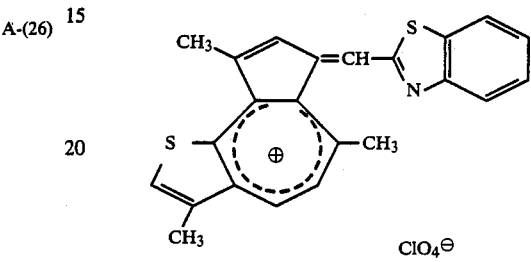
A-(32) 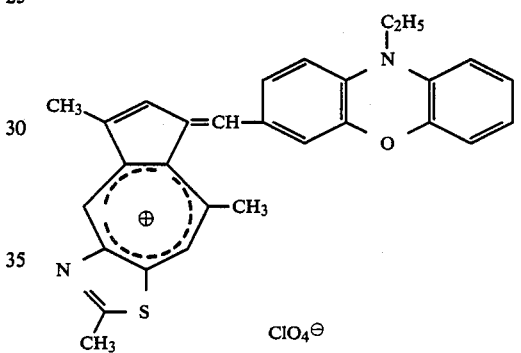
Examples of the compounds represented by general formula (20) above:
A-(33) 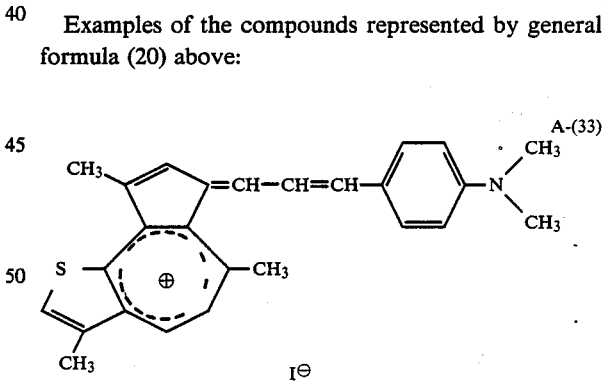
A-(34) 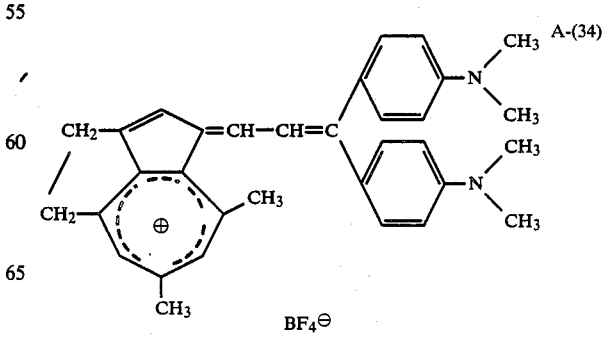

A-(35)
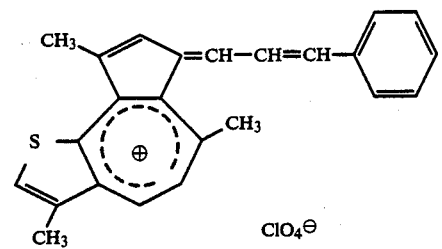
ClO4⊖
A-(36)
A-(40)
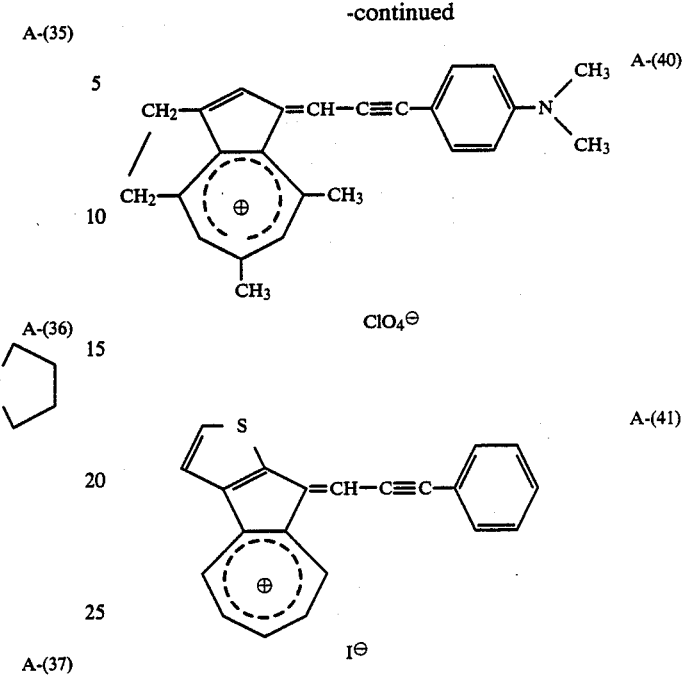
ClO4⊖
A-(41)
A-(37)
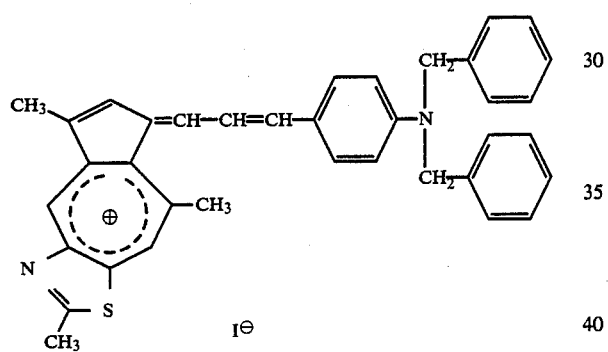
I⊖
Examples of the compound represented by general formula (22) above;
Examples of the compounds represented by general formula (21) above:
A-(42)
A-(38)
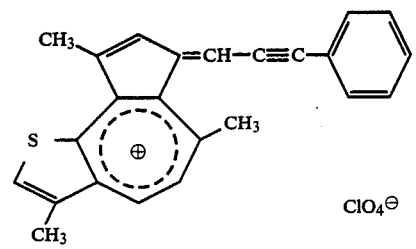
ClO4⊖
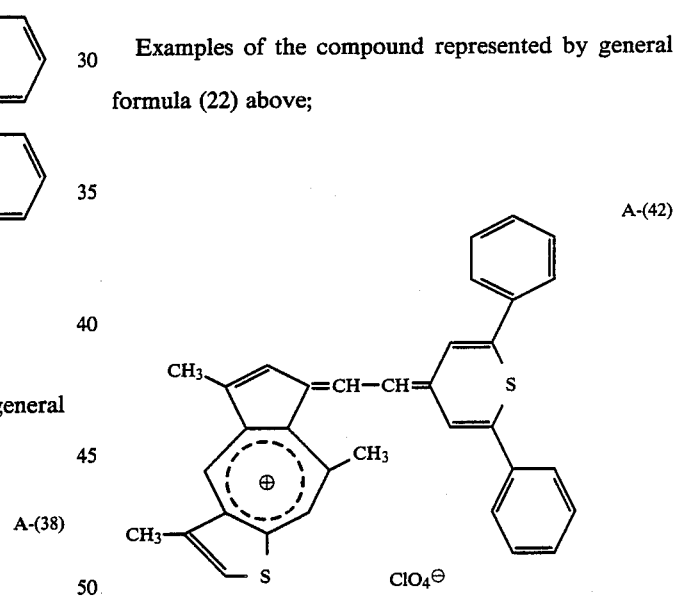
ClO4⊖
A-(39)
A-(43)
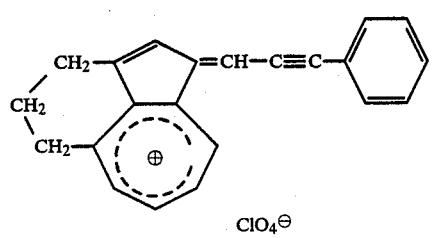
ClO4⊖
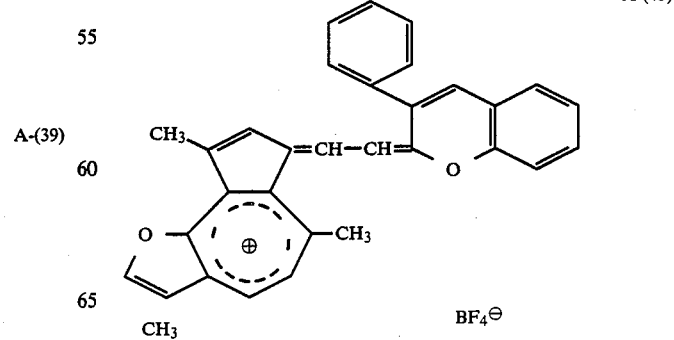
BF4⊖

-continued

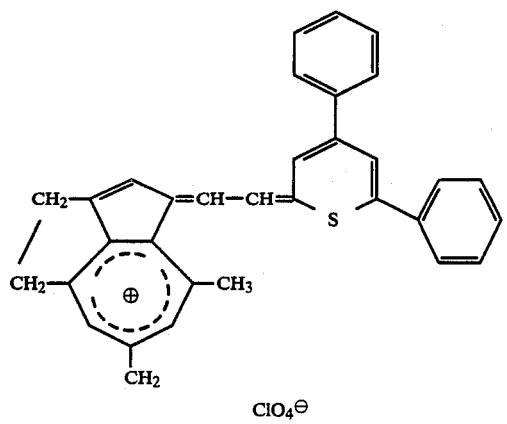
A-(44)

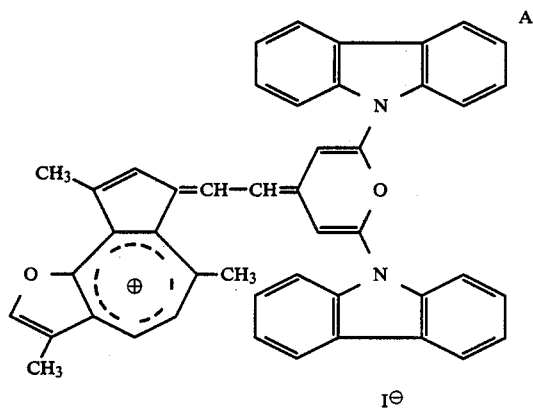
A-(45)

The compound represented by general formula (12) or (13) can be readily obtained by reacting an azulene compound with squaric acid or croconic acid in a suitable solvent as described in Angewandte Chemie, 78, No. 20, p. 937 (1966). The compound represented by general formula (14) where n is 0 can be obtained by heating a 1-formylazulene compound and an azulene compound in a suitable solvent in the presence of a strong acid as described in Journal of the Chemical Society, p. 501 (1960), or by mixing a 1-ethoxymethylene azulenium salt with an azulene compound in a suitable solvent as described in Journal of the Chemical Society, pp. 1724–1730 (1961), or by heating 2-hydroxymethylenecyclohexanone and an azulene compound in a suitable solvent in the presence of a strong acid as described in Journal of the Chemical Society, p. 359 (1961). The compound represented by general formula (14) where n is 1 or 2 can be obtained by mixing an azulene compound with a malondialdehyde compound or with a glutacondialdehyde compound in a suitable solvent in the presence of a strong acid as described in Journal of the Chemical Society, pp. 3591–3592 (1961).

The compound represented by general formula (15) can be readily obtained by heating an azulene compound and glyoxal in a suitable solvent in the presence of a strong acid as described in Journal of the Chemical Society, p. 3588 (1961).

The compound represented by general formula (16) can be obtained by heating a 1,3-diformylazulene compound and an azulene compound in a suitable solvent in the presence of a strong acid as described in Journal of the Chemical Society, p. 501 (1960).

The compound represented by general formula (17) can be obtained by heating a 1-formylazulene compound and the quaternary ammonium salt of a heterocyclic compound having an active methyl group in a suitable solvent as described in Journal of Chemical Society, pp. 163–167 (1961).

The compound represented by general formula (18), (19), (20), or (21) can be obtained by mixing an azulene compound and the corresponding aldehyde in a suitable solvent in the presence of a strong acid as described in Journal of Chemical Society, pp. 1110–1117 (1958), pp. 494–501 (1960), or pp. 3579–3593 (1961).

The compound represented by general formula (22) can be obtained by reacting a 1-formylazulene compound and a compound represented by the general formula:

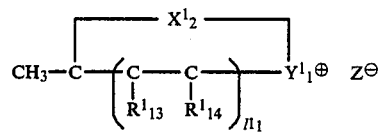
(23)

wherein $X^1_2$, $Y^1_1$, $R^1_{13}$, $R^1_{14}$, $Z^\ominus$, and $1^1_1$ are the same as above, in a solvent.

Suitable solvents for these reactions may include alcohols, e.g. ethanol, butanol, and benzyl alcohol; nitriles, e.g. acetonitrile and propionitrile; carboxylic acids, e.g. acetic acid; acid anhydrides, e.g. acetic anhydride; and alicylic ethers, e.g. dioxane and tetrahydrofuran. Mixtures of butanol, benzyl alcohol, or the like with an aromatic hydrocarbon, e.g. benzene, can also be used. The reaction temperature can be selected from between room temperature and the boiling point of the solvent used.

Other examples of the azulenium salts used in the present invention are those represented by the general formulae:

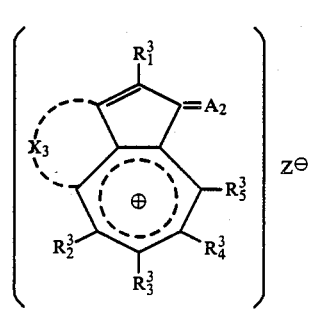
(V)

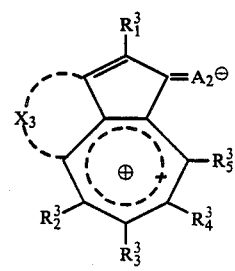
(VI)

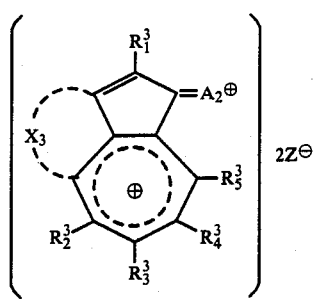

(VII)

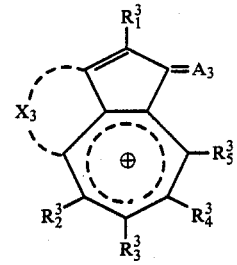

and the portion on the right side of $Q^{\oplus}$ represents $A_2$.

General formula (1):

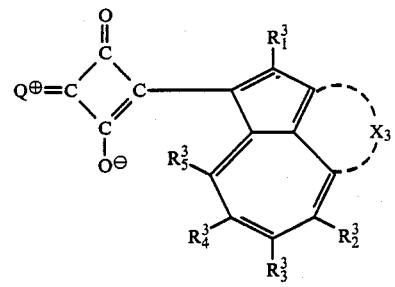

In general formulae (V), (VI), and (VII), $R^3_1$ to $R^3_5$ each represent hydrogen, halogen (e.g. chlorine, bromine, or iodine), or organic monovalent radical; and $X_3$ represents an atomic group necessary to form a substituted or unsubstituted 5-, 6-, or 7-membered aromatic ring. The organic monovalent radical can be selected from a wide variety of radicals, but preferably can be selected from alkyl (e.g. methyl, ethyl, n-propyl, isopropyl, n-butyl, t-butyl, n-amyl, n-hexyl, n-octyl, 2-ethylhexyl, and t-octyl), alkoxy (e.g. methoxy, ethoxy, propoxy, and butoxy), substituted or substituted aryl (e.g. phenyl, tolyl, xylyl, ethylphenyl, methoxyphenyl, ethoxyphenyl, chlorophenyl, nitrophenyl, dimethylaminophenyl, α-naphthyl, and β-naphthyl), substituted or unsubstituted heterocyclic radical (e.g. pyridyl, quinolyl, carbazolyl, furyl, thienyl, and pyrazolyl), substituted or unsubstituted aralkyl (e.g. benzyl, 2-phenylethyl, 2-phenyl-1-methylethyl, bromobenzyl, 2-bromophenylethyl, methylbenzyl, methoxybenzyl, and nitrobenzyl), acyl (e.g. acetyl, propionyl, butyryl, valeryl, benzoyl, toluoyl, naphthoyl, phthaloyl, and furoyl), substituted or unsubstituted amino (e.g. amino, dimethylamino, diethylamino, dipropylamino, acetylamino, and benzoylamino), substituted or unsubstituted styryl (e.g styryl, dimethylaminostyryl, diethylaminostyryl, dipropylaminostyryl, methoxystyryl, ethoxystyryl, and methylstyryl), nitro, hydroxyl, mercapto, thioether radical, carboxyl, carboxylic ester radical, carboxylic acid amide radical, cyano, and substituted or unsubstituted arylazo radical (e.g. phenylazo, α-naphthylazo, β-naphthylazo, dimethylaminophenylazo, chlorophenylazo, nitrophenylazo, methoxyphenylazo, and tolylazo). At least one of the combinations of $R^3_1$ and $X_3$, which is an aromatic ring as stated above, $X_3$ and $R^3_2$, $R^3_2$ and $R^3_3$, $R^3_3$ and $R^3_4$, and $R^3_4$ and $R^3_5$, conjointly with the adjacent carbon atoms, may form a substituted or unsubstituted aromatic ring (e.g. benzene, napthalane, chlorobenzene, ethylbenzene, or methoxybenzene ring), heterocyclic ring (e.g. furan, benzofuran, pyrrole, thiophene, pyridine, or quinoline ring), or ring formed of aliphatic chain (e.g. dimethylene, trimethylene, or tetramethylene). $A_2$ represents an organic divalent radical linked by a double bond to the 5-membered ring. Examples of the compound containing such $A_2$ of the present invention are represented by the following general formulae (1) to (11), wherein $Q^{\oplus}$ represents the azulenium skeleton:

In this formula, $R^3_1$ to $R^3_5$ and $X_3$ are as defined above.

General formula (2);

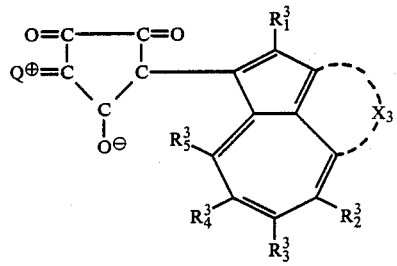

In this formula, $R^3_1$ to $R^3_5$ and $X_3$ are as defined above.

General formula (3);

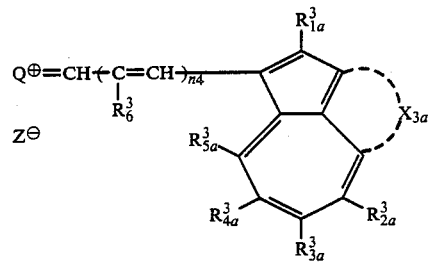

In this formula, $R^3_{1a}$ to $R^3_{5a}$ each represent hydrogen, halogen (e.g. chlorine, bromine, or iodine), or organic monovalent radical; and $X_{3a}$ represents an atomic group necessary to form a substituted or unsubstituted 5-, 6-, or 7-membered aromatic ring. The organic monovalent radical can be selected from a wide variety of radicals, but preferably can be selected from alkyl (e.g. methyl, ethyl, n-propyl, isopropyl, n-butyl, t-butyl, n-amyl, n-hexyl, n-octyl, 2-ethylhexyl, and t-octyl), alkoxyl (e.g.

methoxy, ethoxy, propoxy, and butoxy), substituted or unsubstituted aryl (e.g. phenyl, tolyl, xylyl, ethylphenyl, methoxyphenyl, ethoxyphenyl, chlorophenyl, nitrophenyl, dimethylaminophenyl, α-napthyl, and β-naphthyl), substituted or unsubstituted heterocyclic radical (e.g. pyridyl, quinolyl, carbazolyl, furyl, thienyl, and pyrrazolyl), substituted or unsubstituted aralkyl (e.g. benzyl, 2-phenylethyl, 2-phenyl-1-methylethyl, bromobenzyl, 2-bromophenylethyl, methylbenzyl, methoxybenzyl, and nitrobenzyl), acyl (e.g. acetyl, propionyl, butyryl, valeryl, benzoyl, toluoyl, naphthoyl, phthaloyl, and furoyl), substituted or unsubstituted amino (e.g. amino, dimethylamino, diethylamino, dipropylamino, acetylamino, and benzoylamino), substituted or unsubstituted styryl (e.g. styryl, dimethylaminostyryl, diethylaminostyryl, dipropylaminostyryl, methoxystyryl, ethoxystyryl, and methylstyryl), nitro, hydroxy, mercapto, thioether radical, carboxyl, carboxylic ester radical, carboxylic acid amide radical, cyano, and substituted or unsubstituted arylazo radical (e.g. phenylazo, α-naphthylazo, β-naphthylazo, dimethylaminophenylazo, chlorophenylazo, nitrophenylazo, methoxyphenylazo, and tolylazo). At least one of the combinations of $R^3_{1a}$ and $X_{3a}$, which is an aromatic ring, $X_{3a}$ and $R^3_{2a}$, $R^3_{2a}$ and $R^3_{3a}$, $R^3_{3a}$ and $R^3_{4a}$, and $R^3_{4a}$ and $R^3_{5a}$ may form a substituted or unsubstituted aromatic ring (e.g. benzene, naphthalene, chlorobenzene, ethylbenzene, or methoxybenzene ring), heterocyclic ring (e.g. furan, benzofuran, pyrrole, thiophene, pyridine, or quinoline ring), or ring formed of aliphatic chain (e.g. dimethylene, trimethylene, or tetramethylene) together with the adjacent carbon atoms.

The azulenium skeleton represented by $Q^{\oplus}$ and the azulene skeleton on the right side may be either symmetrical or asymmetrical; $Z^{\ominus}$ represents an anion, $R^3_6$ represents hydrogen, nitro, cyano, alkyl (e.g. methyl, ethyl, propyl, or butyl) or aryl (e.g. phenyl, tolyl, or xylyl), and $n_4$ represents 0, 1, or 2.

General formula (4):

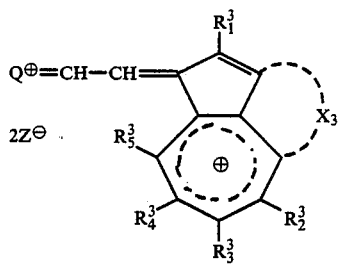

In this formula, $R^3_1$ to $R^3_5$, $X_3$ and $Z^{\ominus}$ are as defined above.

General formula (5):

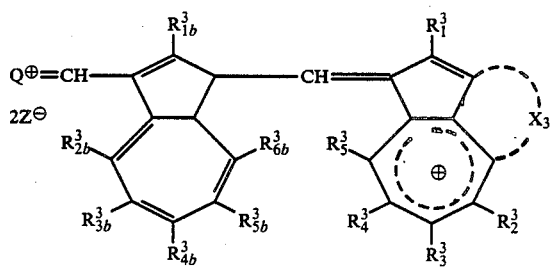

In this formula, $R^3_1$ to $R^3_5$, $X_3$, and $Z^{\ominus}$ are as defined above; and $R^3_{1b}$ to $R^3_{6b}$ each represent hydrogen, halogen (e.g. chlorine, bromine, or iodine), or organic monovalent radical. This organic monovalent radical can be selected from a wide variety of radicals, but preferably can be selected from alkyl (e.g. methyl, ethyl, n-propyl, isopropyl, n-butyl, t-butyl, n-amyl, n-hexyl, n-octyl, 2-ethylhexyl, and t-octyl), alkoxy (e.g. methoxy, ethoxy, propoxy, and butoxy), substituted or unsubstituted aryl (e.g. phenyl, tolyl, xylyl, ethylphenyl, methoxyphenyl, ethoxyphenyl, chlorophenyl, nitrophenyl, dimethylaminophenyl, α-naphthyl, and β-naphthyl), substituted or unsubstituted heterocyclic radical (e.g. pyridyl, quinolyl, carbazolyl, furyl, thienyl, and pyrazolyl), substituted or unsubstituted aralkyl (e.g. benzyl, 2-phenylethyl, 2-phenyl-1-methylethyl, bromobenzyl, 2-bromophenylethyl, methylbenzyl, methoxybenzyl, and nitrobenzyl), acyl (e.g. acetyl, propionyl, butyryl, valeryl, benzoyl, toluoyl, naphthoyl, phthaloyl, and furoyl), substituted or unsubstituted amino (e.g. amino, dimethylamino, diethylamino, dipropylamino, acethylamino, and benzoylamino), substituted or unsubstituted styryl (e.g. styryl, dimethylaminostyryl, diethylaminostyryl, dipropylaminostyryl, methoxystyryl, ethoxystyryl, and methylstyryl), nitro, hydroxyl, mercapto, thioether radical, carboxyl, carboxylic ester radical, carboxylic acid amide radical, cyano, and substituted or unsubstituted arylazo radical (e.g. phenylazo, α-naphthylazo, β-naphthylazo, dimethylaminophenylazo, chlorophenylazo, nitrophenylazo, methoxyphenylazo, and tolylazo). At least one of the combinations of $R^3_{2b}$ and $R^3_{3b}$, $R^3_{3b}$ and $R^3_{4b}$, $R^3_{4b}$ and $R^3_{5b}$, and $R^3_{5b}$ and $R^3_{6b}$, conjointly with the adjacent carbon atoms, may form a substituted or unsubstituted aromatic ring (e.g. benzene, naphthalene, chlorobenzene, ethylbenzene, or methoxybenzene ring), heterocyclic ring (e.g. furan, benzofuran, pyrrole, thiophene, pyridine, or quinoline ring), or ring formed of aliphatic chain (e.g. dimethylene, trimethylene, or tetramethylene).

General formula (6):

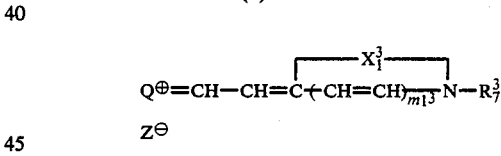

In this formula; $X^3_1$, represents a non-metallic atom group necessary to form a nitrogen-containing heterocyclic ring (e.g. pyridine, thiazole, benzothiazole, oxazole, benzoxazole, naphthoxazole, imidazol, benzimidazol, naphthimidazol 2-quinoline, 4-quinoline, isoquinoline, or indole ring) which may be substituted by halogen (e.g. chlorine, bromine, or iodine), alkyl (e.g. methyl, ethyl, propyl, or butyl), or aryl (e.g. phenyl, tolyl, or xylyl), $R^3_7$ represents alkyl (e.g. methyl, ethyl, propyl, or butyl), substituted alkyl (e.g. 2-hydroxyethyl, 2-methoxyethyl, 2-ethoxyethyl, 3-hydroxypropyl, 3-methoxypropyl, 3-ethoxypropyl, 3-chloropropyl, 3-bromopropyl, or 3-carboxypropyl), cycloalkyl (e.g. cyclohexyl or cyclopropyl), allyl, aralkyl (e.g. benzyl, 2-phenylethyl, 3-phenylpropyl, 4-phenylbutyl, α-naphthylmethyl, or β-naphthyl), substituted aralkyl (e.g. methylbenzyl, ethylbenzyl, dimethylbenzyl, trimethylbenzyl, chlorobenzyl, or bromobenzyl), aryl (e.g. phenyl, tolyl, xylyl, α-naphthyl, or β-naphthyl), or substituted aryl e.g. chlorophenyl, dichlorophenyl, trichlorophenyl, ethylphenyl, methoxyphenyl, dimethoxyphenyl, aminophenyl, nitrophenyl, or hydroxyphenyl); $m^3_1$ represents 0 or 1; and $Z^\ominus$ is as defined above.

General formula (7):

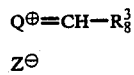

In this formula, $R^3_8$ represents substituted or unsubstituted aryl (e.g. phenyl, tolyl, xylyl, biphenylyl, α-naphthyl, β-naphthyl, anthryl, pyrenyl, methoxyphenyl, dimethoxyphenyl, trimethoxyphenyl, ethoxyphenyl, diethoxyphenyl, chlorophenyl, trichlorophenyl, bromophenyl, dibromophenyl, tribromophenyl, ethylphenyl, diethylphenyl, nitrophenyl, aminophenyl, dimethylaminophenyl, diethylaminophenyl, dibenzylaminophenyl, dipropylaminophenyl, morpholinophenyl, piperidinylphenyl, piperazinophenyl, diphenylaminophenyl, acetylaminophenyl, benzoylaminophenyl, acetylphenyl, benzoylphenyl, or cyanophenyl); and $Z^\ominus$ is as defined above.

General formula (8):

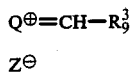

In this formula, $R^3_9$ represents a monovalent heterocyclic radical derived from furan, thiophene, benzofuran, thionaphthene, dibenzofuran, carbazole, phenothiazine, phenoxazine, pyridine, or the like; and $Z^\ominus$ is as defined above.

General formula (9):

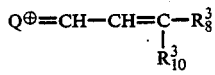

In this formula, $R^3_{10}$ represents hydrogen, alkyl (e.g. methyl, ethyl, propyl, or butyl) or substituted or unsubstituted aryl (e.g. phenyl, tolyl, xylyl, biphenylyl, ethylphenyl, chlorophenyl, methoxyphenyl, ethoxyphenyl, nitrophenyl, aminophenyl, dimethylaminophenyl, α-naphthyl, β-naphthyl, anthryl, or pyrenyl); and $R^3_8$ and $Z^\ominus$ are as defined above.

General formula (10):

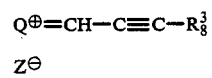

In this formula, $R^3_8$ and $Z^\ominus$ are as defined above.

General formula (11):

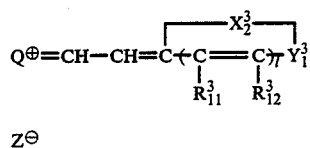

In this formula; $X^3_2$ represents an atomic group necessary to form a substituted or unsubstituted pyrane, thiapyrane, selenapyrane, benzopyrane, benzothiapyrane, benzoselenapyrane, naphthopyrane, naphthothiapyrane, or naphthoselenapyrane, radical; l represents 0 or 1; $Y^3_1$ represents sulfur, oxygen, or selenium; $R^3_{11}$ and $R^3_{12}$ each represent hydrogen, alkyl (e.g. methyl, ethyl, propyl, or butyl), alkoxyl (e.g. methoxy, ethoxy, propoxy, or butoxy), substituted or unsubstituted aryl (e.g. phenyl, tolyl, xylyl, chlorophenyl, biphenylyl, or methoxyphenyl), substituted or unsubstituted styryl (e.g. styryl, p-methylstyryl, o-chlorostyryl, or p-methoxystyryl), substituted or unsubstituted 4-phenyl-1,3-butadienyl (e.g. 4-phenyl-1,3-butadienyl), or substituted or unsubstituted heterocyclic radical (e.g. quinolyl, pyridyl, carbozolyl, or furyl); and $Z^\ominus$ is an anion.

Examples of $Z^\ominus$ in the foregoing general formulae are anions including perchlorate, fluoroborate, sulfoacetate, iodide, chloride, bromide, p-toluenesulfonate, alkylsulfonate, alkyldisulfonate, benzenedisulfonate, halosulfonate, pycrate, tetracyanoethylene anion, and tetracyanoquinodimethane anion.

Examples of the azulenium salts of formulae (1) to (11) used in the present invention are listed below.

Examples of the compounds represented by general formula (1) above:

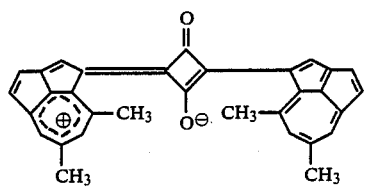

B-(1)

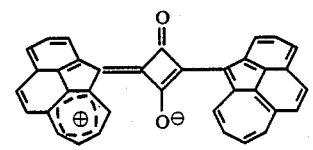

B-(2)

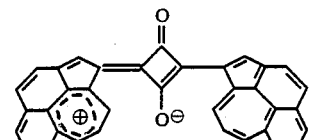

B-(3)

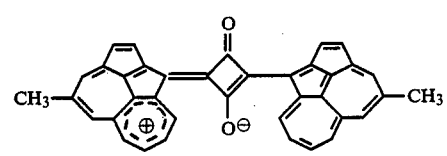

B-(4)

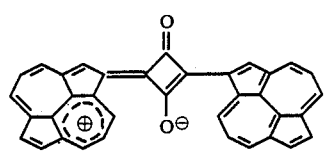

B-(5)

Examples of the compounds represented by general formula (2) above:

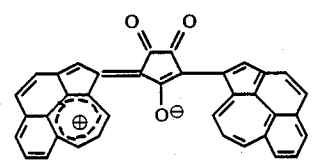

B-(6)

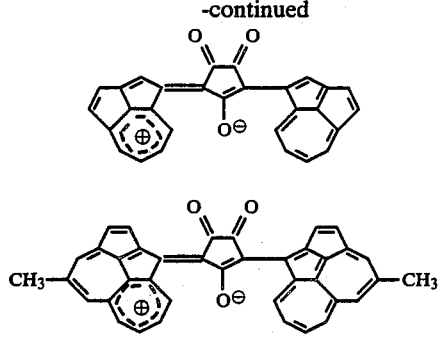 B-(7)
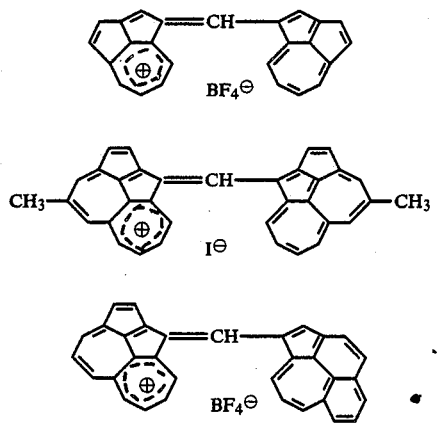 B-(8)
Examples of the compounds represented by general formula (3) above;
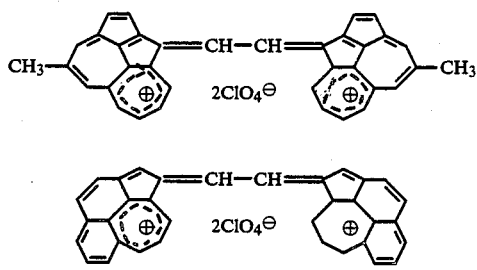 B-(9), B-(10), B-(11)
Examples of the compounds represented by general formula (4) above;
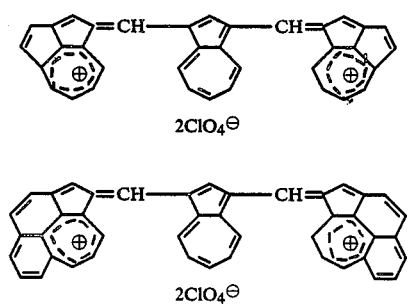 B-(12), B-(13)
Examples of the compounds represented by general formula (5) above;
B-(14)
B-(15)
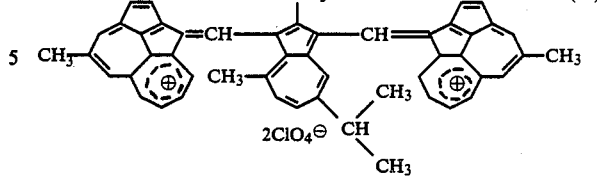 B-(16)
Examples of the compounds represented by general formula (6) above;
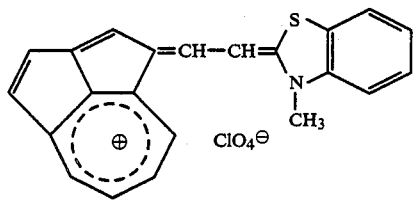 B-(17)
B-(18)
B-(19)
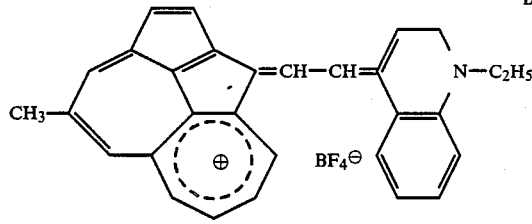 B-(20)
Examples of the compounds represented by general formula (7) above;
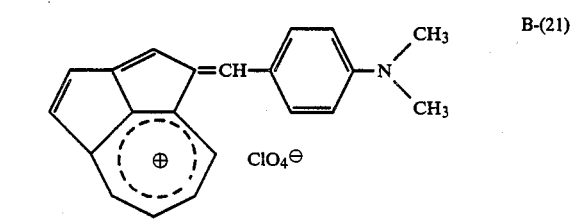 B-(21)

Examples of the compounds represented by general formula (8) above;

Examples of the compounds represented by general formula (9) above;

Examples of the compounds represented by general formula (10) above;

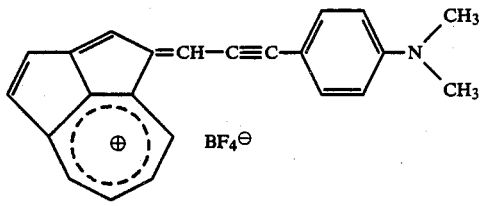
B-(37)

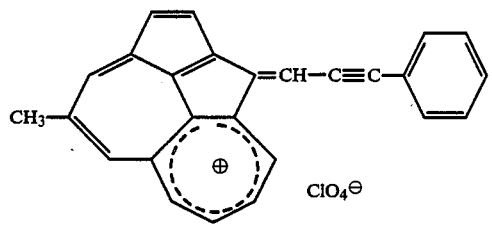
B-(38)

Examples of the compounds represented by general formula (11) above:

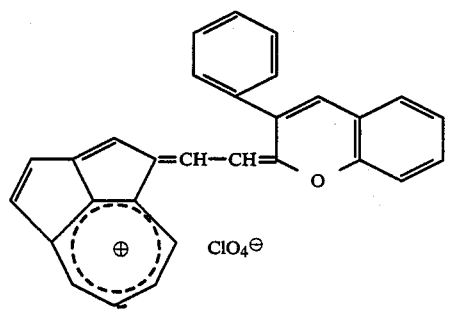
B-(39)

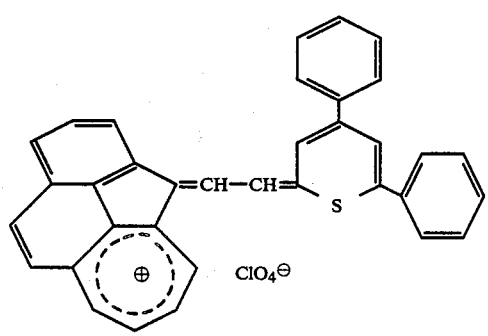
B-(40)

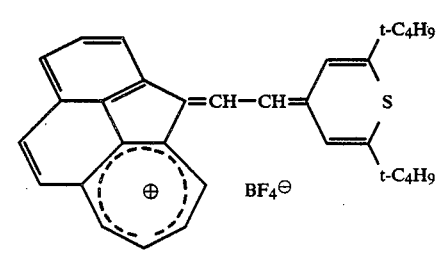
B-(41)

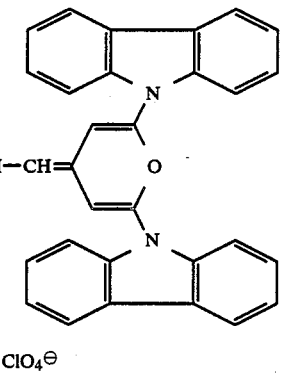
B-(42)

The compound represented by general formula (1) or (2) can be readily obtained by reacting an azulene compound with squaric acid or croconic acid in a suitable solvent as described in Angewandte Chemie, 78, No. 20, P. 937 (1966). The compound represented by general formula (3) where n is 0 can be obtained by heating a 1-formylazulene compound and an azulene compound in a suitable solvent in the presence of a strong acid as described in Journal of the Chemical Society, p. 501 (1960), or by mixing a 1-ethoxymethyleneazulenium salt with an azulene compound in a suitable solvent as described in the same journal, pp. 1724–1730 (1961), or by heating 2-hydroxymethylenecylcohexanone and an azulene compound in a suitable solvent in the presence of a strong acid as described in the same journal, p. 359 (1961). The compound represented by general formula (3) where n is 1 or 2 can be obtained by mixing an azulene compound with a malondialdehyde compound or with a glutacondialdehyde compound in a suitable solvent in the presence of a strong acid as described in the same journal, pp. 3591–3592 (1961).

The compound represented by general formula (4) can be readily obtained by heating an azulene compound and glyoxal in a suitable solvent in the presence of a strong acid as described in the same journal, p. 3588 (1961).

The compound represented by genearl formula (5) can be obtained by heating a 1,3-diformylazulene compound and an azulene compound in a suitable solvent in the presence of a strong acid as described in the same journal, p. 501 (1960).

The compound represented by general formula (6) can be obtianed by heating a 1-formylazulene compound and the quaternary ammonium salt of a heterocyclic compound having an active methyl group in a suitable solvent as described in the same journal, pp. 163–167 (1961).

The compound represented by general formula (7), (8), (9), or (10) can be obtained by mixing an azulene compound and the corresponding aldehyde in a suitable solvent in the presence of a strong acid as described in the same journal, pp. 1110–1117 (1958), pp. 494–501 (1960), or pp. 3579–3593 (1961).

The compound represented by general formula (11) can be obtained by reacting a 1-formylazulene compound and a compound represented by the general formula

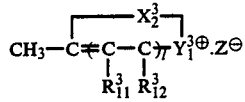 (24)

($X^3_2$, $Y^3_1$, $R^3_{11}$, $R^3_{12}$, $Z^\ominus$, and l are the same as in the foregoing) in a solvent.

Suitable solvents for these reactions are: alcohols, e.g. ethanol, butanol, and benzyl alcohol; nitriles, e.g. acetonitrile and propionitrile; carboxylic acids, e.g. acetic acid; acid anhydrides, e.g. acetic anhydride; and alicyclic ethers, e.g. dioxane and tetrahydrofuran. Mixtures of butanol, benzyl alcohol, or the like with an aromatic hydrocarbon, e.g. benzene, can also be used. The reaction temperature can be selected from between room temperature and the boiling point of the solvent used.

In other preferred embodiments of the present invention, azulenium salts used are represented by the following general formulae (25) to (30).

General formula (25):

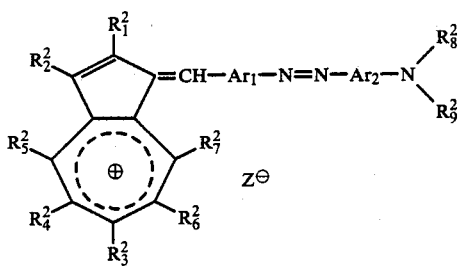

General formula (26):

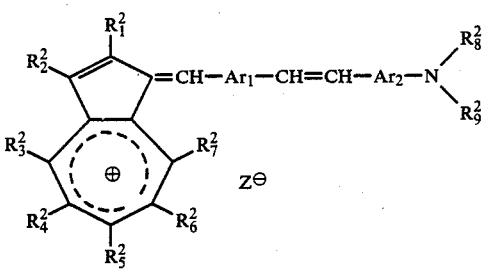

In general formulae (25) and (26), $R^2_1$ to $R^2_7$ each represent hydrogen, halogen (e.g. chlorine, bromine, or iodine), or organic monovalent radical. This organic monovalent radical can be selected from a wide variety of radicals, but preferably can be selected from alkyl (e.g. methyl, ethyl, n-propyl, isopropyl, n-butyl, t-butyl, n-amyl, n-hexyl, n-octyl, 2-ethylhexyl, and t-octyl), alkoxy (e.g. methoxy, ethoxy, propoxy, and butoxy), substituted or unsubstituted aryl (e.g. phenyl, tolyl, xylyl, ethylphenyl, methoxyphenyl, ethoxyphenyl, chlorophenyl, nitrophenyl, dimethylaminophenyl, α-naphthyl, and β-naphthyl), substituted or unsubstituted heterocyclic radical (e.g. pyridyl, quinolyl, carbazolyl, furyl, thienyl, and pyrazolyl), substituted or unsubstituted aralkyl (e.g. benzyl, 2-phenylethyl, 2-phenyl-1-methylethyl, bromobenzyl, 2-bromophenylethyl, methylbenzyl, methoxybenzyl, and nitrobenzyl), acyl (e.g. acetyl, propionyl, butyryl, valeryl, benzoyl, toluoyl, naphthoyl, phthaloyl, and furoyl), substituted or unsubstituted amino (e.g. amino, dimethylamino, diethylamino, dipropylamino, acetylamino, and benzoylamino), substituted or unsubstituted styryl (e.g. styryl, dimethylaminostyryl, diethylaminostyryl, dipropylaminostyryl, methoxystyryl, ethoxystyryl, and methylstyryl), nitro, hydroxyl, mercapto, thioether radical, carboxyl, carboxylic ester radical, carboxylic acid amide radical, cyano, and substituted or unsubstituted arylazo radical (e.g. phenylazo, α-naphthylazo, β-naphthylazo, dimethylaminophenylazo, chlorophenylazo, nitrophenylazo, methoxyphenylazo, and tolylazo). At least one of the combinations of $R^2_1$ and $R^2_2$, $R^2_2$ and $R^2_3$, $R^2_3$ and $R^2_4$, $R^2_4$ and $R^2_5$, $R^2_5$ and $R^2_6$, and $R^2_6$ and $R^2_7$, conjointly with the adjacent carbon atoms, may form a substituted or unsubstituted 5-, 6-, or 7-membered ring including an aromatic ring, heterocyclic ring, and ring formed by aliphatic chain.

$R^2_8$ and $R^2_9$ each represent substituted or unsubstituted alkyl (e.g. methyl, ethyl, n-propyl, isopropyl, n-butyl, t-butyl, n-amyl, n-hexyl, n-octyl, 2-ethylhexyl, or t-octyl), substituted or unsubstituted aryl (e.g. phenyl, tolyl, xylyl, ethylphenyl, chlorophenyl, nitrophenyl, methoxyphenyl, ethoxyphenyl, α-naphthyl, or β-naphthyl), or substituted or unsubstituted aralkyl (e.g. benzyl, 2-phenylethyl, 2-phenyl-1-methylethyl, methylbenzyl, methoxybenzyl, or nitrobenzyl), or $R^2_8$ and $R^2_9$ may be joined together with the adjacent nitrogen atom to form a 5- or 6-membered ring (e.g. morpholino, pyrrolidino, piperidinyl, piperazino, phenothiazino, phenoxazino, carbazolyl, indolyl, pyrrolyl, or pyrazolyl).

$Ar_1$ and $Ar_2$ each represent substituted or unsubstituted arylene (e.g. phenylene, 1,4-naphthylene, 1,5-naphthylene, or 9,10-anthrylene), wherein acceptable substituents are alkyl (e.g. methyl, ethyl, n-propyl, isopropyl, n-butyl, t-butyl, n-hexyl, and 2-ethylhexyl), alkoxy (e.g. methoxy, ethoxy, propoxy, and butoxy), and halogen (e.g. chlorine, bromine, and iodine).

$Z^\ominus$ represents an anion, e.g. perchlorate, fluoroborate, sulfoacetate, iodide, chloride, bromide, p-toluenesulfonate, alkylsulfonate, alkyldisulfonate, benzenedisulfonate, halosulfonate, picrate, tetracyanoethylene anion, or tetracyanoquinodimethane anion.

Examples of the azulenium salts of general formulae (25) and (26) are listed below.

Examples of the compounds represented by general formula (25):

| Compound | Formula of Compound |
|---|---|
| C-(1) |  |

-continued
| Compound | Formula of Compound |
|---|---|
| C-(2) | 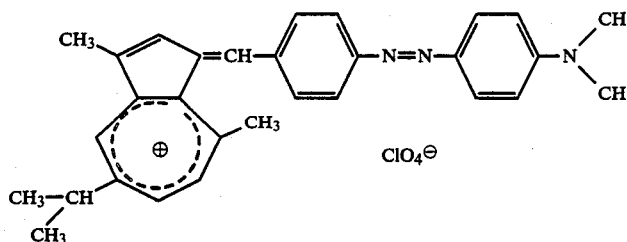 |
| C-(3) | 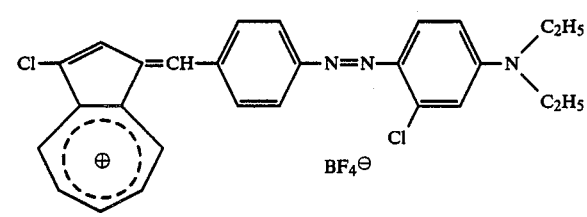 |
| C-(4) | 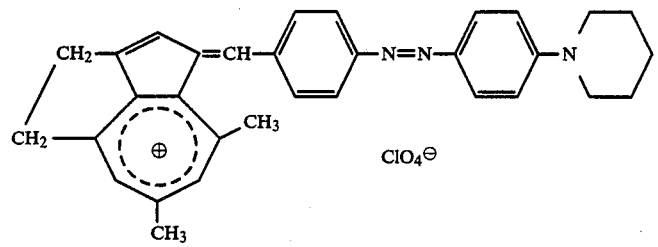 |
| C-(5) | 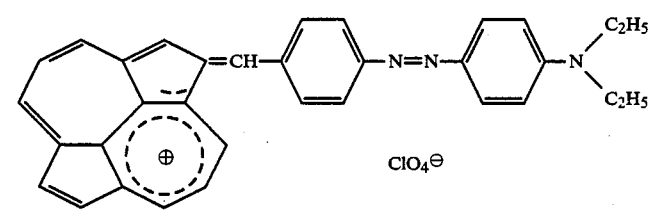 |
| C-(6) | 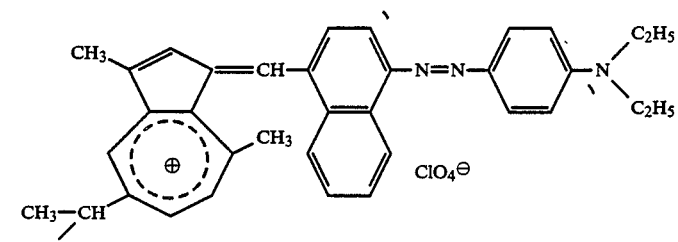 |
| C-(7) | 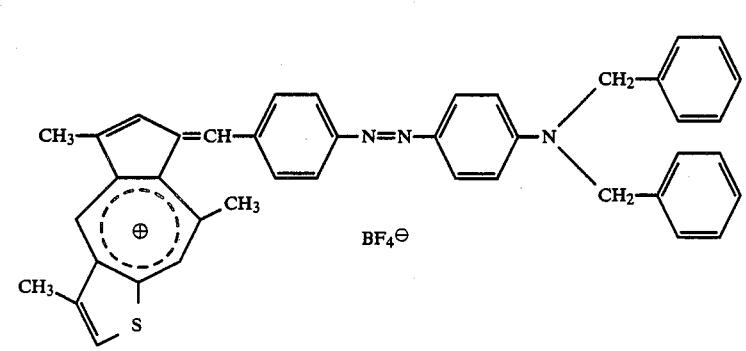 |

-continued

| Compound | Formula of Compound |
|---|---|
| C-(8) | |
| C-(9) | |
| C-(10) | |
| C-(11) | |
| C-(12) | |

-continued

| Compound | Formula of Compound |
|---|---|
| C-(13) | [structure with azulenium cation bearing CH₃ groups, N=C(CH₃)-S substituent, =CH- linker to phenyl-N=N-phenyl-N(indoline); ClO₄⁻] |
| C-(14) | [structure with azulenium cation bearing two CH₃ groups and phenyl substituent, =CH- linker to phenyl-N=N-phenyl-N(CH₃)₂; ClO₄⁻] |
| C-(15) | [fused tricyclic azulenium cation, =CH- linker to phenyl-N=N-phenyl-N(C₂H₅)₂; ClO₄⁻] |
| C-(16) | [azulenium cation with NO₂ and three CH₃ substituents, =CH- linker to phenyl-N=N-phenyl-N(CH₃)₂; ClO₄⁻] |
| C-(17) | [azulenium cation with two CH₃ and CH(CH₃)₂ (isopropyl) substituents, =CH- linker to phenyl-N=N-phenyl-N-morpholino; ClO₄⁻] |

-continued
| Compound | Formula of Compound |
|---|---|
| C-(18) | 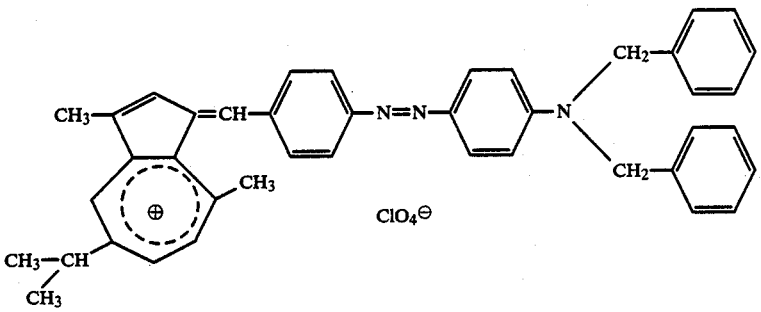 ClO₄⁻ |
| C-(19) | 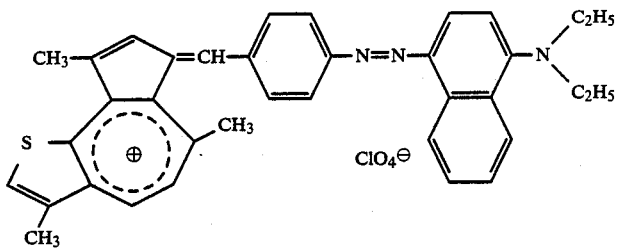 ClO₄⁻ |
| C-(20) | 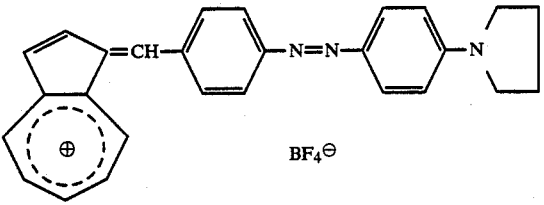 BF₄⁻ |
Examples of the compounds represented by general formula (26):
| Compound | Formula of Compound |
|---|---|
| D-(1) | 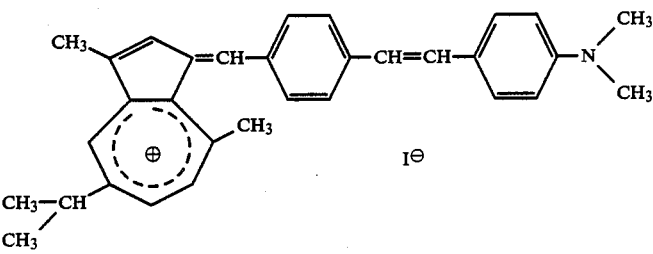 I⁻ |
| D-(2) | 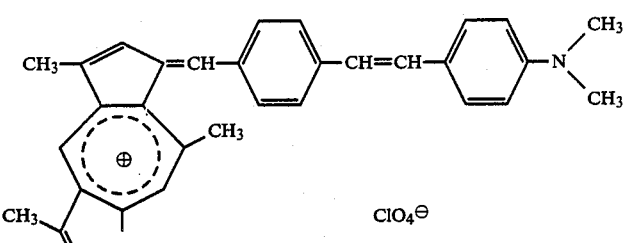 ClO₄⁻ |

| Compound | Formula of Compound |
|---|---|
| D-(3) | 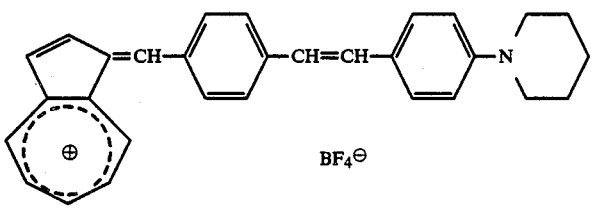 BF$_4^\ominus$ |
| D-(4) | 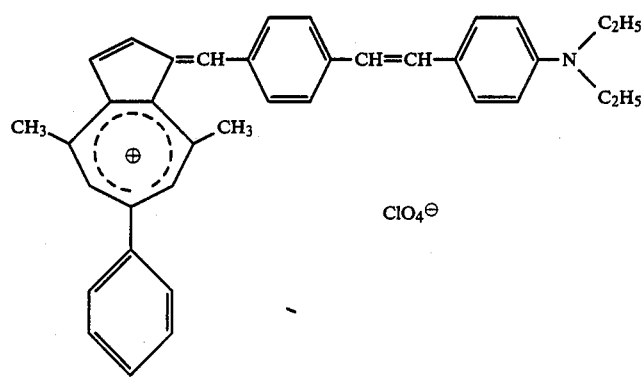 ClO$_4^\ominus$ |
| D-(5) | 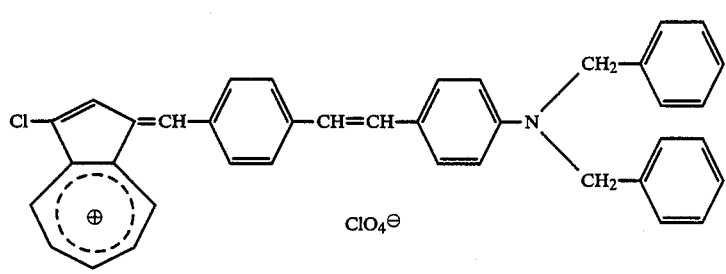 ClO$_4^\ominus$ |
| D-(6) | 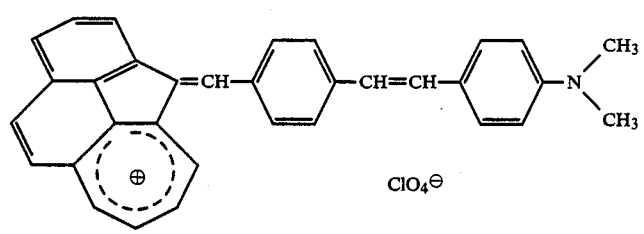 ClO$_4^\ominus$ |
| D-(7) | 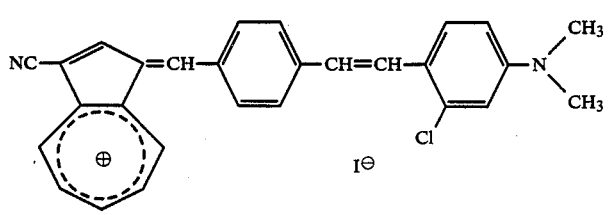 I$^\ominus$ |
| D-(8) | 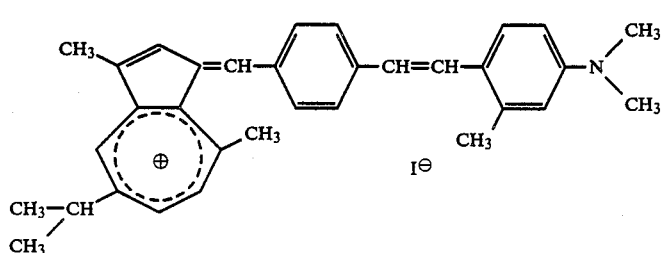 I$^\ominus$ |

| Compound | Formula of Compound |
|---|---|
| D-(9) | 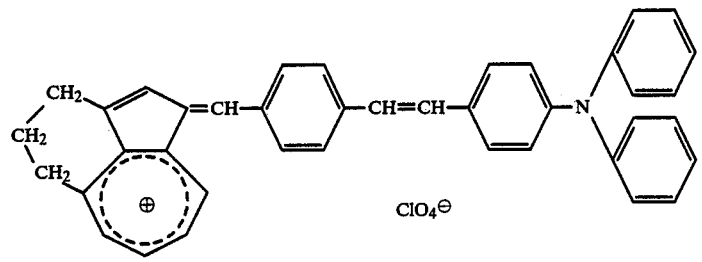 |
| D-(10) | 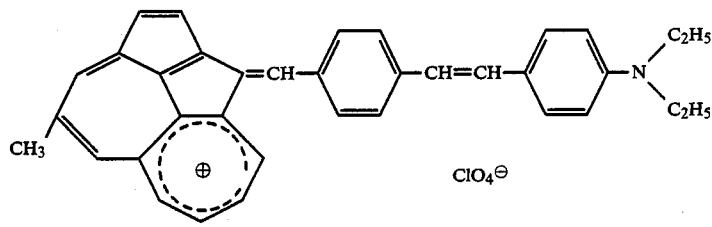 |
| D-(11) | 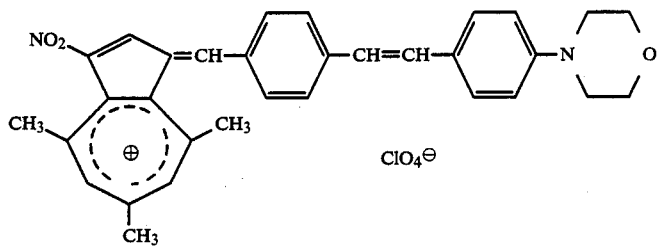 |
| D-(12) | 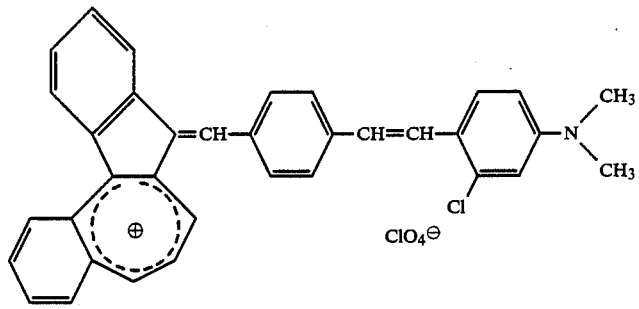 |
| D-(13) | 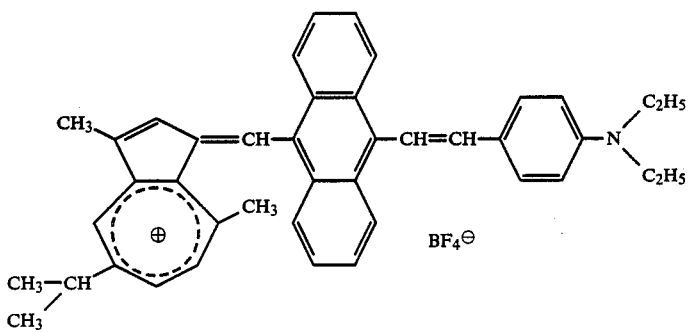 |

-continued

| Compound | Formula of Compound |
|---|---|
| D-(14) | (structure with azulenium cation, CH=CH linkages, and indoline group, ClO₄⁻) |
| D-(15) | (structure with azulenium cation, naphthalene, and N(C₂H₅)₂ group, ClO₄⁻) |
| D-(16) | (structure with azulenium cation and N(CH₃)₂-naphthyl group, ClO₄⁻) |
| D-(17) | (structure with acenaphthylene-type cation and N(C₂H₅)₂ group, ClO₄⁻) |
| D-(18) | (structure with azulenium cation bearing thiazoline group and N(CH₃)₂ group, ClO₄⁻) |

The compound represented by general formula (25) or (26) can be obtained by mixing an azulene compound and the corresponding aldehyde compound in a suitable solvent in the presence of a strong acid as described in Journal of the Chemical Society, pp. 1110–1117 (1958), pp. 494–501 (1960), or pp. 3579–3593 (1961).

Suitable solvents for the above reaction are: alcohols, e.g. ethanol, butanol, and benzyl alcohol; nitriles, e.g. acetonitrile and propionitrile; carboxylic acids, e.g. acetic acid; acid anhydride, e.g. acetic anhydride; and alicyclic ethers, e.g. dioxane and tetrahydrofuran. Mixtures of butanol, benzyl alcohol, or the like with an aromatic hydrocarbon, e.g. benzene, can also be used. The reaction temperature is selected from between room temperature and the boiling point of the solvent used.

General formula (27):

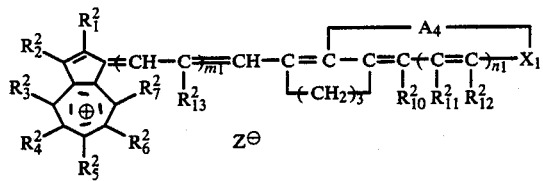

In this formula; $R^2_1$ to $R^2_7$ are the same as $R^2_1$ to $R^2_7$ defined above; $R^2_{10}$, $R^2_{11}$ and $R^2_{12}$ each represent hydrogen, alkyl (e.g. methyl, ethyl, n-propyl, isopropyl, n-butyl, t-butyl, n-amyl, n-hexyl, n-octyl, 2-ethylhexyl, t-octyl, nonyl, or dodecyl), alkoxyl (e.g. methoxy, ethoxy, propoxy, butoxy, amyloxy, hexoxy, or octoxy), substituted or unsubstituted aryl (e.g. phenyl, tolyl, xylyl, ethylphenyl, methoxyphenyl, chlorophenyl, nitrophenyl, dimethylaminophenyl, dibenzylaminophenyl, α-naphthyl, or β-naphthyl), substituted or unsubstituted styryl (e.g. styryl, methoxystyryl, dimethoxystyryl, ethoxystyryl, diethoxystyryl, dimethylaminostyryl, or diethylaminostyryl), substituted or unsubstituted 4-phenyl-1,3-butadienyl (e.g. 4-phenyl-1,3-butadienyl, 4-(p-dimethylaminophenyl)-1,3-butadienyl, or 4-(p-diethylaminophenyl)-1,3-butadienyl), or substituted or unsubstituted heterocyclic radical (e.g. 3-carbazolyl, 9-methyl-3-carbazolyl, 9-ethyl-3-carbazolyl, or 9-carbazolyl); $R^2_{10}$ and $R^2_{11}$ or $R^2_{11}$ and $R^2_{12}$, conjointly with the adjacent carbon atoms, may form a substituted or unsubstituted benzene ring;

$R^2_{13}$ represents hydrogen, nitro, cyano, alkyl (e.g. methyl, ethyl, propyl, or butyl), or aryl (e.g. phenyl, tolyl, or xylyl);

$X_1$ represents sulfur, oxygen, or selenium;

$A_4$ represents an atom group necessary to form a substituted or unsubstituted pyrane, thiapyrane, selenapyrane, benzopyrane, benzothiapyrane, benzoselenapyrane, naphthepyrane, naphthothiapyrane, or naphthoselenapyrane ring;

$Z^{63}$ represents an anion, e.g. perchlorate, fluoroborate, sulfoacetate, iodide, chloride, bromide, p-toluenesulfonate, alkylsulfonate, alkyldisulfonate, benzenedisulfonate, halosulfonate, pycrate, tetracyanoethylene anion, or tetracyanoquinodimethane anion;

$m_1$ represents an integer of 0, 1, or 2; and $n_1$ represents an integer of 0 or 1.

Examples of the azulenium salts represented by general formula (27) are listed below.

| Compound | Formula of Compound |
|---|---|
| E-(1) | 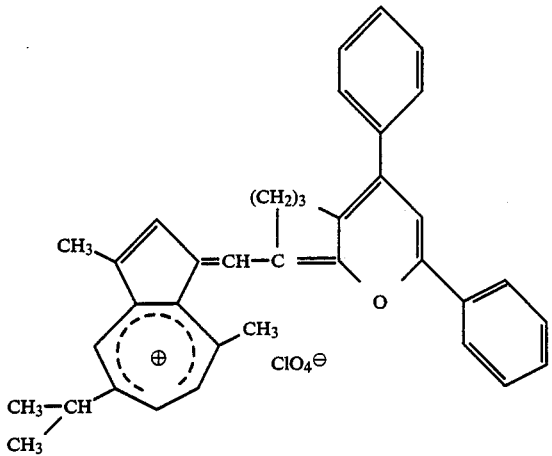 |
| E-(2) | 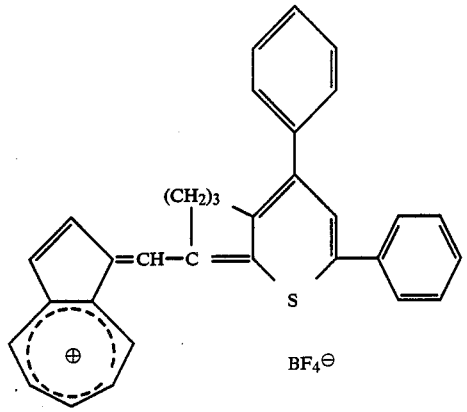 |

-continued
| Compound | Formula of Compound |
|---|---|
| E-(3) | 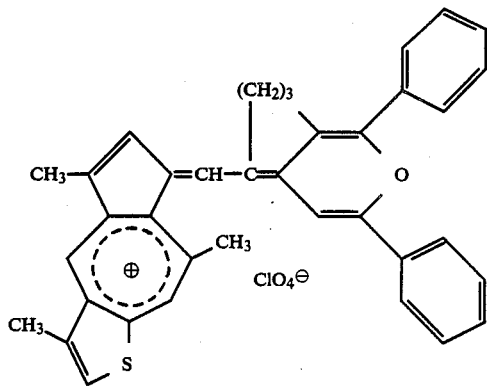 |
| E-(4) | 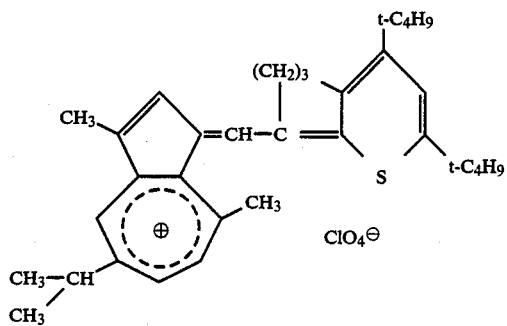 |
| E-(5) | 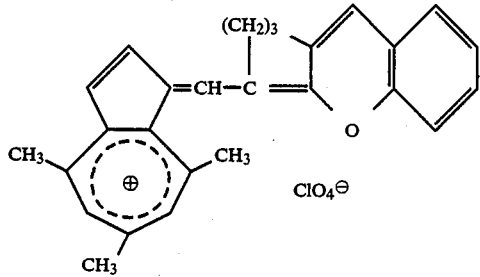 |
| E-(6) | 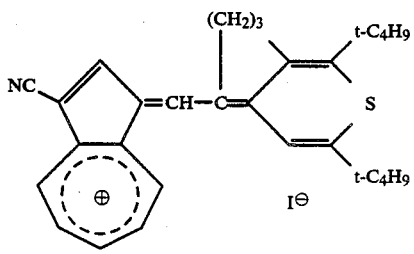 |

-continued
| Compound | Formula of Compound |
|---|---|
E-(7)
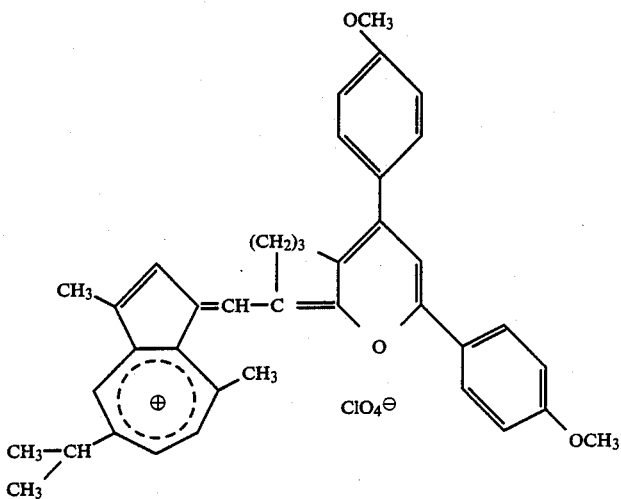
E-(8)
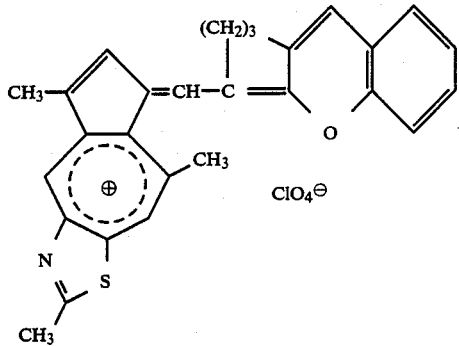
E-(9)
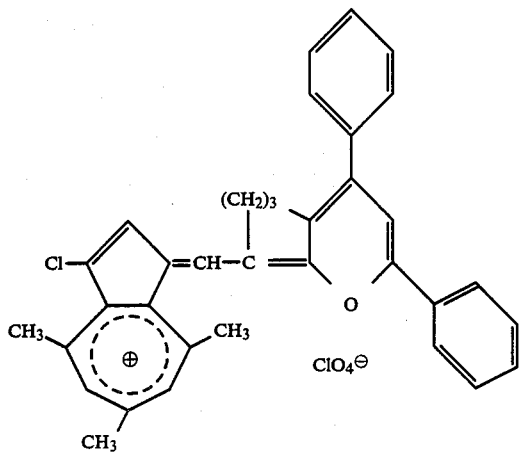

-continued
| Compound | Formula of Compound |
|---|---|
| E-(10) | 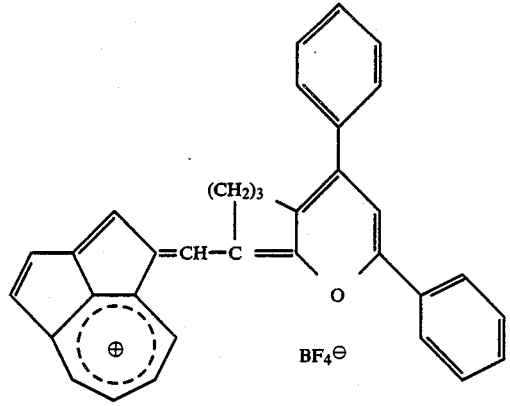 |
| E-(11) | 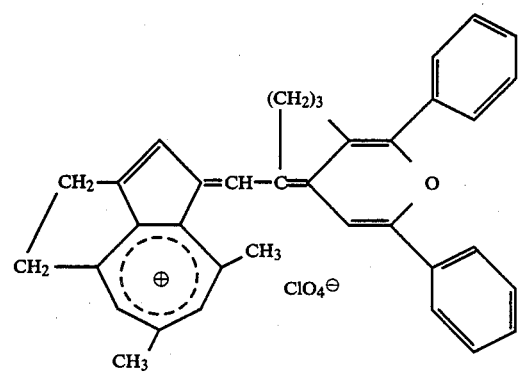 |
| E-(12) | 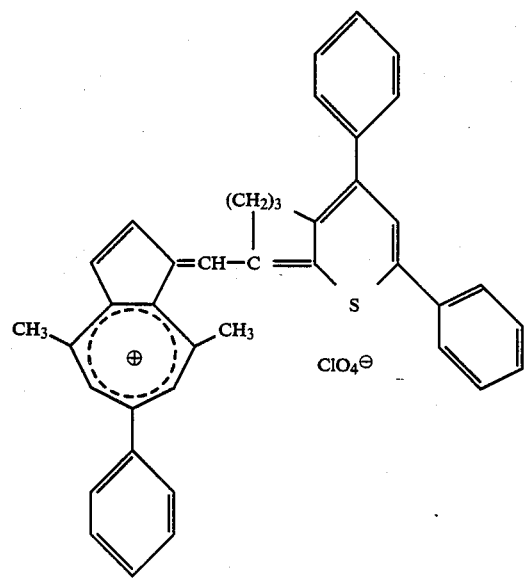 |

-continued
| Compound | Formula of Compound |
|---|---|
| E-(13) | 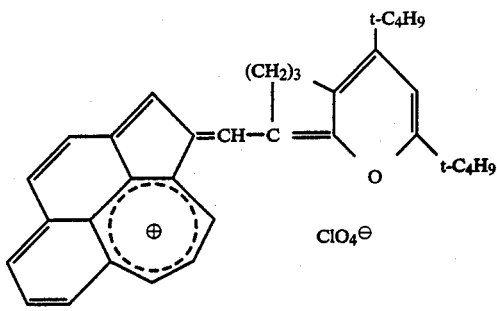 |
| E-(14) | 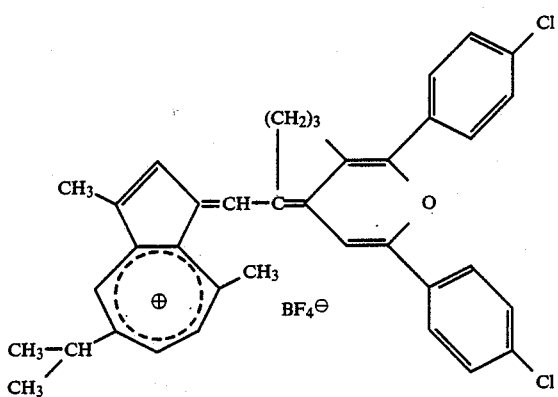 |
| E-(15) | 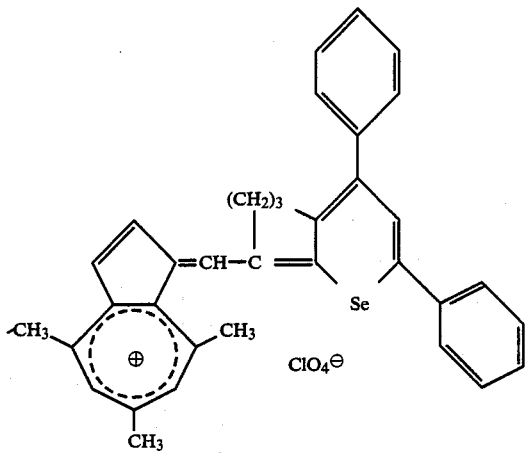 |
| E-(16) | 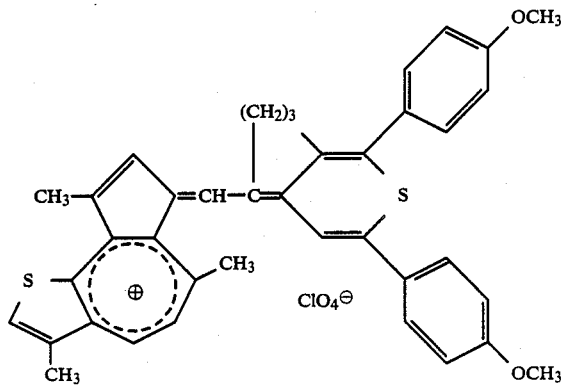 |

-continued
| Compound | Formula of Compound |
|---|---|
| E-(17) | 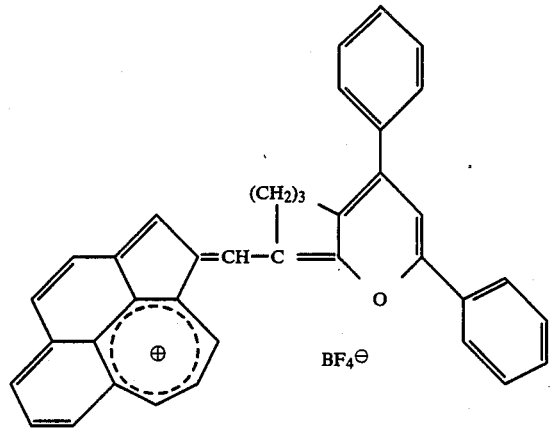 |
| E-(18) | 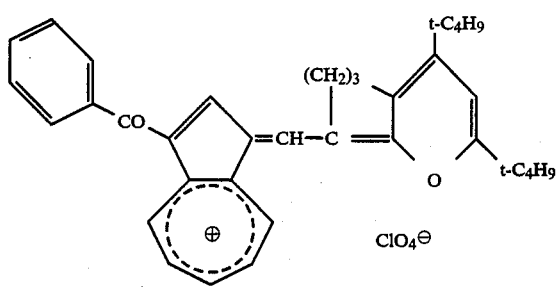 |
| E-(19) | 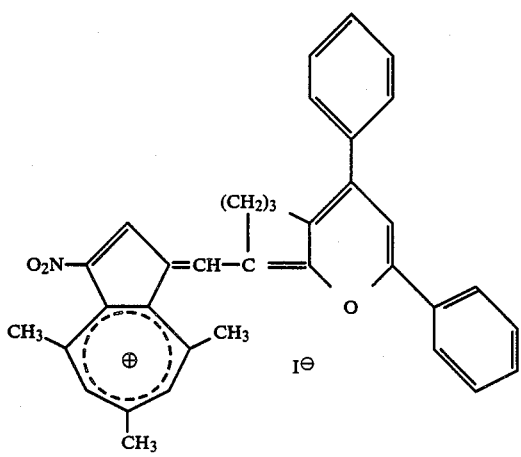 |

| Compound | Formula of Compound |
|---|---|
| E-(20) | 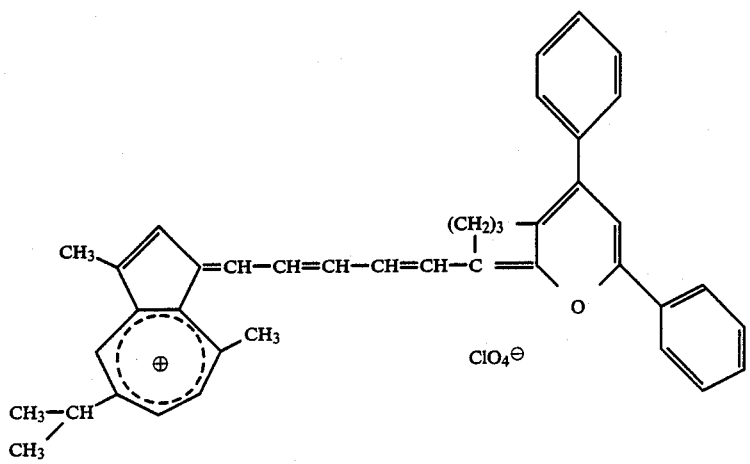 |
| E-(21) | 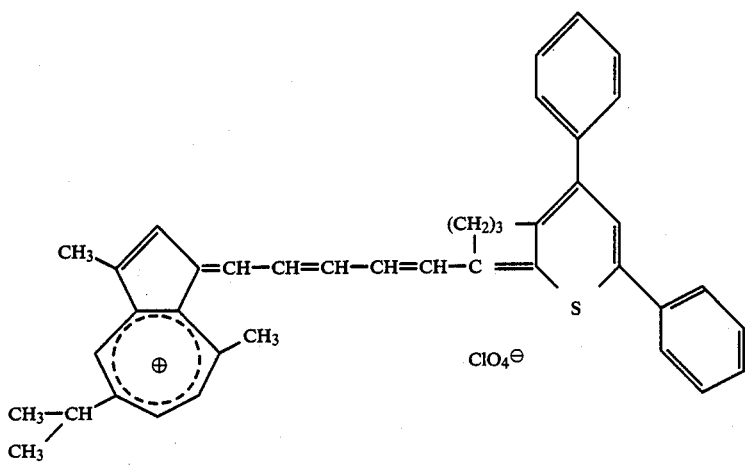 |
| E-(22) | 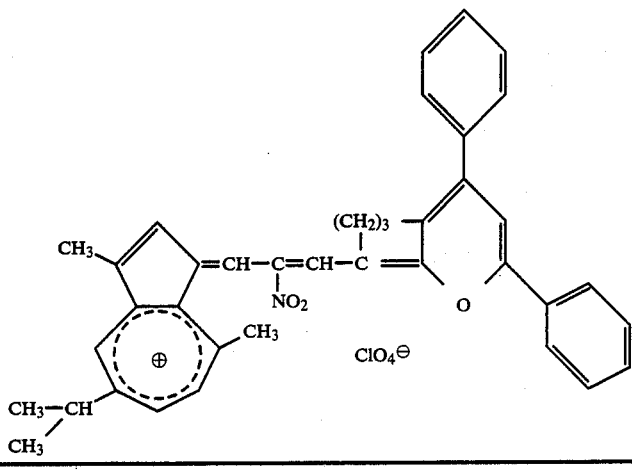 |
The azulenium salt of general formula (27) can be obtained by reacting a formylazulene compound represented by the following formula (31) with a compound represented by the following general formula (32) in a solvent.
General formula (31):

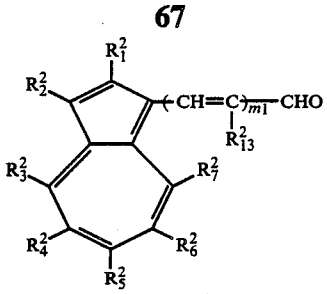

($R^2_1$ to $R^2_7$, $R^2_{13}$ and $m_1$ are the same as in general formula (27)).

General formula (32):

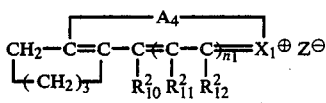

($R^2_{10}$, $R^2_{11}$, $R^2_{12}$, $A_4$, $X_1$, $Z^\ominus$, and $n_1$ are the same as in general formula (27)).

The azulenium salt of general formula (27) where m is 0 can be readily obtained by reacting an azulene compound represented by following general formula (33) with an aldehyde represented by the following general formula (34) in a suitable solvent in the presence of a strong acid.

General formula (33):

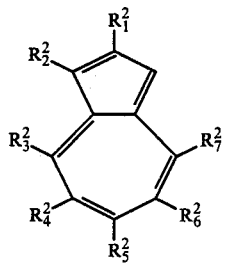

($R^2_1$ to $R^2_7$ are the same as in general formula (27))

General formula (34):

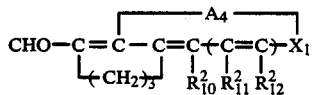

($R^2_{10}$, $R^2_{11}$, $R^2_{12}$, $A_4$, $X_1$, and $n_1$ are the same as in general formula (27)).

For the above reactions, a wide varieties of organic solvents can be used, preferables of which are alcohols e.g. ethanol, propanol, and butanol, nitriles, e.g. acetonitrile, ketones, e.g. methyl ethyl ketone, nitro compounds, e.g. nitrogenzene, halogenated hydrocarbons, e.g. tetrachloroethane, organic acids, e.g. acetic acid, and acid anhydrides, e.g. acetic anhydride.

Processes for synthesizing typical azulenium salts are illustrated by the following Preparation Examples 1 and 2.

Preparation Example 1

Compound No. E-(1)

1-Formyl-3,8-dimethyl-5-isopropylazulene (1.5 g) was reacted with 2,4-diphenyl-5,6,7,8-tetrahydrobenzopyrylium perchlorate (2.56 g) in 50 ml of acetic anhydride at temperatures of 80° to 90° C. for 2 hours. After cooling, precipitated crystals were filtered, washed in turn with glacial acetic acid, water, and ethanol, and dried. Thus, 3.35 g of compound No. E-(1) azulenium salt was obtained, yield 35%.

Anal. Calcd. for $C_{37}H_{35}ClO_5$: C, 74.66; H 5.94; Cl 5.96. Found: C, 74.57; H, 6.03; Cl, 5.83.

Preparation Example 2

Compound No. E-(9)

1-Chloro-4,8,8-trimethylazulene (2.4 g) and 2,4-diphenyl-tetrahydrobenzopyrylo-8-ω-aldehyde (3.69 g) were dissolved in 150 ml of tetrahydrofuran. After addition of 4 ml of 70% perchloric acid to the solution at 25° C., the mixture was stirred for 6 hours at the same temperature. The formed precipitate was filtered, washed in turn with tetrahydrofuran, water, and tetrahydrofuran, and dried. Thus, 3.88 g of compound No. E-(9) azulenium salt was obtained, yield 55%.

Anal. Calcd. for $C_{35}H_{30}Cl_2O_5$: C, 69.88; H 5.04; Cl 11.79. Found: C, 69.73; H, 5.18; Cl, 11.64.

General formula (28):

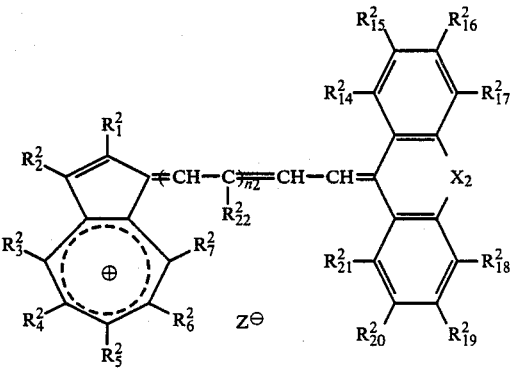

In this formula; $R^2_1$ to $R^2_7$ are defined above, $R^2_{14}$ to $R^2_{21}$ each represent hydrogen, halogen (e.g. chlorine, bromine, or iodine), alkyl (e.g. methyl, ethyl, n-propyl, isopropyl, n-butyl, or t-butyl), alkoxyl (e.g. methoxy, ethoxy, propoxy, or butoxy), hydroxyl, substituted or unsubstituted aryl (e.g. phenyl, tolyl, xylyl, ethylphenyl, methoxyphenyl, nitrophenyl, dimethylaminophenyl, α-naphthyl, or β-naphthyl), substituted or unsubstituted aralkyl (e.g. benzyl, 2-phenylethyl, 2-phenyl-1-methylethyl, bromobenzyl, methylbenzyl, or nitrobenzyl), or nitro, or at least one of the combinations of $R^2_{14}$ and $R^2_{15}$, $R^2_{15}$ and $R^2_{16}$, $R^2_{16}$ and $R^2_{17}$, $R^2_{18}$ and $R^2_{19}$, $R^2_{19}$ and $R^2_{20}$, and $R^2_{20}$ and $R^2_{21}$, conjointly with the adjacent carbon atoms, may form a substituted or unsubstituted aromatic ring;

$X_2$ represents oxygen, sulfur, or selenium;

$R^2_{22}$ represents hydrogen, nitro, cyano, alkyl (e.g. methyl, ethyl, propyl, or butyl), or aryl (e.g. phenyl, tolyl, or xylyl); and $Z^\ominus$ represents an anion, e.g. perchlorate, fluoroborate, sulfoacetate, iodide, chloride, bromide, p-toluenesulfonate, alkylsulfonate, alkyldisulfonate, benzenedisulfonate, halosulfonate, picrate, tetracyanoethylene anion, or tetraquinodimethane anion; and $n_2$ is an integer of 0, 1 or 2.

Examples of the azulenium salt compounds represented by general formula (28) are listed below.

| Compound | Formula of Compound |
|---|---|
| F-(1) | 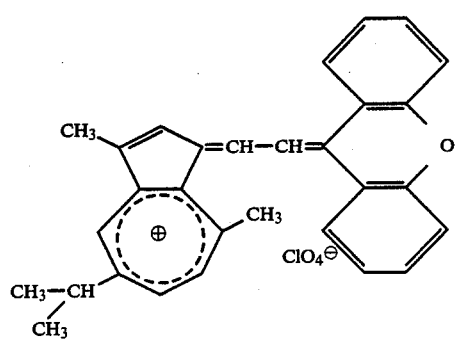 |
| F-(2) | 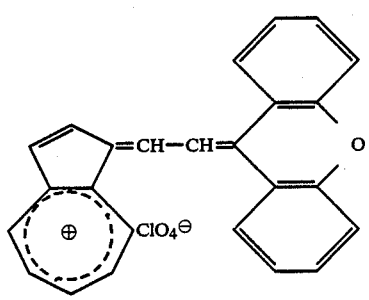 |
| F-(3) | 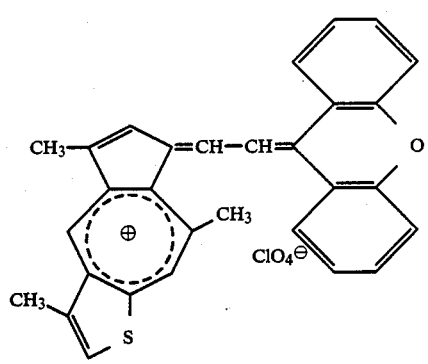 |
| F-(4) | 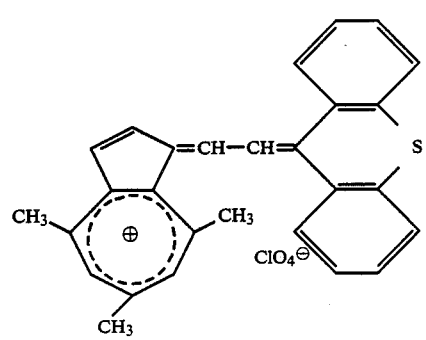 |

-continued

| Compound | Formula of Compound |
|---|---|
| F-(5) | (structure with azulenium cation bearing CH₃, CH₃, and CH₃–CH(CH₃) substituents, connected via =CH—CH= to a bis-naphthyl-oxy group; ClO₄⁻ counterion) |
| F-(6) | (structure with cyclopenta-fused thiophene azulenium cation bearing CH₃, CH₃, CH₃ substituents, connected via =CH—CH= to a bis-naphthyl-oxy group; BF₄⁻ counterion) |
| F-(7) | (structure with azulenium cation bearing NC, CH₃, CH₃, CH₃ substituents, connected via =CH—CH= to a bis-naphthyl-oxy group; ClO₄⁻ counterion) |
| F-(8) | (structure with azulenium cation bearing CH₃, CH₃, and CH₃–CH(CH₃) substituents, connected via =CH—CH= to a bis-naphthyl-oxy group; ClO₄⁻ counterion) |

| Compound | Formula of Compound |
|---|---|
| F-(9) | 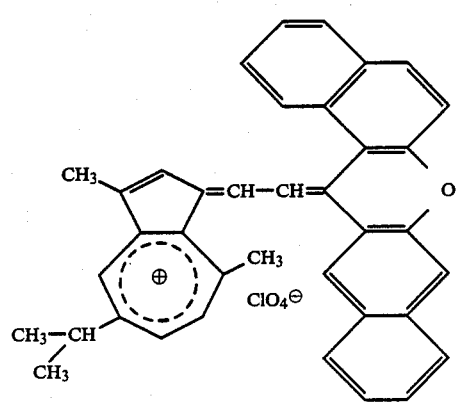 |
| F-(10) | 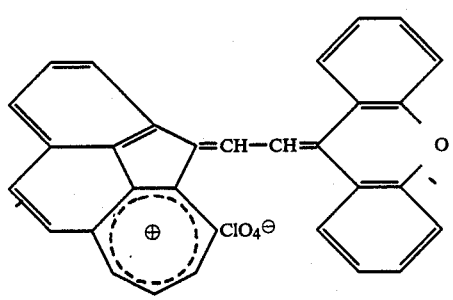 |
| F-(11) | 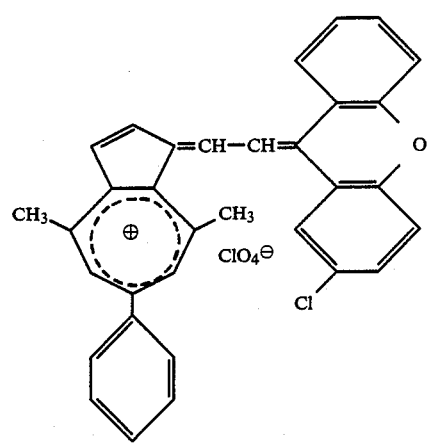 |
| F-(12) | 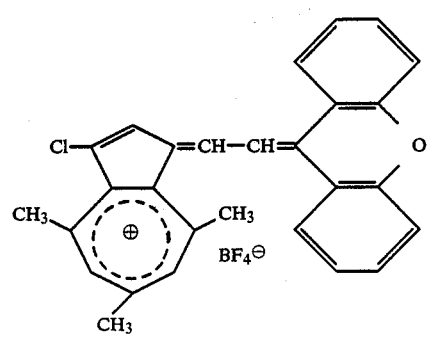 |

-continued
| Compound | Formula of Compound |
|---|---|
| F-(13) | 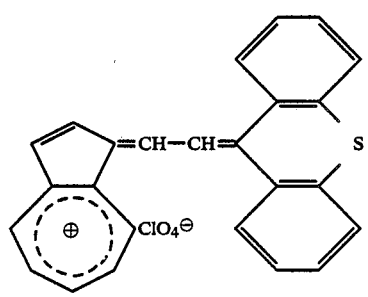 |
| F-(14) | 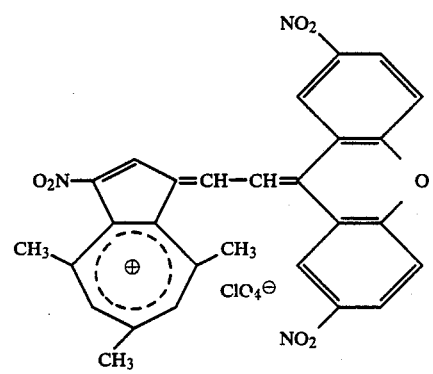 |
| F-(15) | 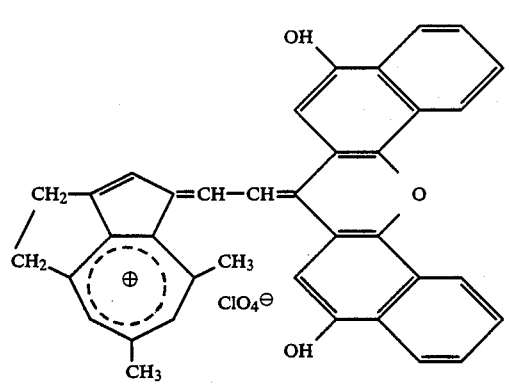 |
| F-(16) | 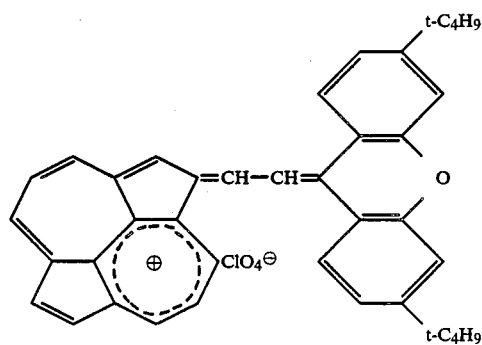 |

-continued
| Compound | Formula of Compound |
|---|---|
| F-(17) | 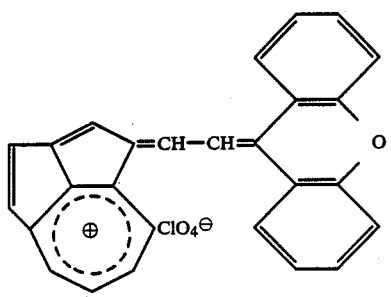 |
| F-(18) | 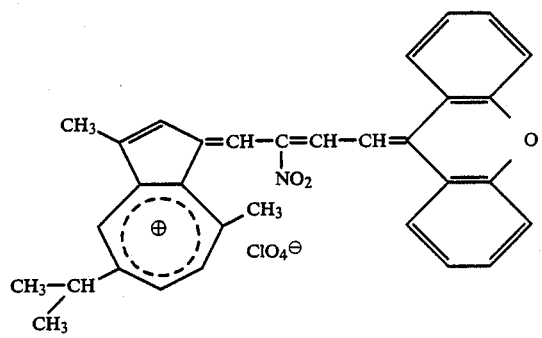 |
| F-(19) | 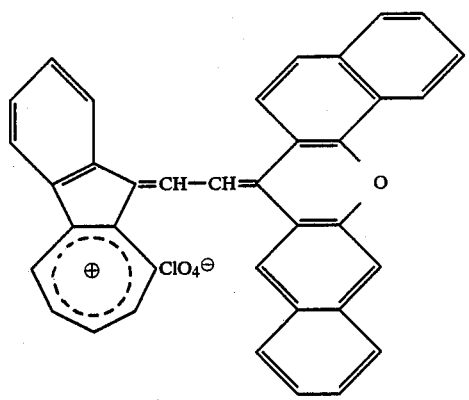 |
| F-(20) | 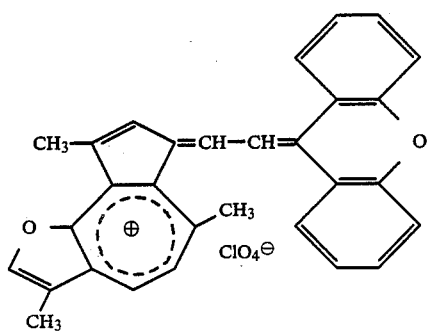 |

| Compound | Formula of Compound |
|---|---|
| F-(21) | 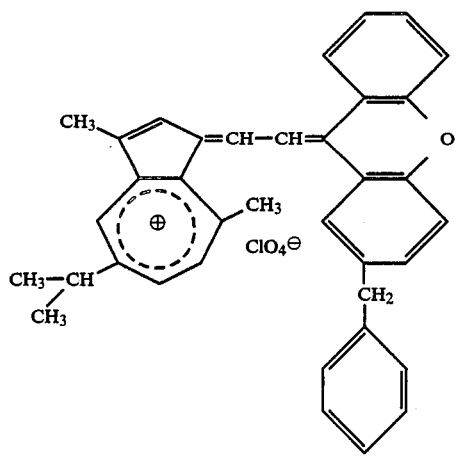 |
| F-(22) | 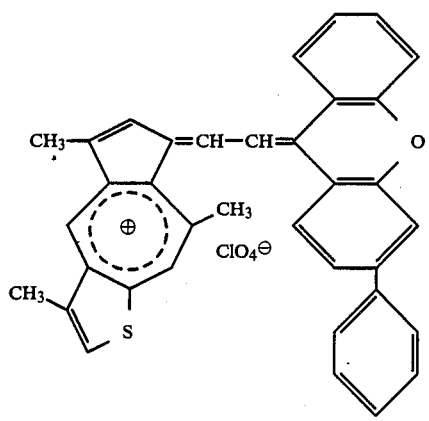 |
| F-(23) | 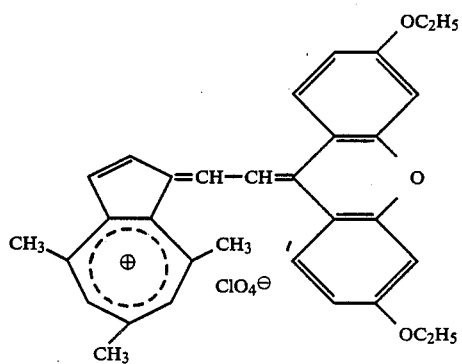 |
| F-(24) | 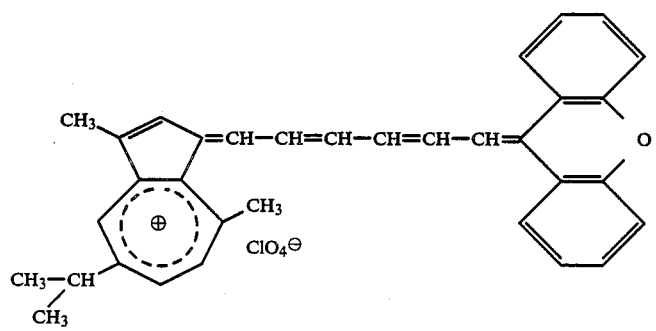 |

| Compound | Formula of Compound |
|---|---|
| F-(25) | 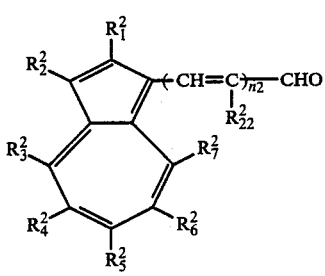 |

The azulenium salt of general formula (28) can be obtained by reacting a formylazulene compound represented by the following general formula (35) with a compound represented by the following general formula (36) in a solvent.

General formula (35):

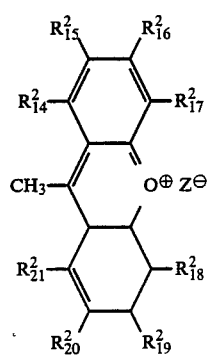

($R^2_1$ to $R^2_7$, $R^2_{22}$, and $n_2$ are the same as in general formula (28)).

General formula (36):

($R^2_{14}$ to $R^2_{21}$ and $Z^\ominus$ are the same as in general formula (28)).

The azulenium salt represented by general formula (28) where $n_2$ is 0 can be readily obtained by reacting an azulene compound represented by the following general formula (37) with an aldehyde represented by the following general formula (38) in a suitable solvent in the presence of a strong acid.

General formula (37):

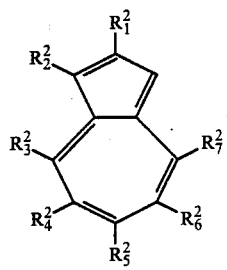

($R^2_1$ to $R^2_7$ are the same as in general formula (28)).

General formula (38):

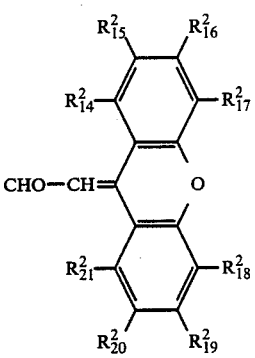

($R^2_{14}$ to $R^2_{21}$ are the same as in general formula (28)).

Process for synthesizing typical azulenium salts of general formula (28) are illustrated by the following Preparation Examples 3 and 4.

Preparation Example 3

Compound No. F-(1)

1-Formyl-3,8-dimethyl-5-isopropylazulene (2.26 g) was reacted with 9-methylxanthenium perchlorate (2.95 g) in 180 ml of acetic anhydride at temperatures of 80° to 90° C. for 2 hours. After cooling, precipitated crystals were filtered, washed in turn with glacial acetic acid, water, and ethanol, and dried. Thus, 4.07 g of compound No. F-(1) azulenium salt was obtained, yield 81%.

Anal. Calcd. for $C_{30}H_{27}ClO_5$: C, 71.63; H, 5.42; Cl, 7.05. Found: C, 71.52; H, 5.50; Cl 7.12.

Preparation Example 4

Compound No. F-(5)

A 70% perchloric acid (2 ml) was added dropwise to a solution composed of 0.74 g of 1,4-dimethyl-7-isopropylazulene, 1.2 g of 9-formylmethylene-3,4,5,6-dibenzoxanthene, and 80 ml of tetrahydrofuran at room temperature. The mixture was stirred for 4 hours at the same temperature. The formed precipitate was filtered, washed in turn with tetrahydrofuran, water, and tetrahydrofuran, and dried. Thus, 1.01 g of compound No. F-(5) azulenium salt was obtained, yield 45%.

Anal. Calcd. for $C_{38}H_{31}ClO_5$: C, 75.67; H, 5.19; Cl, 5.88. Found: C, 75.71; H 5.26; Cl, 5.79.

General formula (29):

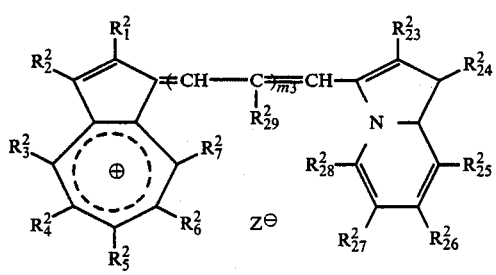

General formula (30):

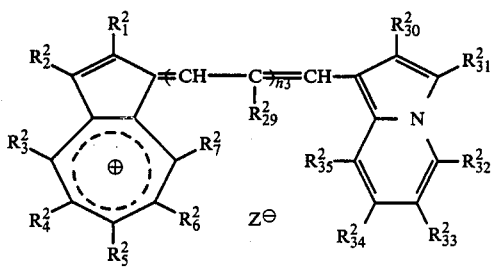

In general formulae (29) and (30); $R^2_1$ to $R^2_7$ are as defined above.

$R^2_{23}$, $R^2_{24}$, $R^2_{25}$, $R^2_{26}$, $R^2_{27}$, $R^2_{28}$, $R^2_{30}$, $R^2_{31}$, $R^2_{32}$, $R^2_{33}$, $R^2_{34}$, and $R^2_{35}$ each represent hydrogen, halogen (e.g. chlorine, bromine, or iodine), alkyl (e.g. methyl, ethyl, n-propyl, isopropyl, n-butyl, t-butyl, n-amyl, n-hexyl, n-octyl, or 2-ethylhexyl), alkoxyl (e.g. methoxy, ethoxy, propoxy, or butoxy), substituted or unsubstituted aryl (e.g. phenyl, tolyl, xylyl, ethylphenyl, methoxyphenyl, ethoxyphenyl, chlorophenyl, nitrophenyl, dimethylaminophenyl, α-naphthyl, or β-naphthyl), substituted or unsubstituted aralkyl (e.g. benzyl, 2-phenylethyl, 2-phenyl-1-methylethyl, bromobenzyl, methylbenzyl, methoxybenzyl, or nitrobenzyl), nitro, or acyl (e.g. acetyl, propionyl, butyryl, valeryl, benzoyl, toluoyl, naphthoyl, phthaloyl, or furoyl) at least one of the combinations of $R^2_{23}$ and $R^2_{24}$, $R^2_{24}$ and $R^2_{25}$, $R^2_{25}$ and $R^2_{26}$, $R^2_{26}$ and $R^2_{27}$, and $R^2_{27}$ and $R^2_{28}$, or at least one of the combinations of $R^2_{30}$ and $R^2_{31}$, $R^2_{31}$ with $R^2_{32}$, $R^2_{32}$ with $R^2_{33}$, $R^2_{33}$ with $R^2_{34}$, and $R^2_{34}$ with $R^2_{35}$, conjointly with the adjacent carbon atoms, may form a substituted or unsubstituted 5-, or 6-membered aromatic or heterocyclic ring;

$R^2_{29}$ represents hydrogen, nitro, cyano, alkyl (e.g. methyl, ethyl, propyl, or butyl) or aryl (e.g. phenyl, tolyl, or xylyl);

$Z^\ominus$ represents an anion, e.g. perchlorate, fluoroborate, sulfoacetate, iodide, chloride, bromide, p-toluenesulfonate, alkylsulfonate, alkyldisulfonate, benzenedisulfonate, halosulfonate, picrate, tetracyanoethylene anion, or tetracyanoquinodimethane anion; and $n_3$ represents an integer of 0, 1, or 2.

Examples of the azulenium salts of general formulae (29) and (30) are listed below.

| Compound | Formula of Compound |
|---|---|
| G-(1) | |
| G-(2) | |

-continued
| Compound | Formula of Compound |
|---|---|
| G-(3) | 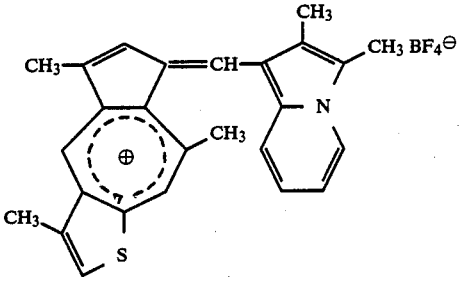 |
| G-(4) | 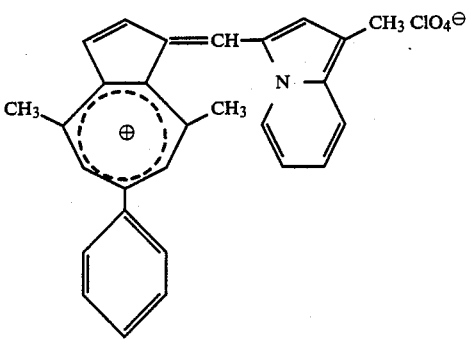 |
| G-(5) | 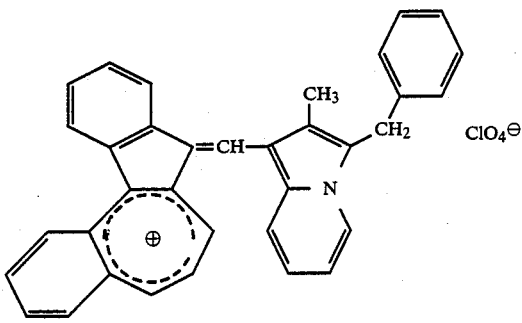 |
| G-(6) | 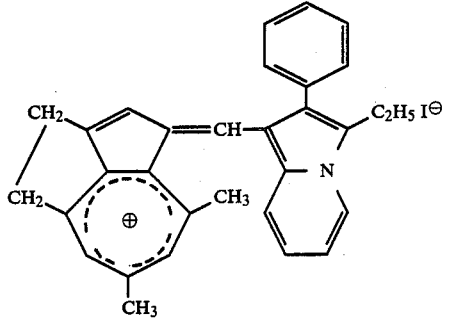 |
| G-(7) | 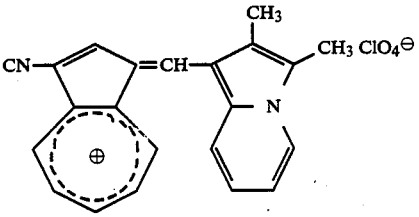 |

-continued
| Compound | Formula of Compound |
|---|---|
| G-(8) | 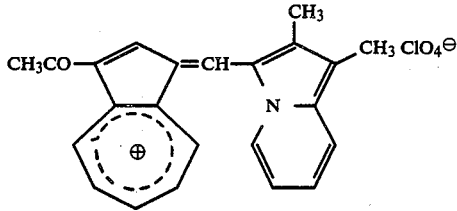 |
| G-(9) | 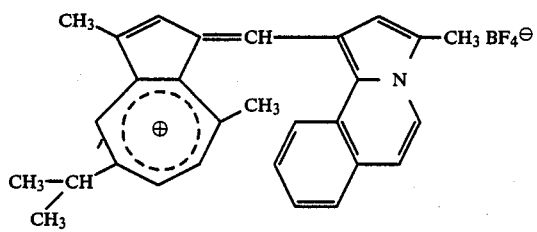 |
| G-(10) | 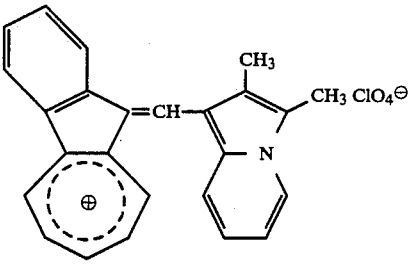 |
| G-(11) | 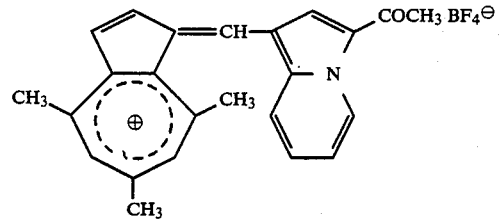 |
| G-(12) | 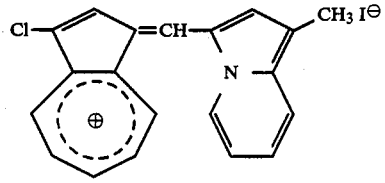 |
| G-(13) | 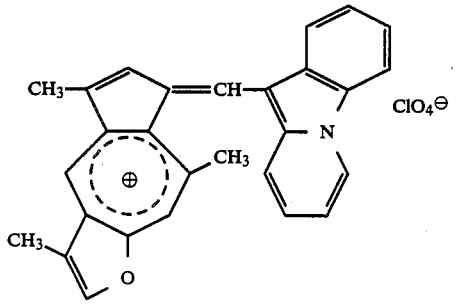 |

-continued
| Compound | Formula of Compound |
|---|---|
| G-(14) | 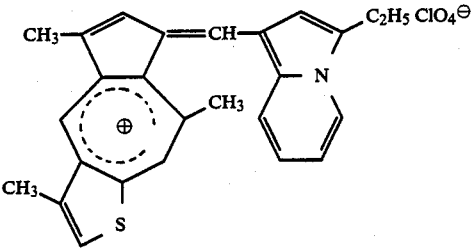 |
| G-(15) | 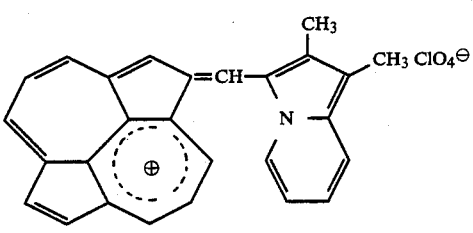 |
| G-(16) | 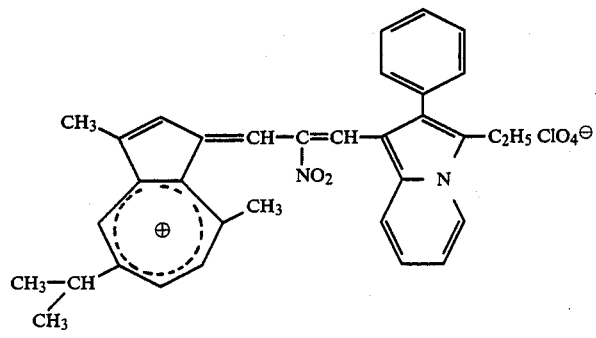 |
| G-(17) | 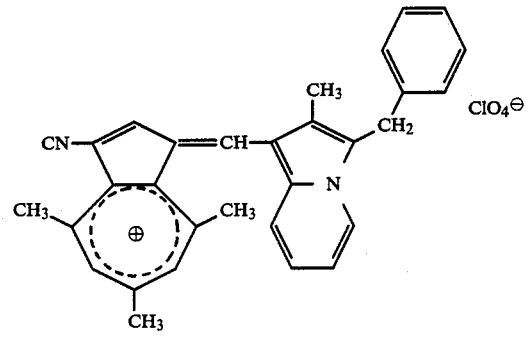 |
| G-(18) | 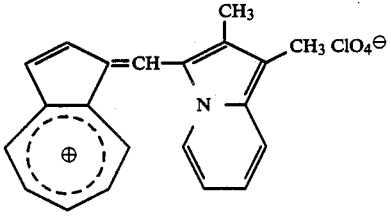 |

| Compound | Formula of Compound |
|---|---|
| G-(19) | |
| G-(20) | |
| G-(21) | |
| G-(22) | |

The compound represented by general formula (29) or (30) where $n_3$ is 0 can be obtained by reacting a 1-formylazulene compound with a 1- or 3-unsubstituted indolizine compound in a suitable solvent in the presence of a weak acid, as described in Angewandte Chemie, 71, No. 3, p. 125 (1959), and also by reacting an azulene compound with a 1- or 3-formylindolizine compound. The compound of the above formula wherein $n_3$ is 1 or 2 can be obtained by reacting an aldehyde represented by the general formula (39)

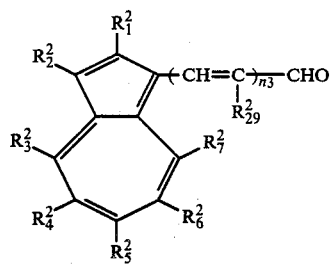

($R^2_1$ to $R^2_7$, $R^2_{29}$ and $n_3$ are the same as in general formula (29)) with a 1- or 3-unsubstituted indolizine compound as described in Journal of the Chemical Society, pp. 3579–3593 (1961).

Suitable solvents for the above reactions are alcohols, e.g. ethanol, butanol, and benzyl alcohol, nitriles, e.g.

acetonitrile and propionitrile, carboxylic acid, e.g. acetic acid, and alicyclic ethers, e.g. dioxane and tetrahydrofuran. Mixtures of butanol, benzyl alcohol, or the like with an aromatic hydrocarbon, e.g. benzene, and also be used. The reaction temperature is selected from between room temperature and the boiling point of the solvent used.

Process for synthesizing typical azulenium salts of general formula (29) or (30) are illustrated by the following Preparation Example 5.

Preparation Example 5

Compound No. G-(1)

1-Formylazulene (0.94 g) and 1,2-dimethylindolizine (0.87 g) were mixed in 80 ml of tetrahydrofuran at room temperature, and 2.5 ml of of 70% perchloric acid was added thereto. After 2 hours' reaction at room temperature, the mixture was allowed to stand overnight. The formed precipitate was filtered, washed in turn with tetrahydrofuran (20 ml), water (50 ml×4 times), and tetrahydrofuran (20 ml×2 times), and dried. Thus, 1.20 g of compound No. G-(1) azulenium salt was obtained, yield 52%.

Absorption spectrum, λmax in ethanol: 568 nm.

Anal. Calcd. for $C_{21}H_{18}ClNO_4$: C, 65.71; H, 4.74; N, 3.65; Cl, 9.24. Found: C, 65.53, H, 4.87; N, 3.72; Cl, 9.14.

The photothermal transducing recording medium of the present invention is applicable as an optical disk which comprises, for instance, as shown in FIG. 1, a thin film 2 containing the above defined azulenium salt and a substrate 1 supporting it. Such a thin film can be formed by vapor deposition of the azeulenium salt as well as by applying a coating liquid containing the azulenium salt in a suitable solvent. In the case of forming a film by applying the coating liquid, the azulenium salt may be either dispersed or dissolved in a solvent or vehicle. A resin can be incorporated as a binder in the coating liquid. The suitable binders can be selected from a wide variety of resins, including, for example; cellulose esters such as nitrocellulose, cellulose phosphate, cellulose sulfate, cellulose acetate, cellulose propionate, cellulose butyrate, cellulose myristate, cellulose palmitate, cellulose acetate propionate, and cellulose acetate butyrate; cellulose ethers such as methyl cellulose, ethyl cellulose, propyl cellulose, and butyl cellulose; vinyl resins such as polystyrene, poly(vinyl chloride), poly(vinyl acetate), poly(vinyl buryal), poly(vinyl acetal), poly(vinyl alcohol), and polyvinylpyrrolidone; copolymers such as styrene-butadiene copolymer, styrene-acrylonitrile copolymer, styrene-butadiene-acrylonitrile copolymer, and vinyl chloride-vinyl acetate copolymer; acrylic resins such as poly(methyl methacrylate), poly(methyl acrylate), poly(butyl acrylate), poly(acrylic acid), poly(methacrylic acid), polyacrylamide, and polyacrylonitrile; polyesters such as poly(ethylene terephthalate); polyarylates such as poly(4,4'-isopropylidenediphenylene-co-1,4-o-cyclohexylenedimethylene carbonate), poly(ethylenedioxy-3,3'-phenylene thiocarbonate), poly(4,4'-isopropylidenediphenylene carbonate-co-terephthalate), poly(4,4'-isopropylidenediphenylene carbonate), poly(4,4'-sec-butylidenediphenylene carbonate), and poly(4,4'-isopropylidenediphenylene carbonate-block-oxyethylene); polyamides; polyimides; epoxy resins; phenolic resins; and polyolefines such as polyethylene, polypropylene, and chlorinated polyethylene.

Organic solvents suitable for the coating, though dependent upon the nature of the binder and whether the azeulenium salt is dispersed or dissolved in the binder, may include generally; alcohols such as methanol, ethanol, and isopropanol; ketones such as acetone; methyl ethyl ketone, and cyclohexanone; amides such as N,N-dimethylformamide and N,N-dimethylacetamide; sulfoxides such as dimethylsulfoxide; ethers such as tetrahydrofuran, dioxane, and ethylene glycol monomethyl ether; esters such as methyl acetate, ethyl acetate, and butyl acetate; halogenated aliphatic hydrocarbons such as chloroform, methylene chloride, dichloroethylene, carbon tetrachloride, and trichloroethylene; and aromatics such as benzene, toluene, xylene, ligroin, monochlorobenzene, and dichlorobenzene.

The coating can be accomplished, for example, by the dip coating, spray coating, spinner coating, bead coating, Meyer bar coating, blade coating, roller coating or curtain coating method.

When the thin film 2 is formed of the azulenium salt together with a binder, the content of the azulenium salt in the thin film 2 may be from 0.1 to 99%, preferably from 40 to 90%, by weight. The thickness of the thin film 2 (dry coating film or vapor deposit film) may be up to 10μ, preferably up to 2μ.

The substrate 1 may be formed of a plastic such as polyester, acrylic resin, polyolefin resin, phenolic resin, epoxy resin, polyamide, or polyimide, glass, or metal.

While the photothermal transducing recording medium of the present invention is basically constructed of the substrate 1 and the thin film 2 (a layer sensitive to electromagnetic radiation) formed on the substrate, some auxiliary layers can be additionally provided. For example, an inorganic or organic surface coat can be provided on the substrate 1 for the purpose of adjusting the heat constant. The thin film 2 can be covered with a protective layer of a transparent material, which is effective for preventing the thin film 2 from mechanical damage and additionally can serve as an anti-reflecting film when formed to a suitable thickness; thus the protective layer is also effective for improving the sensitivity. Moreover, a reflecting layer 3 can be interposed between the substrate 1 and the thin film 2, as shown in FIG. 2. This reflecting layer 3 can be formed from a reflective metal such as aluminum silver, or chromium by vapor deposition or lamination.

The photothermal transducing recording medium of the present invention can be provided with a pregroove which functions as a track guide groove or address groove, as described in Japanese Patent Application No. 72,374/1982.

As shown in FIG. 3, pits 5 can be formed in the thin film 2 of the photothermal transducing recording medium of the invention by irradiating the thin film with a beam 4 of electromagnetic radiation, for example, a ray from a gallium-aresenic-aluminum semiconductor laser (oscillation wavelength: 820 nm), argon gas laser (oscillation wavelength: 488.515 nm), helium-neon gas laser (oscillation wavelength: 632.8 nm), laser having an oscillation wavelength in the visible to infrared regions, any of various short-pulse emitting lamps such as a xenon flash lamp, or infrared lamp, or by bringing a heater into contact with the thin film. Reflecting of the pit portions is different from that of the portions where no pit is formed. Accordingly, the film is scanned with a beam of electromagnetic radiation along the track to form a pit therein, the track is scanned with a low-power laser beam, where the reflectivity difference can be read with a photodetector.

In another embodiment of the present invention, the photothermal transducing recording medium can be applied as a liquid crystal device. For instance, as shown in FIG. 4, which is a cross-sectional view of a liquid crystal device as an embodiment of the present photothermal transducing recording medium, there is used a liquid crystal composition 108 which is a solution of an azulenium salt of general formula [I] or [II] in a liquid crystal. Smectic liquid crystals, particularly those in A-phase or C-phase having positive dielectric anisotropy, are suited for this type of liquid crystal device utilizing the present photothermal transducing recording medium. Such a smectic liquid crystal, while having the smectic phase orientation of homeotropic texture before local heating with a laser beam, undergoes the phase change of smectic phase→nematic phase→isotropic phase as the temperature is raised. On subsequent quenching, the liquid crystal undergoes the phase change of isotropic phase→smectic phase, forming a focal conic texture, which has a light-scattering property. Accordingly, the liquid crystal composition in the liquid crystal device is irradiated with a laser beam so that the smectic phase is locally changed to the isotropic phase by heating, and on subsequent quenching, the irradiated portion becomes the smectic phase of focal conic texture. This texture has a light-scattering property. Therefore, a stationary pattern of image can be formed by scanning with the light signal of the foregoing laser beam.

Compounds which can be used in the liquid crystal device of the present invention to form the smectic phase having a positive dielectric anisotropy are described, for example, in Japanese Patent Application Laid-Open Nos. 150,030/1983, 40,429/1982 and 51,779/1982.

In the liquid crystal composition 108, the azulenium salt represented by general formula [I] or [II] is incorporated in an amount of at least 0.1%, preferably 1 to 3%, by weight of the liquid crystal. Mixtures of a smectic liquid crystal having a positive dielectric anisotropy with a cholesteric liquid crystal can also be used in the liquid crystal device of the present invention. Suitable contents of the cholesteric liquid crystal in the composition 108 are from 0.5 to 15%, particularly from 1 to 5%, by weight.

Examples of the cholesteric liquid crystal used in the invention are cholesteryl compounds including cholesteryl chloride, cholesteryl bromide, cholesteryl iodide, cholesteryl nitrate, cholesteryl chlorodecanoate, cholesteryl butyrate, cholesteryl caprate, cholesteryl oleate, cholesteryl linoleate, cholesteryl laurate, cholesteryl myristate, cholesteryl heptylcarbamate, cholesteryl decyl ether, cholesteryl lauryl ether, and cholesteryl oleyl ether.

In the liquid crystal device employing such mixed liquid crystals, a local phase change from the smectic phase of homeotropic texture to the isotropic phase is caused by heating with a laser beam and then the smectic phase of focal conic texture can be formed as stated above from the isotropic phase by quenching it.

The written image pattern in the liquid crystal device in the above manner can be erased as follows: The liquid crystal composition 108 is entirely heated, for example, with a heater, to change the phase to isotropic, and then cooled slowly while applying a suitable d.c. or a.c. voltage between electrodes 103 and 104 provided on base plates 101 and 102 (e.g. transparent glass plates or plastic plates such as acrylic resin plates), respectively, which construct the liquid crystal device, thereby causing the phase change of isotropic phase→nematic phase→smectic phase. In this change, the nematic liquid crystal molecules are oriented in the direction of electric field since the liquid crystal in the nematic phase has a positive dielectric anisotropy, and the smectic A-phase or C-phase of homeotropic texture is formed on further cooling, thus erasing the written image pattern. The electrodes 103 and 104 are generally transparent conductive films formed of indium oxide, tin oxide, or ITO (indium-tin oxide) or as occasion demands, are metallic conductive films formed of aluminum chromium, silver, nickel, or the like. The electrodes 103 and 104 desirably cover the entire surfaces of the base plates 101 and 102, respectively, and not always need to have the prescribed pattern form or matrix electrode structure. However, it is also possible to design these electrodes to have the prescribed pattern form or matrix electrode structure as desired.

In the liquid crystal device of the present invention, the insides of the electrodes 103 and 104 can be covered with orientation-controlling films 106 and 107, respectively, which are formed of an insulating material. These orientation-controlling films 106 and 107 have each a surface structure capable of controlling the liquid crystal composition 108 in contact therewith to orient in a desired direction. These orientation-controlling films 106 and 107 also function as insulation films for preventing the electric current flow through the liquid crystal composition 108. This type of orientation-controlling film is formed by vapor deposition, dip coating, spinner coating, or spray coating from an insulating material, for example, silicon monoxide, silicon dioxide, aluminum oxide, zirconia, magnesium fluoride, cerium oxide, cerium fluoride, silicon nitride, silicon carbide, boron nitride, poly(vinyl alcohol), polyimide, polyamideimide, polyester-imide, poly(p-xylylene), polyester, polycarbonate, poly(vinyl acetal), poly(vinyl chloride), polyamide, polystyrene, cellulosic resin, melamine resin, urea resin, acrylic resin, organisiloxane, or polyfluoroethylene.

The surface structure to cause the liquid crystal composition 108 to take homogeneous alignment can be given to the orientation-controlling films 106 and 107 by rubbing the surface thereof with cloth, paper, velvet, or the like or by oblique evaporation, depending on the prescribed method of writing in. Alternatively, the surface structure to cause the liquid crystal composition 108 to take homeotropic alignment can be given to these films by treating the surfaces thereof with any of a silane compound having a perfluoroalkyl group, an alkyltrialkoxlysilane, and a tetraalkoxysilane, as described in Japanese Patent Application Laid-Open Nos. 36,150/1975, 50,947/1975, and 63,955/1975, respectively.

The optimum thickness of the orientationcontrolling films 106 and 107 depends upon the nature of the insulating material used for the films. In general, the thickness is in the range of 100 Å to 1μ, preferably 500 to 2000 Å. Moreover, these films are desirably formed to such thickness as to act as anti-reflecting films.

It is also possible that a stationary image formed in the liquid crystal device of the present invention by scanning it with a laser beam 110 coming from the rear side of the devide as shown in FIG. 4 is seen by illuminating the device with an observation light 109 such as natural light or light of a halogen lamp, xenon lamp, or fluorescent lamp, coming from the front side of the device, where this incident light is partly reflected from the cold mirror 105. Thus the stationary image can be seen. In general, this cold mirror has sufficiently high reflectivity for visible rays and high transmittance for rays of wavelengths of 600 nm and longer. As an example of such cold mirors, there is known a multilayer film composed of Ge/MgF$_2$($\frac{1}{4}\lambda$)/CeO$_2$($\frac{1}{4}\lambda$)/MgF$_2$($\frac{1}{4}\lambda$)/CeO$_2$($\frac{1}{4}\lambda$). In the present invention, however, the cold mirror 105 is not always necessary. It is also possible in the present device to interpose a cold filter (not shown) between the electrode 103 and the orientation-controlling film 106. This cold filter has sufficiently high transmittance for visible rays and sufficiently high reflectivity for rays of longer wavelengths.

The present invention is illustrated in more detail with reference to the following examples. However, the invention is not to be limited to these examples.

EXAMPLES 1–56

In a ball mill were thoroughly mixed 12 parts by weight of a nitrocellulose solution (solution of 25 wt% OH-less lacquer: nitrocellulose in methyl ethyl ketone, supplied by Daicel Chem. Ind. Co., Ltd.), 3 parts by weight of each of the azulenium salts shown in Table 1 below, 70 parts by weight of methyl ethyl ketone. This mixture was applied by spinner coating on an aluminum film vapor-deposited on a glass disk of 30 cm in diameter, and was dried to form a recording layer of 0.6 g/cm$^2$.

Each of the optical recording disks (Examples 1–56) made in this manner was fixed on a turn table, and the surface of the recording layer was scanned in a track form with a light beam ($\lambda$ 780 nm) converged to a spot size of 1.0$\mu$ emitting from a gallium-aluminum-arsenic semiconductor laser (power 5 mW, pulse frequency 8 MHz) while rotating the turn table at 1000 rpm with a motor, to effect the recording.

The surfaces of the resulting optical disks were observed with a scanning electron microscope, where distinct pits were found. The tracks on the optical disks were traced with a light beam from a gallium-aluminum-arsenic semiconductor laser of low power, and reflected rays were detected with the result that wave shapes having sufficient S/N ratio were observed.

To evaluate the durability and stability, the optical disks after recording were allowed to stand for 240 hours under artificial enviromental conditions of temperature 35° C. and R.H. 95% and then the disk surfaces were examined with a scanning electron microscope. As a result, pits similar to those before the standing test were observed. Further, the optical disks which had been subjected to the recording and standing test were tested for detection of wave shapes of reflected rays by using the low-power laser beam. The obtained wave shapes showed sufficiently high S/N ratio.

TABLE 1

| Example No. | Azulenium salt (designation: as used in the foregoing list) |
| --- | --- |
| 1 | A-(1) |
| 2 | A-(3) |
| 3 | A-(6) |
| 4 | A-(11) |
| 5 | A-(14) |
| 6 | A-(16) |
| 7 | A-(19) |
| 8 | A-(23) |
| 9 | A-(30) |
| 10 | A-(33) |
| 11 | A-(41) |
| 12 | A-(42) |
| 13 | A-(43) |
| 14 | A-(30) |
| 15 | B-(1) |
| 16 | B-(7) |
| 17 | B-(11) |
| 18 | B-(12) |
| 19 | B-(13) |
| 20 | B-(17) |
| 21 | B-(25) |
| 22 | B-(27) |
| 23 | B-(37) |
| 24 | B-(40) |
| 25 | C-(1) |
| 26 | C-(3) |
| 27 | C-(6) |
| 28 | C-(8) |
| 29 | C-(10) |
| 30 | C-(15) |
| 31 | C-(20) |
| 32 | D-(1) |
| 33 | D-(2) |
| 34 | D-(3) |
| 35 | D-(7) |
| 36 | D-(10) |
| 37 | D-(13) |
| 38 | D-(17) |
| 39 | E-(1) |
| 40 | E-(5) |
| 41 | E-(10) |
| 42 | E-(12) |
| 43 | E-(17) |
| 44 | E-(20) |
| 45 | E-(22) |
| 46 | F-(1) |
| 47 | F-(3) |
| 48 | F-(10) |
| 49 | F-(18) |
| 50 | G (1) |
| 51 | G-(3) |
| 52 | G-(9) |
| 53 | G-(13) |
| 54 | G-(16) |
| 55 | G-(19) |
| 56 | G-(22) |

EXAMPLES 57–65

A molybdenum boat for vapor deposition containing 500 mg of each of the azulenium salts shown in Table 2 below and a glass plate metallized with vapor-deposited aluminum were fixed in a vacuum chamber. Afte the chamber was evacuated to a vacuum of $1\times10^{-6}$ mmHg, the azulenium salt was vapor-deposited to a thickness of 0.2$\mu$ on the aluminum layer covering the glass plate, while controlling a heater so that the pressure in the chamber would not rise above $10^{-5}$ mmHg during the deposition.

The thus obtained optical recording disks (Examples 57–65) were subjected to information recording in the same manner as in Example 1, with the result that distinct pits similar to those in Example 1 were observed. Further, on reproducing the recorded information, the disks gave wave shapes which were sufficiently high in S/N ratio.

TABLE 2

| Example No. | Azulenium salt (designation: as used in the foregoing list) |
| --- | --- |
| 57 | A-(1) |

TABLE 2-continued

| Example No. | Azulenium salt (designation: as used in the foregoing list) |
| --- | --- |
| 58 | A-(7) |
| 59 | A-(25) |
| 60 | B-(1) |
| 61 | B-(7) |
| 62 | B-(26) |
| 63 | E-(2) |
| 64 | F-(4) |
| 65 | G-(1) |

An example of display pattern formation in the liquid crystal device of the present invention is shown in FIG. 5.

The azulenium salt as defined before was dissolved in a smectic liquid crystal (4,4'-cyanooctylbiphenyl, which has a positive dielectric anisotropy) to a concentration of 2% by weight. In this case, the azulenium salt was added to the liquid crystal compound which has been heated to turn isotropic. The solution was poured into a cell the opposing inside walls of which had been treated to control the liquid crystal to homeotropic alignment. Then the solution was gradually cooled, thereby making up a liquid crystal composition in the smectic phase of hometropic texture.

A laser oscillator 202 for use in writing images in the liquid crystal cell 201 is preferably chosen so that the oscillation wavelength of the laser will correspond to the absorption efficiency of the azulenium salt contained in the liquid crystal. In general, suitable rays are those of longer wavelengths emitted from a helium-neon laser, simiconductor lasers, and a YAG laser and that of shorter wavelength emitted from an argon laser. The laser beam emitted from the laser oscillator 202 is passed through a modulator 203, slit 204, Y-axis deflector 205, and X-axis deflector 206 to be modulated and polarized, then is condensed by a writing lens 208, and reflected by a dichroic mirror 209 toward the liquid crystal cell 201 to enter at the rear side of the cell. The above modulator 203, Y-axis deflector 205, and X-axis deflector 206 are connected to a signal source 211 through a amplifier 210, thereby controlling the laser beam and converting digital electric signals coming from the signal source 211, into light signals. With the light signals, an image pattern is written in the liquid crystal cell 201. Thereafter, the Peltier element 212 attached onto a side of the liquid crystal cell 201 is actuated to quench the cell 201, thereby forming smectic phase of focal conic texture. Thus, the portion irradiated with light signals becomes a light-scattering state, forming an image pattern. In this case, the temperature of the Peltier element 212 is regulated with a temperature controller 214.

This image pattern can be seen by switching on an illuminating lamp 215 disposed in front of the liquid crystal cell 201.

For erasing the image pattern, power is supplied from a power source 218 for heater through a temperature controller 217 to a transparent heater 126 (e.g. an indium oxide film, tin oxide film, or ITO film) attached to the liquid crystal cell 201 to change the liquid crystal phase to isotropic. Then, the liquid crystal cell 201 is gradually cooled while applying voltage between electrodes 219 and 220 of the liquid crystal cell 201 from an a.c. power supply 221 to recover the smectic phase of homeotropic texture. Thus, the written image pattern is erased.

The liquid crystal device of the present invention can be applied as a large-screen display and also can be used in an optical disk system wherein the recording on the disk is carried out by applying light signals containing the prescribed information along a track on the disk to form pits.

Effects or advantages of the present invention are as follows:

The photothermal transducing recording medium of the invention is advantageous in that; the thin film thereof sensitive to electromagnetic radiation has high absorption efficiency for electromagnetic radiation, the recording in the medium is possible by using a helium-neon gas laser of low energy density or a xenon flash lamp; additionally the medium is effective for recording with a semiconductor laser which emits rays of longer wavelength; the medium exhibits high S/N ratio and good reproduction efficiency, and the compound used in the medium is extremely stable to heat.

The liquid crystal device based on the photothermal transducing recording medium of the invention is applicable as a large-screen display and also applicable to an optical disk system in which the recording on the disk is carried out by applying light signals containing prescribed information along a track on the disk to form pits.

What is claimed is:

1. A photothermal transducing type of recording medium comprising a substrate and a film comprising at least one azulenium salt represented by the following general formula [I], [II], [III], or [IV]:

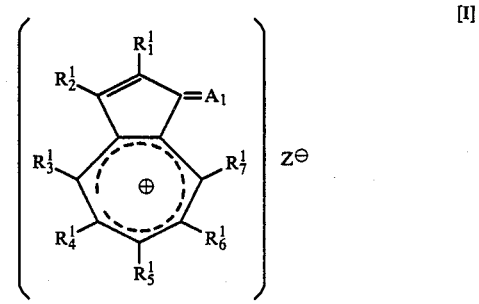

[I]

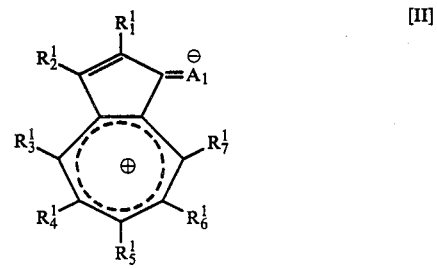

[II]

-continued

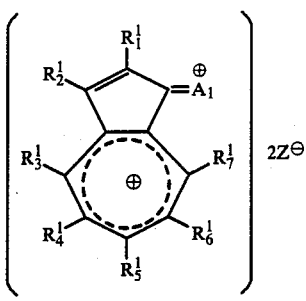

[III]

wherein at least one of combinations of $R^1_1$ and $R^1_2$, $R^1_2$ and $R^1_3$, $R^1_3$ and $R^1_4$, $R^1_4$ and $R^1_5$, $R^1_5$ and $R^1_6$, and $R^1_6$ and $R^1_7$ forms a substituted or unsubstituted heterocyclic ring or alicyclic ring formed of aliphatic chain together with the two adjacent carbon atoms, and each of $R^1_1$, $R^1_2$, $R^1_3$, $R^1_4$, $R^1_5$, $R^1_6$ and $R^1_7$ which do not participate in the formation of the ring represents hydrogen, halogen or organic monovalent radical; $A_1$ represents an organic divalent radical linked by a double bond to the 5-membered ring; and $Z^\ominus$ represents an anion,

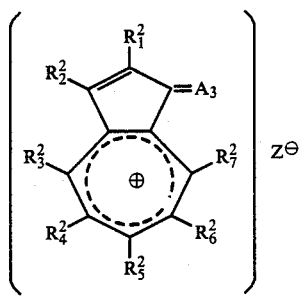

[IV]

wherein $R^2_1$, $R^2_2$, $R^2_3$, $R^2_4$, $R^2_5$, $R^2_6$, and $R^2_7$ each represent hydrogen, halogen or organic monovalent radical, or they may be joined together with the two adjacent carbon atoms to form a substituted or unsubstituted ring with at least one of the combinations: $R^2_1$ and $R^2_2$, $R^2_2$ and $R^2_3$, $R^2_3$ and $R^2_4$, $R^2_4$ and $R^2_5$, $R^2_5$ and $R^2_6$, and $R^2_6$ and $R^2_7$; $Z^\ominus$ represents an anion; $A_3$ represents one of the following general formula (i)-(vi):

$$=CH-Ar_1-N=N-Ar_2-N\begin{matrix}R^2_8\\R^2_9\end{matrix}\text{,} \quad\text{(i)}$$

$$=CH-Ar_1-CH=CH-Ar_2-N\begin{matrix}R^2_8\\R^2_9\end{matrix}\text{,} \quad\text{(ii)}$$

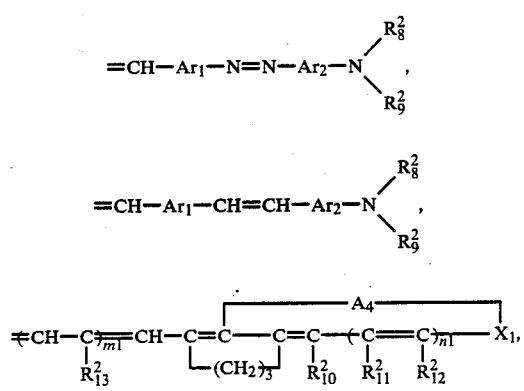

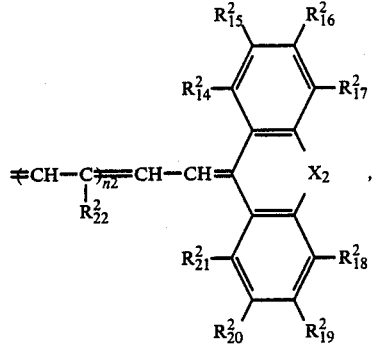

(iv)

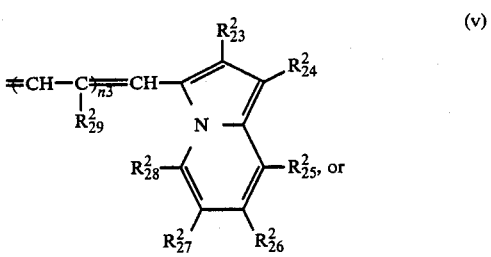

(v)

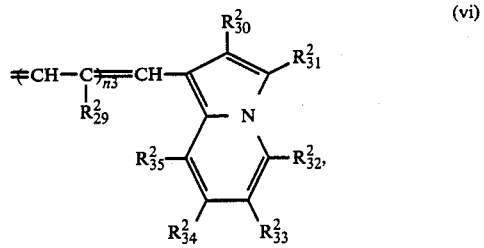

(vi)

wherein $R^2_8$ and $R^2_9$ each represent a substituted or unsubstituted alkyl, aryl, or aralkyl group, or they may be joined together with the nitrogen to which they are attached to form a ring; $Ar_1$ and $Ar_2$ each represent a substituted or unsubstituted arylene group $R^2_{10}$, $R^2_{11}$, and $R^2_{12}$ each represent hydrogen, alkyl, alkoxyl, or a substituted or unsubstituted aryl, substituted or unsubstituted styryl, substituted or unsubstituted 4-phenyl-1,3-butadienyl, or substituted or unsubstituted heterocyclic radical, or the combination of $R^2_{10}$ and $R^2_{11}$ or $R^2_{11}$ and $R^2_{12}$ may form a substituted or unsubstituted benzene ring; $R^2_{13}$ represents hydrogen, nitro, alkyl, or aryl; $X_1$ represents oxygen, sulfur, or selenium; $A_4$ represents an atom group necessary to form a substituted or unsubstituted pyrane, thiapyrane, selenapyrane, benzopyrane, benzothiapyrane, benzoselenapyrane, naphthopyrane, naphthothiapyrane, or naphthoselenapyrane; $m_1$ represents an integer of 0, 1, or 2; $n_1$ represents an integer of 0 or 1; $R^2_{14}$, $R^2_{15}$, $R^2_{16}$, $R^2_{17}$, $R^2_{18}$, $R^2_{19}$, $R^2_{20}$, and $R^2_{21}$ each represent hydrogen, halogen, alkyl, alkoxyl, hydroxyl, substituted or unsubstituted aryl, substituted or unsubstituted aralkyl, or nitro, or they may be joined together with the two adjacent carbon atoms to form a substituted or unsubstituted aromatic ring with at least one of the combinations: $R^2_{14}$ and $R^2_{15}$, $R^2_{15}$ and $R^2_{16}$, $R^2_{16}$ and $R^2_{17}$, $R^2_{18}$ and $R^2_{19}$, $R^2_{19}$ and $R^2_{20}$, and $R^2_{20}$ and $R^2_{21}$; $X_2$ represents oxygen, sulfur, or selenium; $R^2_{22}$ represents hydrogen, nitro, cyano, alkyl, or aryl, $n_2$ represents an integer of 0, 1, or 2; $R^2_{23}$, $R^2_{24}$, $R^2_{25}$, $R^2_{26}$, $R^2_{27}$, $R^2_{28}$, $R^2_{30}$, $R^2_{31}$, $R^2_{32}$, $R^2_{33}$, $R^2_{34}$, and $R^2_{35}$ each represent hydrogen, halogen, alkyl, alkoxyl, substituted or unsubstituted aryl, substituted or unsubstituted aralkyl, nitro, or acyl, or they may be joined together with the two adjacent carbon atoms to form a substituted or unsubstituted ring with at least one of the combinations: $R^2{}_{23}$ and $R^2{}_{24}$, $R^2{}_{24}$ and $R^2{}_{25}$, $R^2{}_{25}$ and $R^2{}_{26}$, $R^2{}_{26}$ and $R^2{}_{27}$, and $R^2{}_{27}$ and $R^2{}_{28}$, or at least one of the combinations: $R^2{}_{30}$ and $R^2{}_{31}$, $R^2{}_{31}$ and $R^2{}_{32}$, $R^2{}_{32}$ and $R^2{}_{33}$, $R^2{}_{33}$ and $R^2{}_{34}$, and $R^2{}_{34}$ and $R^2{}_{35}$; $R^2{}_{29}$ represents hydrogen nitro, alkyl, or aryl; and $n_3$ represents an integer of 0, 1, or 2.

2. The photothermal transducing type of recording medium of claim 1, wherein the azulenium salt is represented by the following general formula [V], [VI] or [VII]:

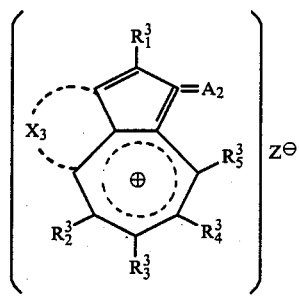
[V]

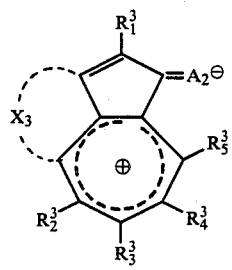
[VI]

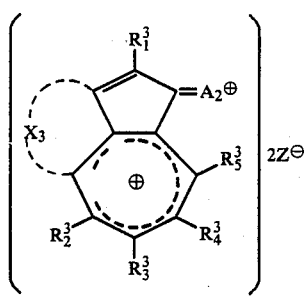
[VII]

wherein $R^3{}_1$, $R^3{}_2$, $R^3{}_3$, $R^3{}_4$, and $R^3{}_5$ each represent hydrogen, halogen, or organic monovalent radical; $X_3$ represents an atom group necessary to form a substituted or unsubstituted 5-, 6-, or 7-membered aromatic ring; or at least one of the combinations of $R^3{}_1$ and aromatic ring formed of $X_3$, $R^3{}_2$ and ring formed of $X_3$, $R^3{}_2$ and $R^3{}_3$, $R^3{}_3$ and $R^3{}_4$, and $R^3{}_4$ and $R^3{}_5$ may form a substituted or unsubstituted aromatic ring, heterocyclic ring or ring formed of aliphatic chain; $A_2$ represents an organic divalent radical linked by a double bond to the 5-membered ring; and $Z^\ominus$ represents an anion.

3. The photothermal transducing type of recording medium of claim 2, wherein $A_2$ in the general formulae [V], [VI], and [VII] is a residue represented by the general formula

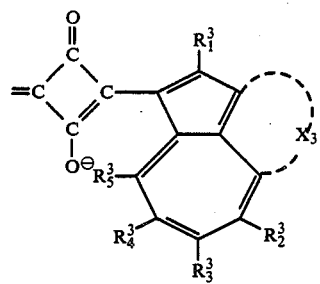
(1)

wherein $R^3{}_1$, $R^3{}_2$, $R^3{}_3$, $R^3{}_4$, and $R^3{}_5$ each represent hydrogen, halogen, or organic monovalent radical; and $X_3$ represents an atom group necessary to form a substituted or unsubstituted 5-, 6-, or 7-membered aromatic ring; or at least one of the combinations of $R^3{}_1$ and aromatic ring formed of $X_3$, $R^3{}_2$ and aromatic ring formed of $X_3$, $R^3{}_2$ and $R^3{}_3$, $R^3{}_3$ and $R^3{}_4$, and $R^3{}_4$ and $R^3{}_5$ may form a substituted or unsubstituted aromatic ring, heterocyclic ring, or ring formed of aliphatic chain.

4. The photothermal transducing type of recording medium of claim 2, wherein $A_2$ in the general formulae [V], [VI], and [VII] is a residue represented by the general formula

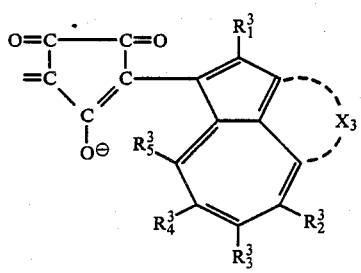
(2)

wherein $R^3{}_1$, $R^3{}_2$, $R^3{}_3$, $R^3{}_4$, and $R^3{}_5$ each represent hydrogen, halogen, or organic monovalent radical; and $X_3$ represents an atom group necessary to form a substituted or unsubstituted 5-, 6-, or 7-membered aromatic ring; or at least one of the combinations of $R^3{}_1$ and aromatic ring formed of $X_3$, $R^3{}_2$ and aromatic ring formed of $X_3$, $R^3{}_2$ and $R^3{}_3$, $R^3{}_3$ and $R^3{}_4$, and $R^3{}_4$ $R^3{}_5$ may form a substituted or unsubstituted aromatic ring, heterocyclic ring, or ring formed of chain.

5. The photothermal transducing type of recording medium of claim 2, wherein $A_2$ in the general formulae [V], [VI], and [VII] is a residue represented by the general formula

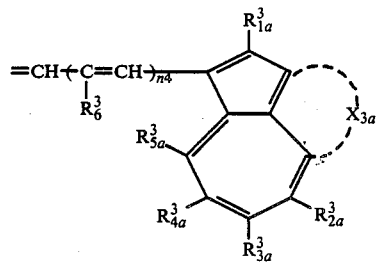
(3)

wherein $R^3{}_{1a}$, $R^3{}_{2a}$, $R^3{}_{3a}$, $R^3{}_{4a}$, and $R^3{}_{5a}$ each represent hydrogen; halogen, or organic monovalent radical; $X_{3a}$ represents an atom group necessary to form a substituted or unsubstituted 5-, 6-, or 7-membered aromatic ring; or at least one of the combinations of $R^3_{1a}$ and aromatic ring formed of $X_{3a}$, $R^3_{2a}$ and aromatic ring formed of $X_{3a}$, $R^3_{2a}$ and $R^3_{3a}$, $R^3_{3a}$ and $R^3_{4a}$, and $R^3_{4a}$ and $R^3_{5a}$, may form a substituted or unsubstituted aromatic ring, heterocylic ring, or ring formed of aliphatic chain; $R^3_6$ represents hydrogen, nitro, cyano, alkyl, or aryl; and $n_4$ represents an integer of 0, 1, or 2.

6. The photothermal transducing type of recording medium of claim 2, wherein $A_2$ in the general formulae [V], [VI], and [VII] is a residue represented by the general formula

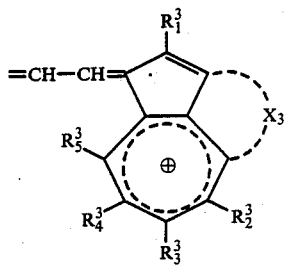 (4)

wherein $R^3_1$, $R^3_2$, $R^3_3$, $R^3_4$, and $R^3_5$ each represent hydrogen, halogen, or organic divalent radical and $X_3$ represents an atom group necessary to form a substituted or unsubstitited 5-, 6-, or 7-membered aromatic ring; or at least one of the combinations of $R^3_1$ and aromatic ring formed of $X_3$, $R^3_2$ and aromatic ring formed of $X_3$, $R^3_2$ and $R^3_3$, $R^3_3$ and $R^3_4$, and $R^3_4$ and $R^3_5$ may form a substituted or unsubstituted aromatic ring, heterocyclic ring, or ring formed of aliphatic chain.

7. The photothermal transducing type of recording medium of claim 2, wherein $A_2$ in the general formulae [V], [VI], and [VII] is a residue represented by the general formula

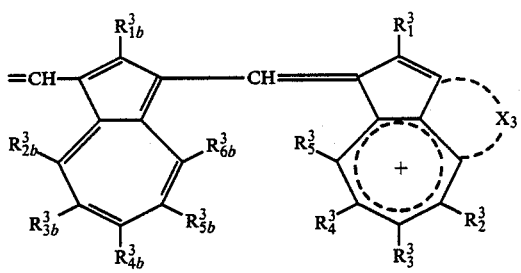 (5)

wherein: $R^3_1$, $R^3_2$, $R^3_3$, $R^3_4$, and $R^3_5$ each represent hydrogen, halogen, or organic monovalent radical; $X_3$ represents an atom group necessary to form a substituted or unsubstituted 5-, 6-, or 7-membered aromatic ring; or at least one of the combinations of $R^3_1$ and aromatic ring formed of $X_3$, $R^3_2$ and aromatic ring formed of $X_3$, $R^3_2$ and $R^3_3$, $R^3_3$ and $R^3_4$, and $R^3_4$ and $R^3_5$ may form a substituted or unsubstituted aromatic ring, heterocyclic ring, or ring formed of aliphatic chain; and $R^3_{1b}$, $R^3_{2b}$, $R^3_{3b}$, $R^3_{4b}$, $R^3_{5b}$, and $R^3_{6b}$ each represent hydrogen, halogen, or organic monovalent radical, or at least one of the combinations of $R^3_{2b}$ and $R^3_{3b}$, $R^3_{3b}$ and $R^3_{4b}$, $R^3_{4b}$ and $R^3_{5b}$, and $R^3_{5b}$ and $R^3_{6b}$ may form a substituted or unsubstituted aromatic ring, heterocyclic ring, or ring formed of aliphatic chain.

8. The photothermal transducing type of recording medium of claim 2, wherein $A_2$ in the general formulae [V], [VI], and [VII] is a residue represented by the general formula

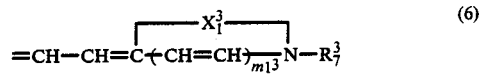 (6)

wherein; $X^3_1$ represents a non-metal atomic group necessary to form a nitrogen-containing heterocyclic ring; $R^3_7$ represents alkyl, substituted alkyl, cycloalkyl, allyl, aralkyl, substituted aralkyl, aryl, or substituted aryl; and $m^3_1$ represents an integer of 0 or 1.

9. The photothermal transducing type of recording medium of claim 2, wherein $A_2$ in the general formulae [V], [VI], and [VII] is a residue represented by the general formula

 (7)

wherein $R^3_8$ represents substituted or unsubstituted aryl.

10. The photothermal transducing type of recording medium of claim 2, wherein $A_2$ in the general formulae [V], [VI], and [VII] is a residue represented by the general formula

 (8)

wherein $R^3_9$ represents a monovalent heterocyclic radical derived from a heterocyclic ring.

11. The photothermal transducing type of recording medium of claim 2, wherein $A_2$ in the general formulae [V], [VI], and [VII] is a residue represented by the general formula

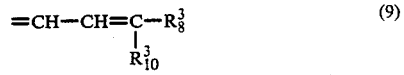 (9)

wherein $R^3_8$ represents substituted or unsubstituted aryl and $R^3_{10}$ represents hydrogen, alkyl, or substituted or unsubstituted aryl.

12. The photothermal transducing type of recording medium of claim 2, wherein $A_2$ in the general formulae [V], [VI], and [VII] is a residue represented by the general formula

 (10)

wherein $R^3_8$ represents substituted or unsubstituted aryl.

13. The photothermal transducing type of recording medium of claim 2, wherein $A_2$ in the general formula

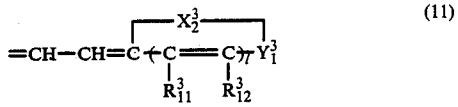 (11)

wherein; $X^3_2$ represents an atom group necessary to form a substituted or unsubstituted pyrane, thiapyrane, selenapyrane, benzopyrane, benzothiapyrane, benzoselenapyrane, naphthopyrane, naphthothiapyrane, or naphthoselenapyrane; l represents 0 or 1; $Y^3_1$ represents sulfur, oxygen, or selenium; and $R^3_{11}$ and $R^3_{12}$ each represent hydrogen, alkyl, alkoxy, or a substituted or unsubstituted aryl, substituted or unsubstituted styryl, subsituted or unsubstituted 4-phenyl-1,3-butadienyl, or substituted or unsubstituted heterocyclic radical.

14. The photothermal transducing type of recording medium of claim 1, wherein $A_1$ in the general formulae [I], [II], and [III] is a residue represented by the general formula

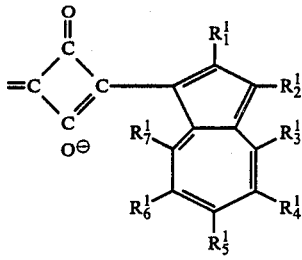

(12)

wherein at least one of combinations of $R^1_1$ and $R^1_2$, $R^1_2$ and $R^1_3$, $R^1_3$ and $R^1_4$, $R^1_4$ and $R^1_5$, $R^1_5$ and $R^1_6$, and $R^1_6$ and $R^1_7$ forms a substituted or unsubstituted heterocyclic ring, or ring formed of aliphatic chain together with the two adjacent carbon atoms, and each of $R^1_1$, $R^1_2$, $R^1_3$, $R^1_4$, $R^1_5$, $R^1_6$ and $R^1_7$ which do not participate in the formation of the ring represents hydrogen, halogen or organic monovalent radical.

15. The photothermal transducing type of recording medium of claim 1, wherein $A_1$ in the general formulae [I], [II], and [III] is a residue represented by the general formula

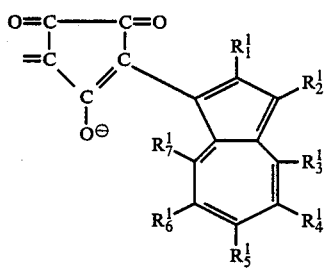

(13)

wherein at least one of combinations of $R^1_1$ and $R^1_2$, $R^1_2$ and $R^1_3$, $R^1_3$ and $R^1_4$, $R^1_4$ and $R^1_5$, $R^1_5$ and $R^1_6$, and $R^1_6$ and $R^1_7$ forms a substituted or unsubstituted heterocyclic ring, or ring formed of aliphatic chain together with the two adjacent carbon atoms, and each of $R^1_1$, $R^1_2$, $R^1_3$, $R^1_4$, $R^1_5$, $R^1_6$ and $R^1_7$ which do not participate in the formation of the ring represents hydrogen, halogen or organic monovalent radical.

16. The photothermal transducing type of recording medium of claim 1, wherein $A_1$ in the general formulae [I], [II], and [III] is a residue represented by the general formula

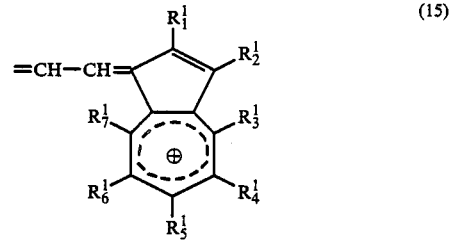

(14)

wherein at least one of combinations of $R^1_{1a}$ and $R^1_{2a}$, $R^1_{2a}$ and $R^1_{3a}$, $R^1_{3a}$ and $R^1_{4a}$, $R^1_{4a}$ and $R^1_{5a}$, $R^1_{5a}$ and $R^1_{6a}$, and $R^1_{6a}$ and $R^1_{7a}$ forms a substituted or unsubstituted heterocyclic ring, or ring formed of aliphatic chain together with the two adjacent carbon atoms, and each of $R^1_{1a}$, $R^1_{2a}$, $R^1_{3a}$, $R^1_{4a}$, $R^1_{5a}$, $R^1_{6a}$ and $R^1_{7a}$ which do not participate in the formation of the ring represents hydrogen, halogen or organic monovalent radical; $R^1_8$ represents hydrogen, nitro, cyano, alkyl, or aryl; and $n^1_1$ represents an integer of 0, 1, or 2.

17. The photothermal transducing type of recording medium of claim 1, wherein $A_1$ in the general formulae [I], [II], and [III] is a residue represented by the general formula (15)

wherein at least one of combinations of $R^1_1$ and $R^1_2$, $R^1_2$ and $R^1_3$, $R^1_3$ and $R^1_4$, $R^1_4$ and $R^1_5$, $R^1_5$ and $R^1_6$, and $R^1_6$ and $R^1_7$ forms a substituted or unsubstituted heterocyclic ring, or ring formed of aliphatic chain together with the two adjacent carbon atoms, and each of $R^1_1$, $R^1_2$, $R^1_3$, $R^1_4$, $R^1_5$, $R^1_6$ and $R^1_7$ which do not participate the formation of the ring represents hydrogen, halogen or organic monovalent radical.

18. The photothermal transducing type of recording medium of claim 1, wherein $A_1$ on the general formulae [I], [II], and [III] is a residue represented by the general formula (16)

wherein at least one of combinations of $R^1_1$ and $R^1_2$, $R^1_2$ and $R^1_3$, $R^1_3$ and $R^1_4$, $R^1_4$ and $R^1_5$, $R^1_5$ and $R^1_6$, and $R^1_6$ and $R^1_7$ forms a substituted or unsubstituted heterocyclic ring, or ring formed of aliphatic chain together with the two adjacent carbon atoms, and each of $R^1_1$, $R^1_2$, $R^1_3$, $R^1_4$, $R^1_5$, $R^1_6$ and $R^1_7$ which do not participate in the formation of the ring represents hydrogen, halogen or organic monovalent radical; and at least one of combinations of $R^1_{3a}$ and $R^1_{4a}$, $R^1_{4a}$ and $R^1_{5a}$, $R^1_{5a}$ and $R^1_{6a}$, and $R^1_{6a}$ and $R^1_{7a}$ forms a substituted or unsubstituted heterocyclic ring, or ring formed of aliphatic chain together with the two adjacnet carbon atoms, and each of $R^1_{1a}$, $R^1_{3a}$, $R^1_{4a}$, $R^1_{5a}$, $R^1_{6a}$ and $R^1_{7a}$ which do not participate in the formation of the ring represents hydrogen, halogen or organic monovalent radical.

19. The photothermal transducing type of recording medium of claim 1, wherein $A_1$ in the general formulae

[I], [II] and [III] is a residue represented by the general formula

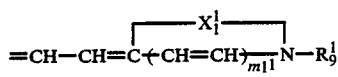 (17)

wherein; $X^1_1$ represents a non-metal atomic group necessary to form a nitrogen-containing heterocyclic ring; $R^1_9$ represents alkyl, substituted alkyl, cycloalkyl, allyl, aralkyl, substituted aralkyl, aryl, or substituted aryl; and $m^1_1$ represents 0 or 1.

20. The photothermal transducing type of recording medium of claim 1, wherein $A_1$ in the general formulae [I], [II], and [III] is a residue represented by the general formula

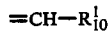 (18)

wherein $R^1_{10}$ represents substituted or unsubstituted aryl.

21. The photothermal transducing type of recording medium of claim 1, wherein $A_1$ in the general formulae [I], [II], and [III] is a residue represented by the general formula

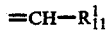 (19)

wherein $R^1_{11}$ represents a monovalent heterocyclic radical derived from a heterocyclic ring.

22. The photothermal transducing type of recording medium of claim 1, wherein $A_1$ in the general formulae [I], [II], and [III] is a residue represented by the general formula

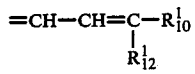 (20)

wherein $R^1_{10}$ represents substituted or unsubstituted aryl and $R^1_{12}$ represents hydrogen, alkyl, or substituted or unsubstituted aryl.

23. The photothermal transducing type of recording medium of claim 1, wherein $A_1$ in the general formulae [I], [II], and [III] is a residue represented by the general formula

 (21)

wherein $R^1_{10}$ represents substituted or unsubstituted aryl.

24. The photothermal transducing type of recording medium of claim 1, wherein $A_1$ in the general formulae [I], [II], and [III] is a residue represented by the general formula

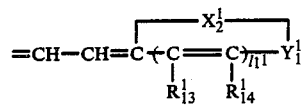 (22)

wherein; $X^1_2$ represents an atom group necessary to form a substituted or unsubstituted ring of pyrane, thiapyrane, selenapyrane, benzopyrane, benzothiapyrane, benzoselenapyrane, naphthopyrane, naphthothiapyrane, or naphthoselenapyrane; $l^1_1$ represents 0 or 1; $Y^1_1$ represents sulfur, oxygen, or selenium; and $R^1_{13}$ and $R^1_{14}$ each represent hydrogen, alkyl, alkoxyl, or a substituted or unsubstituted aryl, substituted or unsubstituted styryl, substituted or unsubstituted 4-phenyl-1,3-butadienyl, or heterocyclic radical.

25. The photothermal transducing type of recording medium of claim 1, wherein the film has sensitivity to a laser beam.

26. The photothermal transducing type of recording medium of claim 1, wherein the film is formed by vapor deposition of said azulenium salt.

27. The photothermal transducing type of recording medium of claim 1, wherein the film is a resin film containing said azulenium salt.

28. The photothermal transducing type of recording medium of claim 1, wherein the film is liquid crystal film containing an azulenium salt represented by the general formula [I]-[IV].

29. The photothermal transducing type of recording medium of claim 28, wherein the liquid crystal is a smectic one.

30. The photothermal transducing type of recording medium of claim 29, wherein the smectic liquid crystal is one having a positive dielectric anisotropy.

31. The photothermal transducing type of recording medium of claim 28, in which recording is accomplished by heating the liquid crystal film locally, followed by cooling the film to change the phase of the heated portion to the smectic phase of focal conic texture.

32. The photothermal transducing type of recording medium of claim 31, wherein the local heating is carried out with a laser beam.

33. The photothermal transducing type of recording medium of claim 1, wherein the liquid crystal contains a cholesteric liquid crystal in an amount of 0.5 to 15% by weight based on the liquid crystal composition.

* * * * *

UNITED STATES PATENT AND TRADEMARK OFFICE
CERTIFICATE OF CORRECTION

PATENT NO. : 4,738,908  
DATED : April 19, 1988  
INVENTOR(S) : YOSHIHIRO OGUCHI, ET AL.

Page 1 of 6

It is certified that error appears in the above-identified patent and that said Letters Patent is hereby corrected as shown below:

COLUMN 5

Lines 35-37, "$\left(\text{CH-CH}\right)_{n3}$"
$$\quad\quad\quad\quad\quad\quad\quad |$$
$$\quad\quad\quad\quad\quad\quad R^2_{29}$$

should read
--$\left(\text{CH-C}\right)_{n3}$--
$$\quad\quad |$$
$$\quad R^2_{29}$$

COLUMN 6

Line 14, "X represent" should read --$X_2$ represents--.

COLUMN 9

Lines 39-40, "$\underset{R^2_5}{\vee}$" should read --$\underset{R^1_5}{\vee}$--.

COLUMN 10

Line 23, "biphenylyl," should read --biphenyl,--.  
Line 55, "biphenylyl," should read --biphenyl,--.

UNITED STATES PATENT AND TRADEMARK OFFICE
CERTIFICATE OF CORRECTION

PATENT NO. : 4,738,908
DATED : April 19, 1988
INVENTOR(S) : YOSHIHIRO OGUCHI, ET AL.

It is certified that error appears in the above-identified patent and that said Letters Patent is hereby corrected as shown below:

COLUMN 11

Line 16, "biphenylyl," should read --biphenyl,--.

COLUMN 22

Compound A-(43), "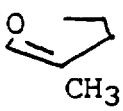" should read --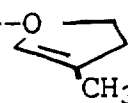--.

COLUMN 23

Compound A-(45), "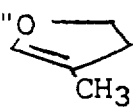" should read --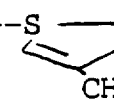--.

UNITED STATES PATENT AND TRADEMARK OFFICE
CERTIFICATE OF CORRECTION

PATENT NO. : 4,738,908
DATED : April 19, 1988
INVENTOR(S) : YOSHIHIRO OGUCHI, ET AL.

It is certified that error appears in the above-identified patent and that said Letters Patent is hereby corrected as shown below:

COLUMN 37

Lines 23-33,
"

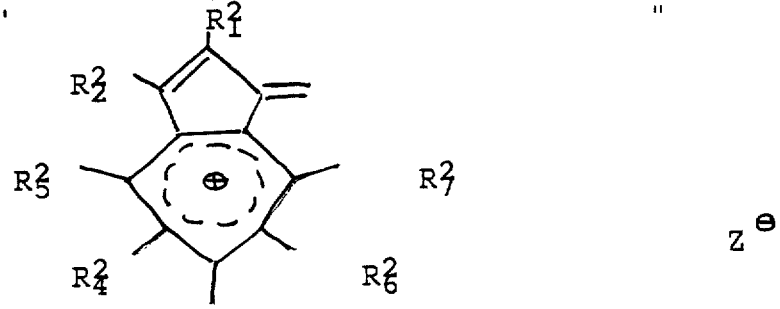

should read

--

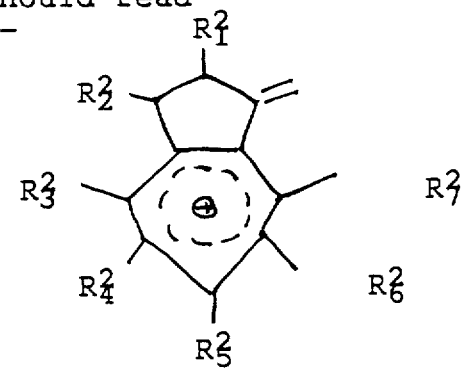

--

COLUMN 54

Line 16, "$Z^{63}$" should read --$Z^{\ominus}$--.

UNITED STATES PATENT AND TRADEMARK OFFICE
CERTIFICATE OF CORRECTION

PATENT NO. : 4,738,908

DATED : April 19, 1988

INVENTOR(S) : YOSHIHIRO OGUCHI, ET AL.

It is certified that error appears in the above-identified patent and that said Letters Patent is hereby corrected as shown below:

COLUMN 102

Line 41, "group $R^2_{10}$," should read
           --group, $R^2_{10}$,--.

COLUMN 103

Line 8, "hydrogen nitro," should read --hydrogen, nitro,--.

COLUMN 104

Line 46, "$R^3_4\ R^3_5$" should read
           --$R^3_4$ and $R^3_5$--.
   Line 67, "hydrogen;" should read --hydrogen,--.

COLUMN 105

Line 6, "heterocylic" should read --heterocyclic--.

COLUMN 106

Line 54, "general formula" should read --general formulae [V], [VI], and [VII] is a residue represented by the general formulae--.

UNITED STATES PATENT AND TRADEMARK OFFICE
CERTIFICATE OF CORRECTION

PATENT NO. : 4,738,908
DATED : April 19, 1988
INVENTOR(S) : YOSHIHIRO OGUCHI, ET AL.

It is certified that error appears in the above-identified patent and that said Letters Patent is hereby corrected as shown below:

COLUMN 107

Line 2, "subsituted" should read --substituted--.
Lines 9-15, " 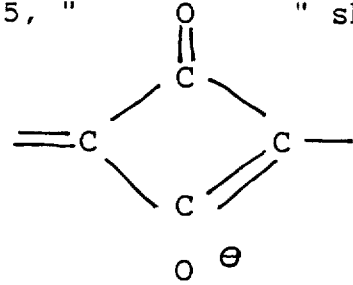 " should read -- 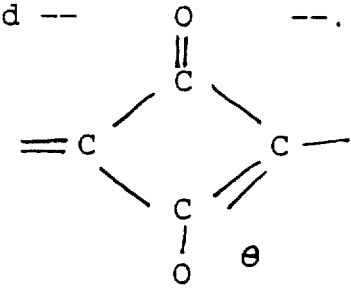 --.

COLUMN 108

Line 36, "on" should read --in--.
Line 63, "adjacnet" should read --adjacent--.

UNITED STATES PATENT AND TRADEMARK OFFICE
CERTIFICATE OF CORRECTION

PATENT NO. : 4,738,908
DATED : April 19, 1988
INVENTOR(S) : YOSHIHIRO OGUCHI, ET AL.

It is certified that error appears in the above-identified patent and that said Letters Patent is hereby corrected as shown below:

COLUMN 110

Line 11, "$X^1_1$" should read --$X^1_2$--.
Line 31, "is liquid" should read --is a liquid--.

Signed and Sealed this

Eighteenth Day of April, 1989

Attest:

DONALD J. QUIGG

Attesting Officer

Commissioner of Patents and Trademarks